United States Patent
Solomon

(10) Patent No.: US 7,203,552 B2
(45) Date of Patent: Apr. 10, 2007

(54) METHOD AND APPARATUS FOR CONTROLLING A DEFORMABLE MIRROR

(75) Inventor: Mark B. Solomon, Norwood, MA (US)

(73) Assignee: SolVisions Technologies International Inc., Dallas, TX (US)

( * ) Notice: Subject to any disclaimer, the term of this patent is extended or adjusted under 35 U.S.C. 154(b) by 0 days.

(21) Appl. No.: 11/286,853

(22) Filed: Nov. 26, 2005

(65) Prior Publication Data

US 2006/0142877 A1     Jun. 29, 2006

Related U.S. Application Data

(63) Continuation of application No. 09/616,106, filed on Jul. 14, 2000, now Pat. No. 7,013,183.

(51) Int. Cl.
| | |
|---|---|
| G02B 26/08 | (2006.01) |
| G05B 11/01 | (2006.01) |
| G02B 26/00 | (2006.01) |
| H01L 41/00 | (2006.01) |
| H02N 2/00 | (2006.01) |

(52) U.S. Cl. ............... 700/10; 700/19; 700/56; 359/224; 359/849; 359/846; 310/317

(58) Field of Classification Search ........... 700/11, 700/2, 19, 22, 56; 359/224, 291, 846, 849; 310/316.01, 317, 328, 316.03
See application file for complete search history.

(56) References Cited

U.S. PATENT DOCUMENTS

| | | | |
|---|---|---|---|
| 4,091,274 A | 5/1978 | Angelbeck et al. | |
| 4,263,527 A * | 4/1981 | Comstock | 310/316.03 |
| 5,986,795 A | 11/1999 | Chapman et al. | |
| 6,042,257 A * | 3/2000 | Tsudaka | 700/121 |
| 6,424,076 B1 * | 7/2002 | Gullapalli | 310/328 |
| 6,747,391 B1 | 6/2004 | Ben-Yaakov | |

FOREIGN PATENT DOCUMENTS

WO     WO 00/25368     5/2000

OTHER PUBLICATIONS

Price, Thomas R., Ph. D., "DeFormable Mirror Multiplexer [sic] Driver Electronics Final Report," Oct. 8, 1998, Kinetics, Devens, MR 01432.

* cited by examiner

*Primary Examiner*—Anthony Knight
*Assistant Examiner*—Sunray Chang
(74) *Attorney, Agent, or Firm*—Fish & Richardson P.C.

(57) ABSTRACT

A method, or corresponding apparatus, for controlling deformation of a structure, in part, includes applying a command signal at a first signal level to at least one actuator mechanically coupled to a structure, the first signal level known to produce an energy level in the actuator(s) substantially the same as an energy level currently stored by the actuator(s). The method enables the actuator(s) to respond to the command signal by applying an electrical reference to the actuator(s). The method drives the command signal from the first signal level to a second signal level, changing the actuator(s) in at least one dimension as a function of the command signal, which results in a corresponding deformation of the structure. The method electrically disables the actuator(s) by removing the electrical reference, which results in maintaining deformation of the structure defined by energy stored by the actuator(s).

23 Claims, 40 Drawing Sheets

METHOD AND APPARATUS FOR CONTROLLING A DEFORMABLE MIRROR

RELATED PATENTS

This is a continuation of U.S. patent application Ser. No. 09/616,106 filed on Jul. 14, 2000, now issued U.S. Pat. No. 7,013,183 on Mar. 14, 2006; the entire teachings of which are incorporated herein by reference.

BACKGROUND OF THE PRESENT INVENTION

Real-time adaptive optics is a control process generally used to reduce optical phase error in an optical transmission system, such as a telescope or a laser beam director. In high bandwidth applications, such as astronomy and remote sensing, the goal of real-time adaptive optics is to operate at high frequencies to compensate for high bandwidth atmospheric distortion and to produce stable, high fidelity images. High-performance, real-time, adaptive optics systems include sensors, processors, and dynamic mirror assemblies, optionally including vibration compensation mirrors (i.e., fast steering mirrors that provide tip and tilt motions) and/or phase error compensation mirrors (i.e., deformable mirrors that provide surface figure adjustments). High-speed communications, high-bandwidth electronics, and high-bandwidth control systems are used to control both fast steering and deformable mirrors within the high-performance, real-time, adaptive optics systems.

The deformable mirror system is of primary concern in the present application and is discussed further hereafter. At the core of a typical deformable mirror is a thin mirror and a thick base plate, with electro-mechanical actuators positioned between and mechanically coupled to both the thin mirror and the thick base plate. Each actuator converts respective electrical signals into a respective mechanical force, which is used to deform the thin mirror locally. Depending on the deformable mirror application, the actuators may be designed to provide mechanical strokes that range from tens of nanometers to hundreds of microns, where actuation sensitivities are typically measured in nanometers or microns per volt, respectively.

Actuators used in deformable mirrors and micropositioner applications are typically ceramic, embodying piezoelectric, electrostrictive, or magnetostrictive properties of the ceramic material. A model of ceramic actuators includes both mechanical and electrical characteristics. Two well-known ceramic actuator formulations are PZT (lead-zirconate-titanate, classified as piezoelectric) and PMN (lead-magnesium-niobate, classified as electrostrictive). Design trade-off characteristics between actuator materials and their control systems include: thermal stability, creep, stiffness, dielectric constant, series and parallel resistance, and hysteresis.

Electrically, ceramic actuators may be modeled as capacitors. When multiple ceramic layers are stacked in parallel between alternating high- and low-side electrodes, the capacitance of the layers is added to determine the total actuator capacitance. In a co-fired stack process, tens of layers are typically stacked together, resulting in an actuator tens of millimeters in length and ranging into the tens of microfarads in capacitance. And, as in the case of a capacitor, actuators having higher capacitance require more energy (i.e., more current) to change the stored charge at a rate similar to an actuator of lesser capacitance. Thus, a high stroke requirement for an actuator results in a relatively high current to generate a high rate of change of the length of the actuator.

By way of example, in a high-performance, atmospheric compensation, adaptive optics system, a deformable mirror may employ actuators that are relatively long (e.g., 40 mm) to produce large mirror displacements (e.g., 4 µm). Because of the length, the actuators have comparable thickness (e.g., 10 mm) for strength. For PMN formulation actuators, these dimensions result in relatively high capacitance (e.g., 5 µf). Therefore, the amplifiers driving the actuators must provide sufficient drive power/current so as to achieve the bandwidths required by the high-performance adaptive optics system.

In most applications, high capacitance of an actuator tends to be a bad quality (e.g., high power requirements) with respect to operation of the system in which the actuator is deployed. On the other hand, the high capacitance of the actuator also tends to increase the time the actuator is capable of storing a charge, thereby maintaining its electrically or magnetically induced length change without requiring a constant source of power. Therefore, the high capacitance of the actuator may be a good quality in some applications, such as a long-exposure, low available-power, astronomical imaging application in a severe, but slowly changing, thermal environment.

In the past, the challenge for the adaptive optics community, specifically deformable mirror developers, has been to increase the bandwidths of traditional adaptive optics systems to correct optical phase error in high turbulence atmospheric conditions, which necessarily leads to driving a deformable mirror at higher frame rates and amplifiers and actuators at higher bandwidths.

For high-bandwidth applications, traditional deformable mirror driver electronics systems used to control the deformable mirror (DM) have one high-voltage amplifier per channel (i.e., each channel drives a single actuator) to achieve the high frame rates required to achieve the performance of the high-performance adaptive optics system. The amplifiers must have high output power to drive the actuators at the high frequencies and displacements required by the traditional adaptive optics system used in high turbulence conditions. Since the amplifiers that drive the actuators are traditionally linear, which have power efficiencies generally below 60%, then on a per actuator basis, the power required to drive a deformable mirror is high.

Deformable mirrors have been traditionally populated by 37, 97, 177, 349, 577, and 941 actuators. In future adaptive optics systems, the number of actuators populating a deformable mirror may be extended to up to 16,000 or more actuators per mirror. As discussed above, in traditional deformable mirror driver electronics systems, the number of actuators per mirror dictates the number of amplifiers per driver system. Thus, from the number of actuators in the deformable mirror, the driver system power, weight, size, and cost can be estimated.

Recently, adaptive optics systems have been considered for applications that do not require high bandwidths. Space telescopes, eye research, and nuclear fusion generation systems are examples in which low bandwidth adaptive optics systems are applicable. Low bandwidth adaptive optics systems do not require deformable mirrors to have high frame rates (i.e., the rate at which every actuator in the DM is addressed with a command update). Therefore, the associated DM driver electronics systems may also have reduced bandwidths and still support the frame rates necessary to achieve the portion of the error budget allotted to the DM within the adaptive optics system.

Low bandwidth applications raise issues related to the DM driver electronics that were not of serious concern in the high bandwidth applications, such as: size, weight, power consumption, packaging, radiation-hardening, and cost. These issues become increasingly important for deformable mirrors having actuator quantities in the thousands. Similar concerns are also raised when high bandwidth systems are to be used in weight- or power-limited environments, such as in airborne or space-based telescopes.

SUMMARY OF THE INVENTION

The capacity of actuators to store a charge, and therefore maintain a length during operation for a given amount of time, can be leveraged to reduce the size, weight, power consumption, and cost of a deformable mirror (DM) driver electronics system. The number of amplifiers can be reduced from one amplifier per actuator in a DM actuator array to as few as one amplifier per entire DM actuator array. To facilitate the reduction in the number of amplifiers, at least one amplifier controls one or more DM actuators at a time when providing actuator command updates to the DM.

The longer the DM actuators are able to maintain their lengths (i.e., store a charge), the more the control rate can be reduced for controlling the DM actuators in the DM actuator array and still maintain a given DM surface figure within an error tolerance between command updates (i.e., while not under amplifier control). In addition, the DM driver electronics used to control the lengths of the DM actuators must not significantly affect the stored respective charges on the actuators between command updates.

In accordance with the principles of the principles of the present invention, a method of controlling deformation of a structure includes (i) applying a command signal at a first signal level to a first electrode of at least one actuator mechanically coupled to a structure, the first signal level known to produce an energy level in the actuator(s) substantially the same as an energy level currently stored by the actuator(s); (ii) electrically coupling an electrical reference to a second electrode of the actuator(s) to enable the actuator(s) to respond in an electromechanical manner to the command signal at the first signal level, the actuator(s) having a substantially negligible electromechanical response to the command signal at the first signal level; (iii) driving the command signal from the first signal level to a second signal level, the actuator(s) changing in at least one dimension in an electromechanical manner as a function of the command signal, resulting in a corresponding deformation of the structure; and (iv) electrically decoupling the electrical reference from the second electrode of the actuator(s), resulting in maintaining deformation of the structure defined by energy stored in the actuator(s).

An apparatus for controlling deformation of a structure may include at least one actuator mechanically coupled to a structure, the actuator(s) may include a first electrode and a second electrode. A processor may be programmed to operate with electronics coupled to the actuator(s), where the electronics include an amplifier and a switching element coupled to the actuator(s). The processor may execute instructions that cause (i) the amplifier to apply a command signal at a first signal level to the first electrode of the actuator(s), the first signal level known to produce an energy level in the actuator(s) substantially the same as an energy level currently stored by the actuator(s); (ii) the switching element to couple an electrical reference to the second electrode of the actuator(s) to enable the actuator(s) to respond in an electromechanical manner to the command signal at the first signal level, the actuator(s) having a substantially negligible electromechanical response to the command signal at the first signal level; (iii) the amplifier to drive the command signal from the first signal level to a second signal level, the actuator(s) changing shape in at least one dimension in an electromechanical manner as a function of the command signal, resulting in a corresponding deformation of the structure; and (iv) the switching element to decouple the electrical reference from the second electrode of the actuator(s), resulting in maintaining a deformation of the structure defined by energy stored in the actuator(s).

A more complete appreciation of the present invention and the scope thereof can be obtained from the accompanying drawings that are briefly summarized below, the following detailed description of the presently-preferred embodiments of the invention, and the appended claims.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
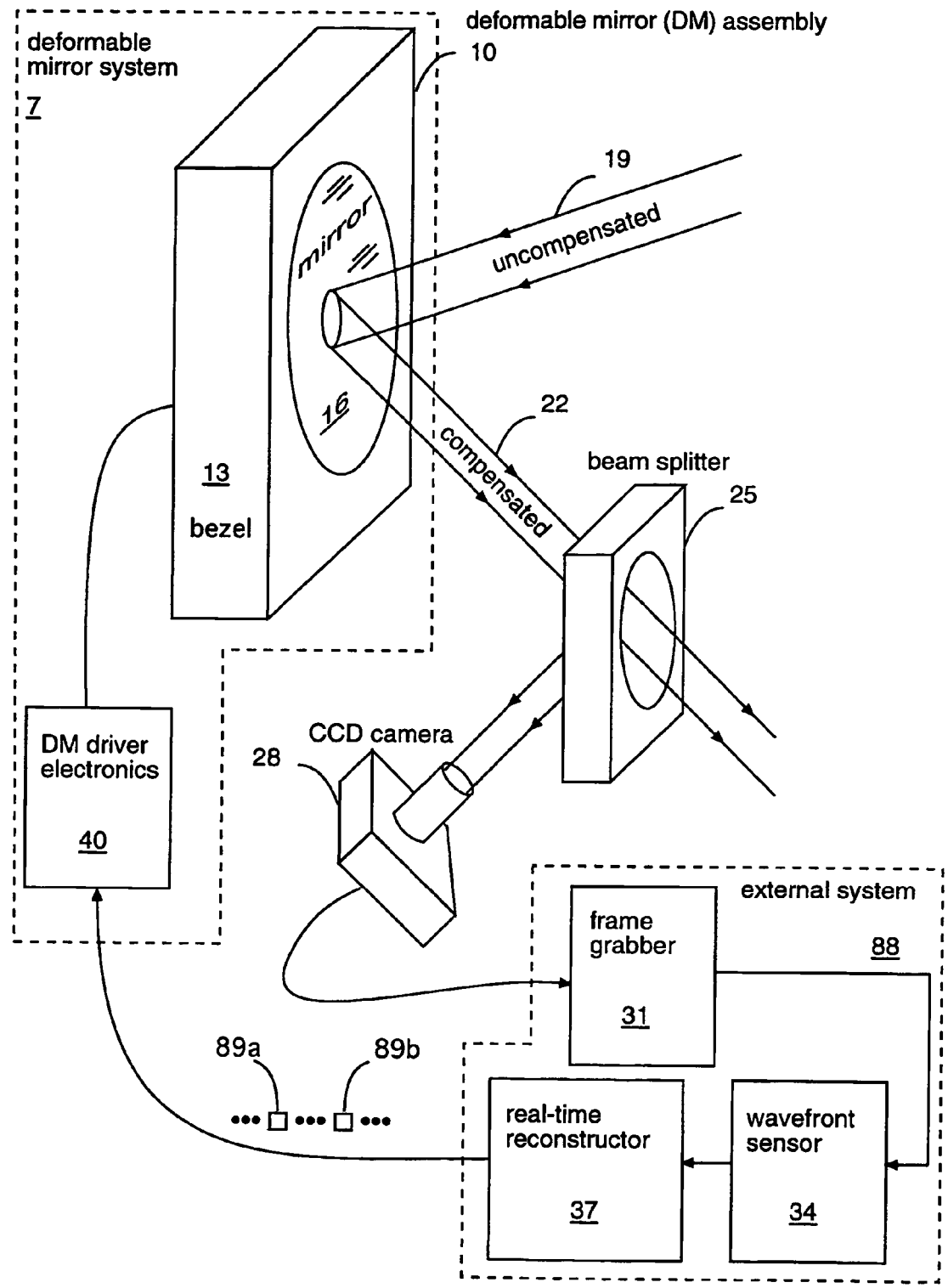
FIG. 1 is a block diagram of an example adaptive optics (AO) system employing a deformable mirror (DM) having DM driver electronics operating according to the principles of the present invention.

The present invention is described more fully hereinafter with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art.

Some of the issues/goals for DM driver electronic systems in low bandwidth or weight/power-limited adaptive optics systems applications include: low weight, small size, low power consumption, low thermal output, deep space compatibility/capability (radiation-hardened circuitry), high packaging density/diversity, high mean-time between failure, and low cost. One approach to achieving these goals is to change the amplifier design of traditional DM driver electronics systems from a high bandwidth amplifier to an amplifier having lower drive capability, but to leave the rest of the high bandwidth system intact. Another approach is to reduce the number of high voltage amplifiers by using a so-called "multiplexer" system, in which at least one high voltage amplifier has its output routed through a switch array to adjust multiple actuators—one or more actuators at a time—during a DM command frame update. Since a multiplexer (MUX) approach addresses all the low bandwidth system issues to a greater extent than does the reduced amplifier bandwidth approach, the multiplexer design is a preferable design approach for relatively low bandwidth DM driver electronics systems and is the preferred approach where high system bandwidth must be maintained but weight and power must be minimized. It should be noted, however, that a combination of the two approaches is also possible according to the principles of the present invention.

A high voltage switching problem is addressed by controlling charge delivered to and drawn from a charge storage element (e.g., DM actuator) by applying a switch design to a position in the circuit that can be controlled to keep switched voltages to very low levels. In one embodiment of a deformable mirror system employing the principles of the present invention, a high voltage amplifier, actuator, switch, and reference node (e.g., analog return) are connected in order, optionally with other components coupled in series between components or in parallel with at least one of the components. Thus, rather than having the switch electrically coupled between high voltage elements (i.e., the high voltage amplifier and actuator), the switch is electrically coupled between a low-side electrode of the actuator and a reference node, typically coupled to analog ground.

As understood in the art, in co-fired actuator designs, an actuator comprises multiple layers—positive electrode/dielectric/negative electrode—where the electrodes are sometimes referred to as charge storage plates. The positive electrodes store charge having a high voltage potential; the negative electrodes store charge having a low voltage potential. Therefore, the switches essentially switch zero volts, resulting in low voltage switching, high mean-time between failure, and low electromagnetic noise generation.

In a deformable mirror application, the switch is used as a "building block" in a switch array. The building block switch structure is generic, allowing for MOSFET, other field-effect devices, or other solid state switching elements to operate with standard logic devices of high efficiency families. For example, a CMOS, radiation-hardened family of devices that operate at 3.3V, 5V or 15V logic power levels, or lower when available, is suitable for driving the switches. Addressing circuitry, or logic, optionally utilizing CMOS logic, is employed to address at least one switch in the switch array to select which actuator(s) in the array of actuators is/are to be controlled. The addressing circuitry is suitable for integration in programmable array logic (PAL), and the switches are amenable to hybrid, ASIC, or other design techniques to reduce package size of the DM driver electronics.

If employing (i) switches in a field-effect technology that only consume power during switching and (ii) low power address logic circuitry, the circuitry emits very little thermal energy. Because the circuitry emits very little thermal energy, the circuitry is therefore packagable in a DM bezel assembly without its thermal emission affecting optical figure.

The circuitry used to implement the low voltage switches and addressing logic preferably achieves the goals of the DM driver electronics systems. In addition, the following desirable characteristics are also preferably achieved: high speed, expandability, non-latch-up logic, modularity, and low electromagnetic noise generation.

A processor executing software can be coupled to and control an integrated power amplifier, the switches, and/or the addressing circuitry. The processor operates those devices in a coordinated manner to reduce undesirable current spikes—due to inherent electrical characteristics of the charge storage devices—and keep voltage differentials across the switches to a minimum, thus improving the failure rates of the switches.

The following discussion provides a more detailed description of preferred embodiments of the present invention.

FIG. 1 is a block diagram of a wavefront error (e.g., phase error) correction portion of an adaptive optics system. A deformable mirror (DM) system 7 comprises a DM assembly 10 having a DM mirror 16. The DM mirror 16 is used to correct the wavefront error of an uncompensated light beam 19, making it a corrected, or compensated, light beam 22 having little or no wavefront error.

Theoretically, the compensated light beam 22 has an error (e.g., phase error) within a specified error budget level, up to a specified bandwidth. The frequency to which the DM system 7 is able to compensate the uncompensated light beam is a function of the bandwidths of the sensors, processing electronics and DM driver electronics that are employed by the wavefront error correction portion of the adaptive optics system.

To measure error in the compensated light beam 22, a beam splitter 25 redirects a portion of the compensated light beam 22 to a CCD camera 28, which is positioned to view an active region of the DM mirror 16. The CCD camera 28 has a given frame rate (e.g., 60 Hz) for capturing wavefront images of the compensated light beam 22 reflected from the beam splitter 25.

The wavefront measured by the CCD camera 28 is typically digitized and analyzed by subsystems, such as a frame grabber 31, wavefront sensor 34, and real-time reconstructor 37, which compose an external system 88. The external system 88 is referred to as "external" herein since it is external from and provides DM command frames 89a, 89b (collectively 89) to embodiments of a DM driver electronics 40 subsystem. Alternatively, the DM driver electronics 40 include substantially all or all of the functionality required to correct the wavefront error (i.e., close the loop), thus eliminating the physical aspects of the external system 88 from the DM system 7.

The wavefronts detected by the CCD camera 28 are captured and digitized by the frame grabber 31. The digitized wavefronts are transferred to the wavefront sensor 34. The wavefront sensor 34 determines wavefront errors in the compensated light beam 22, where the error indicates an imperfectly compensated light beam 22, or that the light beam 22 has since changed in some way relative to the last wavefront error correction. Processed information from the wavefront sensor 34 is passed to the real-time reconstructor 37. The real-time reconstructor 37 maps optical space to DM mirror space, taking in the wavefront sensor information and assembling the DM command frames 89.

The DM command frames 89 are passed to DM driver electronics 40. The DM driver electronics 40 converts the DM command frames 89 into drive signals used to change the shape of the DM mirror 16 in a DM bezel 13 of the DM assembly 10.

Figure 2:
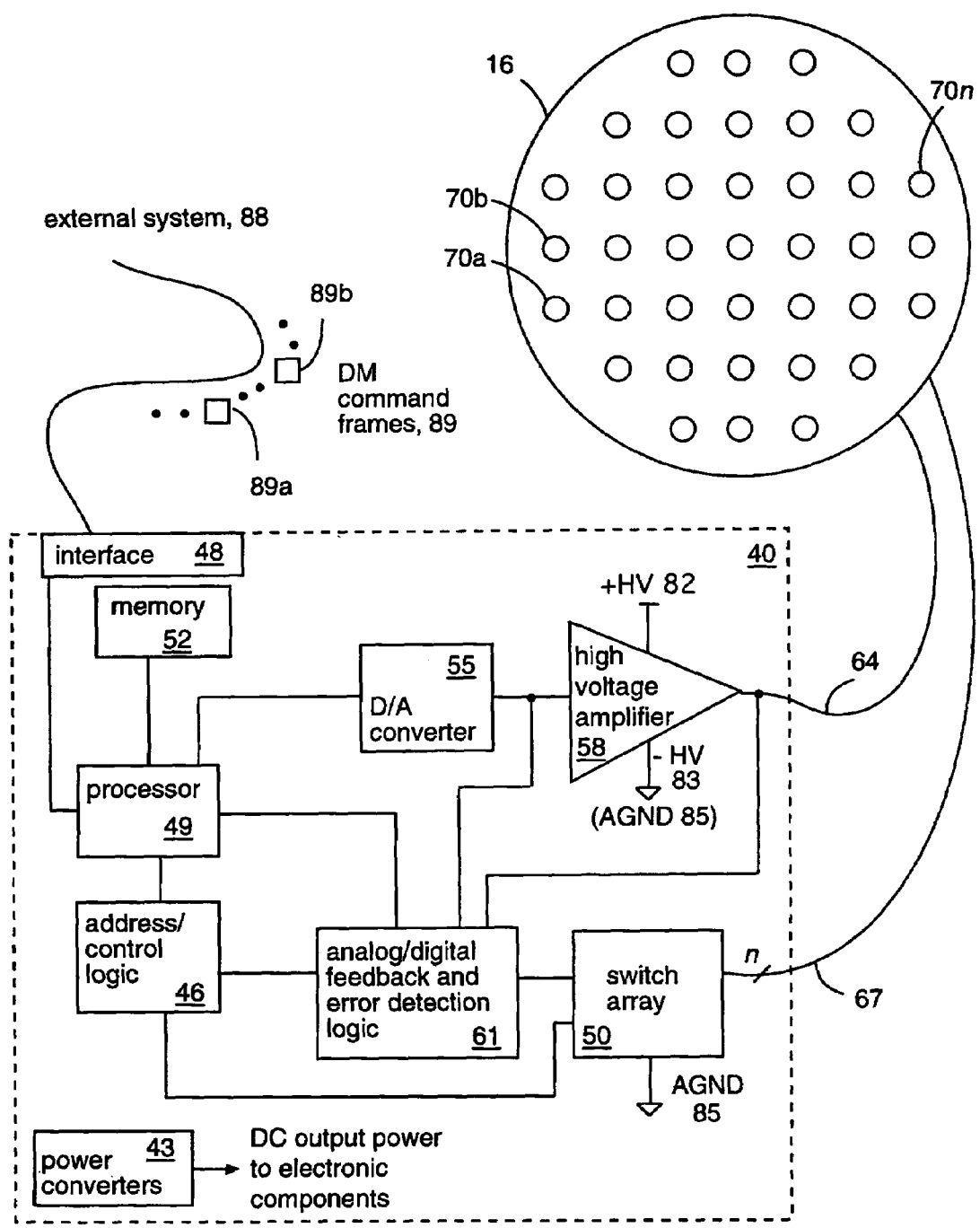
FIG. 2 is a schematic diagram of the DM driver electronics of FIG. 1.

FIG. 2 is a schematic diagram of the DM driver electronics 40 coupled to actuators 70a, 70b, . . . , 70n (collectively a DM actuator array 70) visible through the DM mirror 16. The DM mirror 16 of the DM assembly 10 has representations of actuators in the DM actuator array 70, which are adhesively coupled to the back-side of the DM mirror 16 (see FIG. 18 for more detail).

The DM driver electronics 40 includes a DM driver electronics interface 48, with which the external system 88 communicates to send DM command frames 89 and receive status or other DM-related information. Communication between the external system 88 and the DM driver electronics interface 89 may be synchronous or asynchronous. The DM command frames 89 may include (i) actuator commands (e.g., digital equivalents of analog voltages to be applied to the actuators in the DM actuator array 70) and (ii) system-level commands, such as "initialize", initialization parameters, "power down", "status?", "low power imaging mode", or other system-level commands. Processing of the DM command frames 89 is discussed in detail beginning in FIG. 20B.

The DM processor 49 is coupled to the interface 48 to receive and process the DM command frames 89. The DM processor 49 further interfaces with supporting electronic hardware, such as memory 52 and address/control logic 46.

The memory 52 may be employed to store DM command frames 89, data for controlling the DM mirror 16, initialization data, and other typical information related to similar electronics. Because the number of actuators in a DM actuator array 70 can be numerous, data compression techniques may be employed to reduce data sizes, thereby minimizing the amount of memory 52 required to store the data, which saves power, size, and cost.

The DM processor 49 employs a digital-to-analog (D/A) converter 55 to convert digital data into a low voltage analog signal. The low voltage analog signal is input to a high voltage amplifier 58. The high voltage amplifier 58 amplifies the low voltage input to a high voltage output.

The high voltage amplifier 58 is electrically coupled to the actuators in the DM actuator array 70 mechanically operating the DM mirror 16 in the DM assembly 10. A signal line 64 and a return line 67 provide an embodiment of an electrical coupling means between the high voltage amplifier 58 and the DM actuator array 70. The high voltage amplifier 58 is typically a linear amplifier, and the high voltage output corresponds to a linear operating region for the actuators in the DM actuator array 70.

The DM driver electronics 40 also includes analog/digital feedback and error detection logic 61, which is used to determine operational status of the DM driver electronics 40. The DM driver electronics 40 further includes a switch array 50, which comprises switches used to control charge to and from the actuators in the DM actuator array 70.

The DM processor 49 OPENS and CLOSES switches in the switch array 50 by sending address commands, e.g., digital words on a parallel data bus, to the address/control logic 46, which, in turn, controls the switches in the switch array 50. In alternative embodiments, the address/control logic 46 comprises an interpreter, decoder, or other processing unit (not shown) to receive and process higher level address commands that specify switch selection.

The DM driver electronics 40 may further include power converters to provide low-level logic voltages (e.g., +5V, −5V) and high voltage drive signals (e.g., 110 volts). The power converters 43 are typically DC-to-DC converters, but may optionally be AC-to-DC converters.

In operation, the DM processor 49 receives DM command frames 89 from the external system 88 via the interface 48. The DM command frames 89 include digital data, typically 16-bit data, for commanding individual actuators in the DM actuator array 70. The DM processor 49 parses the DM command frames 89 for individual actuator commands.

The DM processor 49 optionally stores the DM command frames 89 to the memory 52. The processor may also recall previous DM command frames 89 from the memory 52.

The DM processor 49 may perform processing on the DM command frames 89 before issuing the digital data to the D/A converter 55. Analog signals that are output from the D/A converter 55 are transmitted to the high voltage amplifier 58, which are used to drive the actuators in the DM actuator array 70.

In addition to directing the high voltage amplifier 58, the DM processor 49 selects (i.e., supervises OPENING and CLOSING) of one or more switches in the switch array 50. Actuators coupled to the CLOSED switch(es) respond to the output of the high voltage amplifier 58. Selecting switches to selectably enable and disable actuators responding to the high voltage amplifier is referred to as "multiplexing".

The DM processor 49 updates the DM mirror 16 with the DM command frames 89—first DM command frame 89a, referred to hereafter as the "previous" DM command frame 89a, then DM command frame 89b, referred to hereafter as the "present" DM command frame 89b. The process repeats for however many DM command frames 89 are received.

It should be understood that the higher the density of the DM actuator array 70, the higher the resolution of the DM. For example, a DM with thirty-seven actuators has a significantly lower resolution than a DM with three hundred forty-nine actuators over the same or slightly larger mirror area. But, higher resolution comes with some tradeoffs, including mirror update rates and power required by the electronics used to drive the actuators. Thus, to improve update rates, the actuators in the DM actuator array 70 may be subdivided into zones. When subdivided into zones, the DM actuator array 70 is driven by more than one amplifier, which allows updating mirror zones in parallel.

Figure 3:
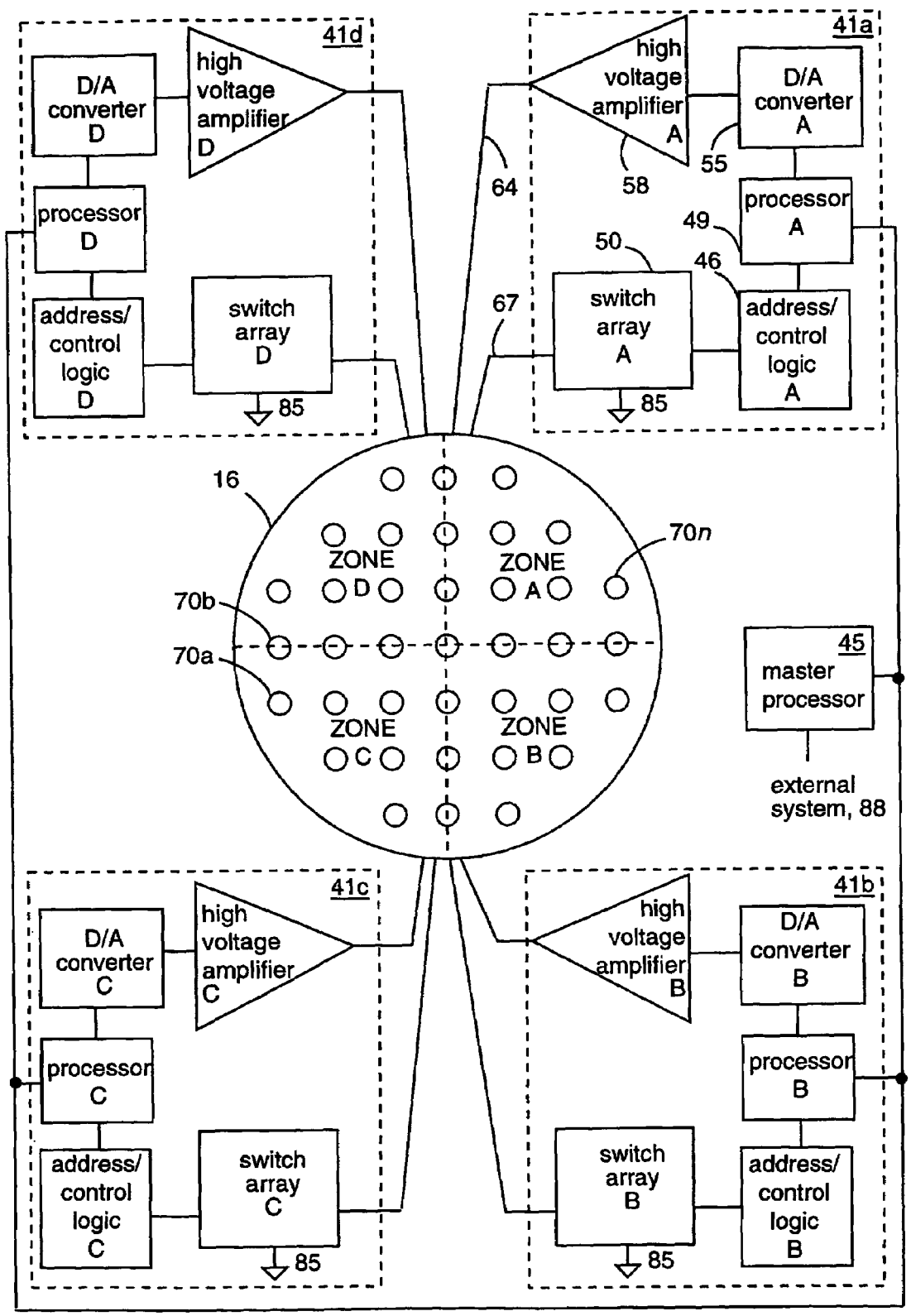
FIG. 3 is a schematic diagram of the DM driver electronics of FIG. 1 having multiple zones.

FIG. 3 is an alternative embodiment of the DM driver electronics system of FIG. 2 in which a so-called "zone" arrangement has been defined. In the embodiment shown, the DM mirror 16 has been separated into a zone A, zone B, zone C, and zone D. The DM driver electronics 40 comprise a corresponding set of four zones. Each DM driver electronics zone 41A, 41B, 41C, 41D (collectively, 41) includes basic electronics, corresponding to a subset of the DM driver electronics 40 (FIG. 2), to drive a respective DM assembly 10 mirror zone in a multiplexed manner. Physical separation of signal electrodes of the actuators in the separate zones is done to allow different amplifiers to drive different zones of actuators in the actuator array 70.

Separating the DM actuator array 70 and DM driver electronics 40 (FIG. 2) into zones 41 improves a raster rate. The raster rate is defined as the time to scan through each actuator in a DM mirror zone and update respective actuator storage energies (e.g., voltage levels), or the raster rate may be defined as the time it takes to update all of the DM actuators. An improved raster rate corresponds to an increase in frame rate capability for the adaptive optics system (FIG. 1). An increase in frame rate capability results in an increase in the bandwidth of the system, and, thus, reduction in a mean (i.e., average) error remaining in the compensated light beam 22 (FIG. 1), laser beam, or image. For example, a 1 Hz frame rate can be increased to a 4 Hz frame rate (10 Hz to 40 Hz, etc.) using a quadrant approach as depicted in FIG. 3. At the cost of higher power consumption, higher raster rates (and, consequently, higher frame rates) can be achieved by further subdividing the DM actuator array 70 and DM driver electronics 40.

In one embodiment, each of the DM driver electronics zones 41 include a processor 49, control logic 46, switch array 50, D/A converter 55, and high voltage amplifier 58. A master processor 45 may be employed to control or support the processors 49. Alternatively, the DM driver electronics zones 41 include a subset of the electronics (e.g., a D/A converter 55 and high voltage amplifier 58), in which case a single processor 49 controls the operation of individual or subsets of DM driver electronics zones 41.

By way of example, a master processor 45 receives the DM command frames 89 from the external system 88. The master processor 45 parses the command frames 89 to disburse actuator (or zone) commands to respective processors 49. In turn, the processors 49 employ associated electronics to apply the commands to respective actuators. Other functions typically performed on the command frames 89 by the processors 49 may be executed by one or more master processors 45 to off-load processing steps from the processors 49 to improve data throughput and increase raster rates.

Figure 4:
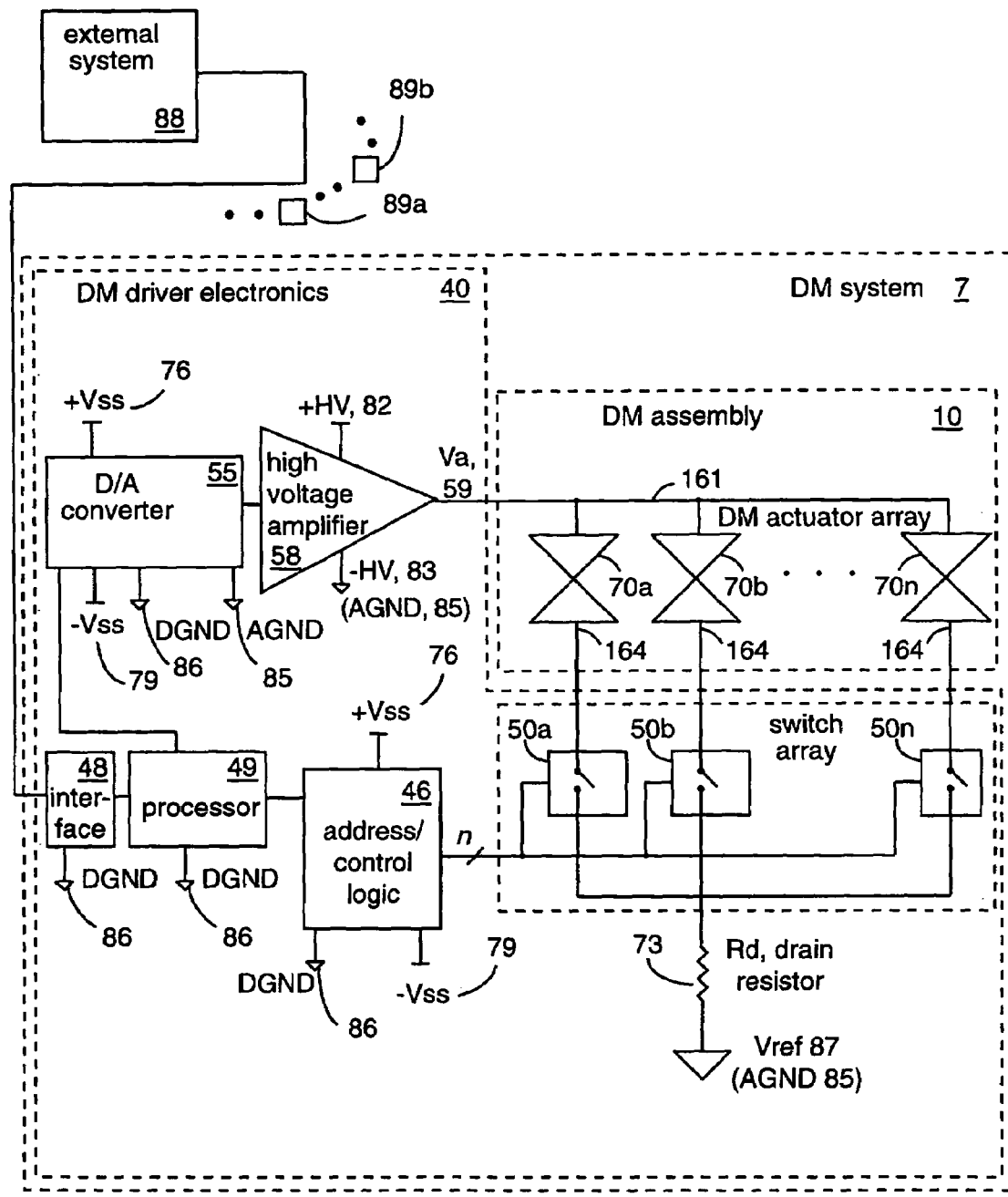
FIG. 4 is a schematic diagram of the DM of FIG. 1 having an actuator array electrically coupled to a switch array in the DM driver electronics of FIG. 2.

FIG. 4 is a schematic diagram of the DM assembly 10 coupled to the DM driver electronics 40. The DM assembly 10 comprises a plurality of actuators 70a, 70b, ..., 70n (collectively referred to as the DM actuator array 70). The actuators in the DM actuator array 70 have signal electrodes 161 and reference electrodes 164. Via the reference electrodes 164, the actuators in the DM actuator array 70 are electrically coupled to respective switches 50a, 50b, ..., 50n (collectively referred to as the switch array 50). Via the signal electrodes 161, the actuators in the DM actuator array 70 are electrically coupled to the output of the high voltage amplifier 58. Via the reference electrodes 164, the actuators in the DM actuator array 70 are electrically coupled to the switches in the switch array 50, and ultimately to a reference node, Vref 87.

The DM driver electronics 40 includes a subset of the electronics depicted in FIG. 2. As discussed above, the external system 88 issues DM command frames 89 to the DM processor 49 in the DM driver electronics 40 via the interface 48. The DM processor 49 processes the DM command frames 89, which include information for controlling other electronics, such as the D/A converter 55, high voltage amplifier 58, address/control logic 46, and switch array 50.

Power supplies provide supply voltages and currents to the electronics in the DM driver electronics 40. The high voltage amplifier 58 receives a high voltage power supply output, +HV 82, and a reference voltage level, −HV 83. To operate in the linear region of PMN actuators, voltages between forty volts (40V) and one hundred volts (100V) are applied to the actuators. So, to account for amplifier losses, the +HV 82 voltage level is set to 110 volts. The −HV 83 voltage level is set below 40V, e.g., zero volts, which is analog ground AGND 85. The high voltage amplifier 58, therefore, is capable of providing voltages between 0V−+ 40V and +100V to the actuators in the DM actuator array 70.

Other voltage levels from power supplies are +Vss 76 (e.g., +3.3V or +5V), −Vss 79 (e.g., −3.3V or −5V), DGND (digital ground) 86, AGND (analog ground) 85, and Vref 87.

In this example, Vref 87 and AGND 85 are coupled together. Standard circuit board layout techniques are used to couple AGND 85, DGND 86, and Vref 87 (i.e., make a common reference node) since they are all of the same potential, 0V.

In operation, the switches in the switch array 50 are typically OPENED and CLOSED in a pre-determined sequence. However, the switches may optionally be OPENED and CLOSED in a pseudo-random sequence, non-sequential order, or other sequence determined during operation by (i) the DM processor 49 employing a custom control process or (ii) the external system 88. If the switch 51*a* is CLOSED, the actuator 70*a* changes length in proportion to the difference between the high voltage amplifier output, Va 59, and AGND 85. Current flows from (or to) the high voltage amplifier 58 through the actuator 70*a*, switch 50*a*, a drain resistor 73, and AGND 85.

The resistance of the drain resistor 73 corresponds to a value selected for limiting the current flow through the electrical elements (i.e., current flow path) 58, 70*a*, 50*a*, 73, and 85. The drain resistor 73, a passive electrical element, is optionally used to protect against excessive current through the elements in the path due to a potential of undesirable current discharge through the switch 50*a*. Current discharge is a result of CLOSING the switch 50*a* while there is a voltage difference between the voltage stored by the actuator 70*a* and the voltage output by the high voltage amplifier 58. A high current through the elements can also be caused by changing the high voltage amplifier 58 output, Va 59, rapidly while at least one switch in the switch array 50 is CLOSED.

The raster rate of the DM system 7 is determined by how quickly the DM actuator array 70 can be updated with a present DM command frame 89*b* set of values. The raster rate is generally determined by the speed of the electronics and the time constant of the actuators in conjunction with current drive, electrical resistance, and, theoretically, mechanical load.

The speed of the electronics is determined by at least the DM processor 49, D/A converter 55, high voltage amplifier 58, address/control logic 46, and the switch array 50. The high voltage amplifier 58 defines the current drive to the actuators, and the time constant is determined by the capacitance of the actuators in the DM actuator array 70, in conjunction with the resistance of the drain resistor 73 and array of switches 50.

The mechanical load is defined by the intrinsic electromechanical properties of the actuators in the DM actuator array 70, including stiffness, in combination with the stiffness of the DM mirror 16 (not shown), the actuator spacing, other assembly-related effects, and other structural-related properties, including typical mass-spring-damper structural properties.

FIG. 5A–5F include various embodiments of the DM driver electronics 40.

Figure 5A:
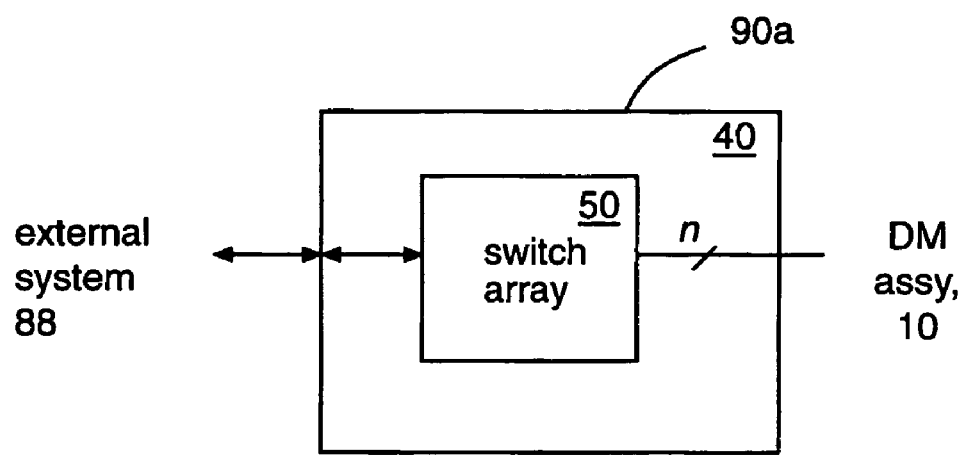
FIGS. 5A–5F include schematic diagrams of various embodiments of the DM driver electronics of FIG. 2.

FIG. 5A is a schematic diagram of a first embodiment 90*a* of the DM driver electronics 40. In the embodiment 90*a*, the DM driver electronics 40 includes only the switch array 50. Control of the switches in the switch array 50 is performed directly by the external system 88.

Figure 5B:
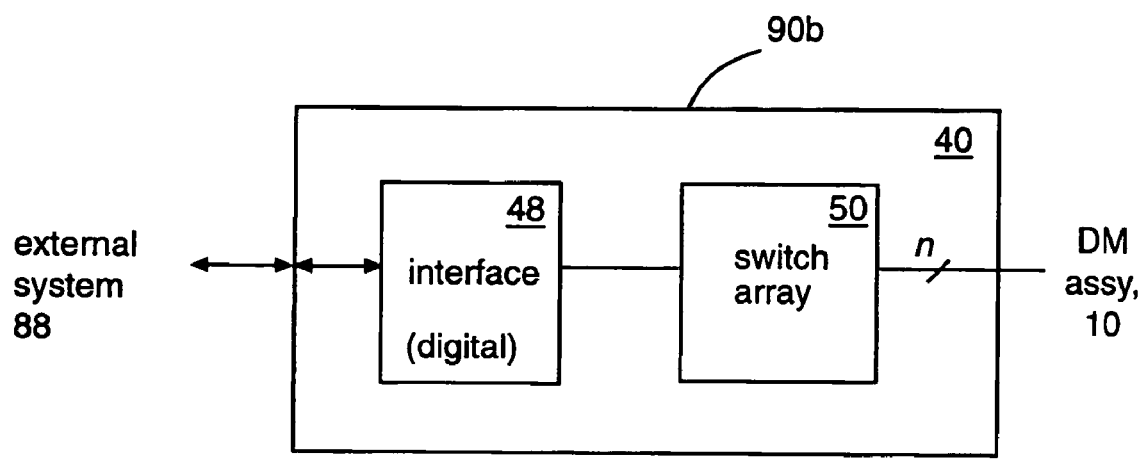

FIG. 5B is a schematic diagram of a second embodiment 90*b* of the DM driver electronics 40. In the second embodiment 90*b*, the DM driver electronics 40 includes the DM driver electronics interface 48 and the switch array 50. The DM driver electronics interface 48 may include a digital buffer (not shown) for storing switch commands from the external system 88. For both embodiments 90*a* and 90*b*, the high voltage amplifier 58 (FIG. 4) used to drive the actuators in the DM actuator array 70 (FIG. 4) is located in the external system 88; the logic used to address/control the switches in the switch array 50 is also located in the external system 88.

Figure 5C:
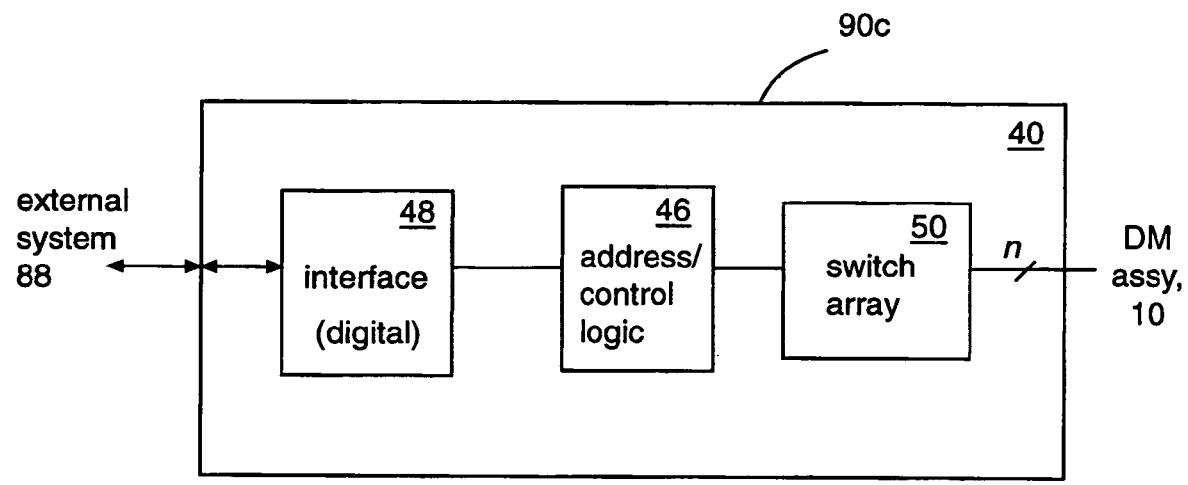

FIG. 5C is a schematic diagram of a third embodiment 90*c* of the DM driver electronics 40. In the third embodiment 90*c*, the DM driver electronics 40 includes the DM driver electronics interface 48, address/control logic 46, and the switch array 50. In the third embodiment 90*c*, the high voltage amplification and switch selection processing are done by the external system 88. The address/control logic 46 in the DM driver electronics 40 reduces the number of lines required by the external system 88 to communicate with the switches in the switch array 50.

Figure 5D:
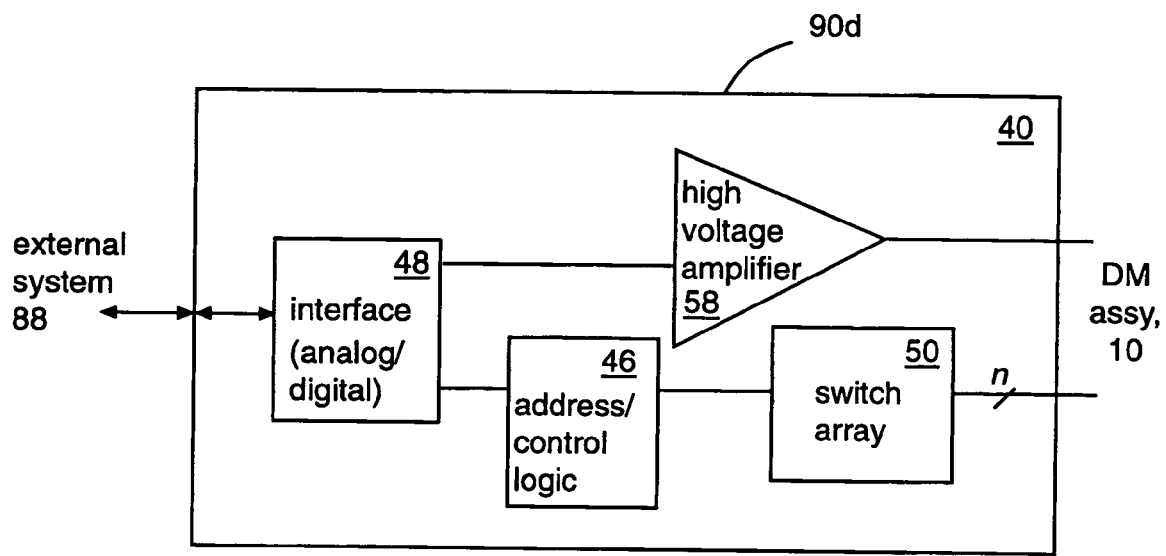

FIG. 5D is a schematic diagram of a fourth embodiment 90*d* of the DM driver electronics 40. In the fourth embodiment 90*d*, the DM driver electronics 40 comprises the DM driver electronics interface 48, high voltage amplifier 58, address/control logic 46, and switch array 50. Because there is no D/A converter 55 in the fourth embodiment 90*d*, the DM driver electronics interface 48 comprises analog and digital interface circuitry, where the analog interface portion is typically a +/−10V buffer amplifier (not shown) that is coupled to the high voltage amplifier 58. The analog interface circuitry may further comprise a sample-and-hold element to store the analog input from the external system 88.

Figure 5E:
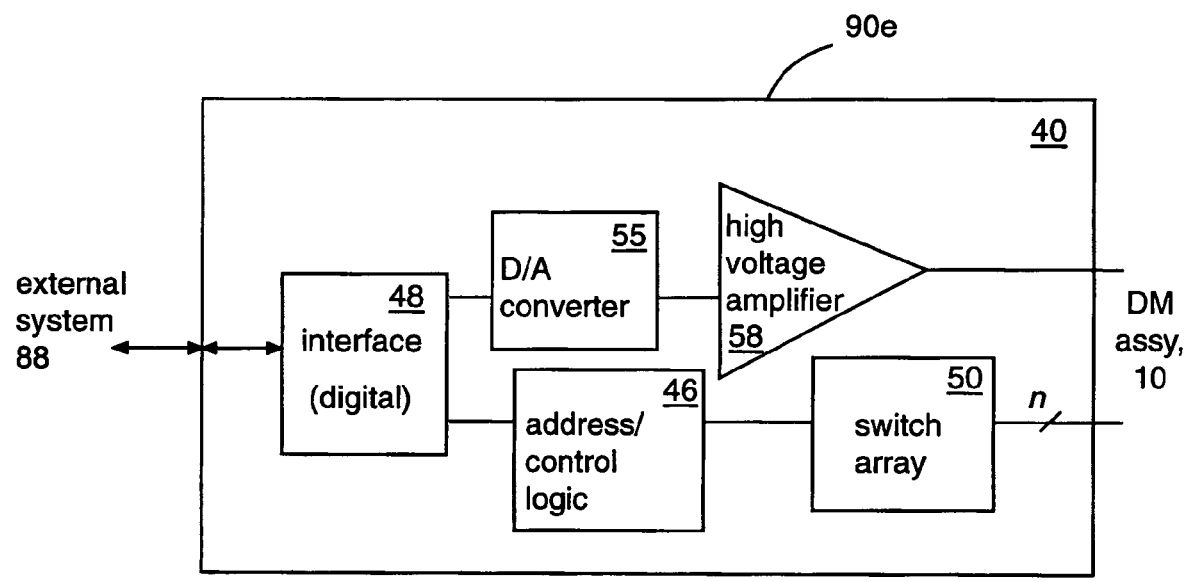

FIG. 5E is a schematic diagram of a fifth embodiment 90*e* of the DM driver electronics 40. In the fifth embodiment 90*e*, the DM driver electronics 40 comprises the DM driver electronics interface 48, D/A converter 55, high voltage amplifier 58, address/control logic 46, and switch array 50. Because the fifth embodiment 90*e* comprises a D/A converter 55, the external system 88 can provide both the actuator commands and the switch commands in a digital format.

Figure 5F:
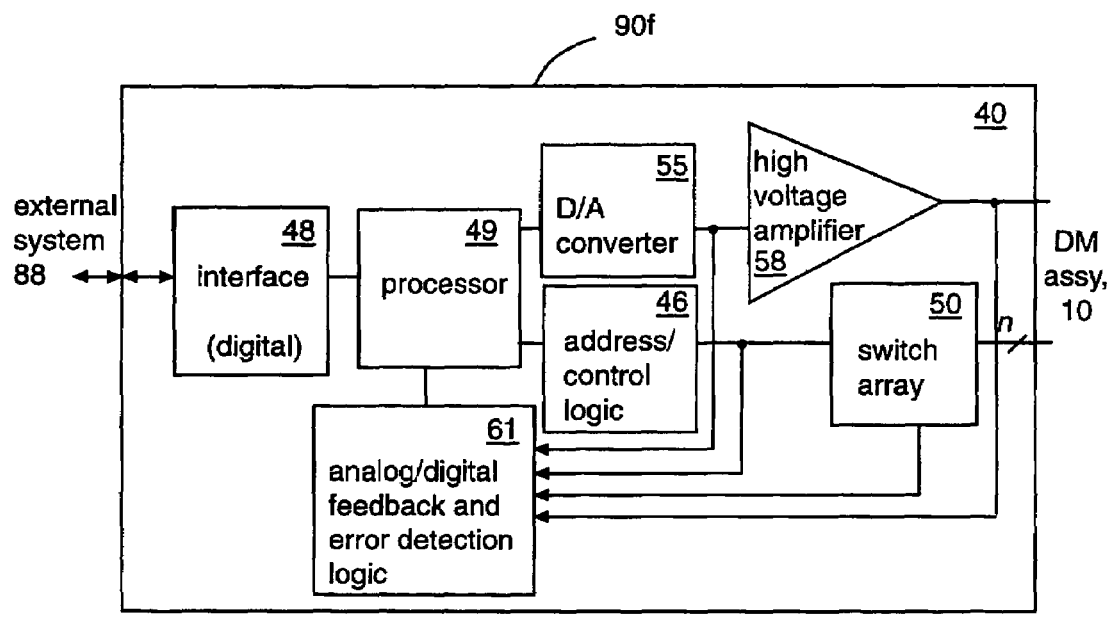

FIG. 5F is a schematic diagram of a sixth embodiment 90*f* of the DM driver electronics 40. In the sixth embodiment 90*f*, the DM driver electronics 40 comprises the DM driver electronics interface 48, DM processor 49, D/A converter 55, high voltage amplifier 58, address/control logic 46, switch array 50, and error detection logic 61.

The sixth embodiment 90*f* provides full support to the external system 88 because of the DM processor 49, which includes intelligence to receive, parse, interpret, and process DM command frames 89. The DM processor 49 further includes intelligence to transmit information back to the external system 88 via the DM driver electronics interface 48. Further, the DM processor 49 coordinates control of the high voltage amplifier 58 with control of the switch array 50, thereby off-loading external system 88 responsibilities.

In the embodiments 90*b*–90*f* of the DM driver electronics 40, the DM driver electronics interface 48 comprises at least one of digital, RF, IR, or optical fiber interfacing means. The six embodiments 90*a*–90*f* are exemplary. Other subsets of the devices depicted in the six embodiments 90*a*–90*f* may be combined to form an alternative embodiment. Devices not depicted in the six embodiments that can expand or improve the functioning or functionality of the DM driver electronics 40 may be included with subsets of the devices depicted in the six embodiments 90*a*–90*f* to form other alternative embodiments.

It should be understood that the embodiments of FIGS. 5A–5F may be extended to support fail-safe modes. For example, multiples of each component may be included for redundancy. Multiple circuit boards having the same or subsets of the circuits may be included, with toggle circuits or mechanical switches being employed to switch between circuit boards. Divisions among functions may be specified, with distinct functions or subsets of functions, being grouped onto "daughter" or "mezzanine" boards having electrical connectors that insert into corresponding electrical connectors of a "mother" board, for ease of replacing failing functions.

Figure 6:
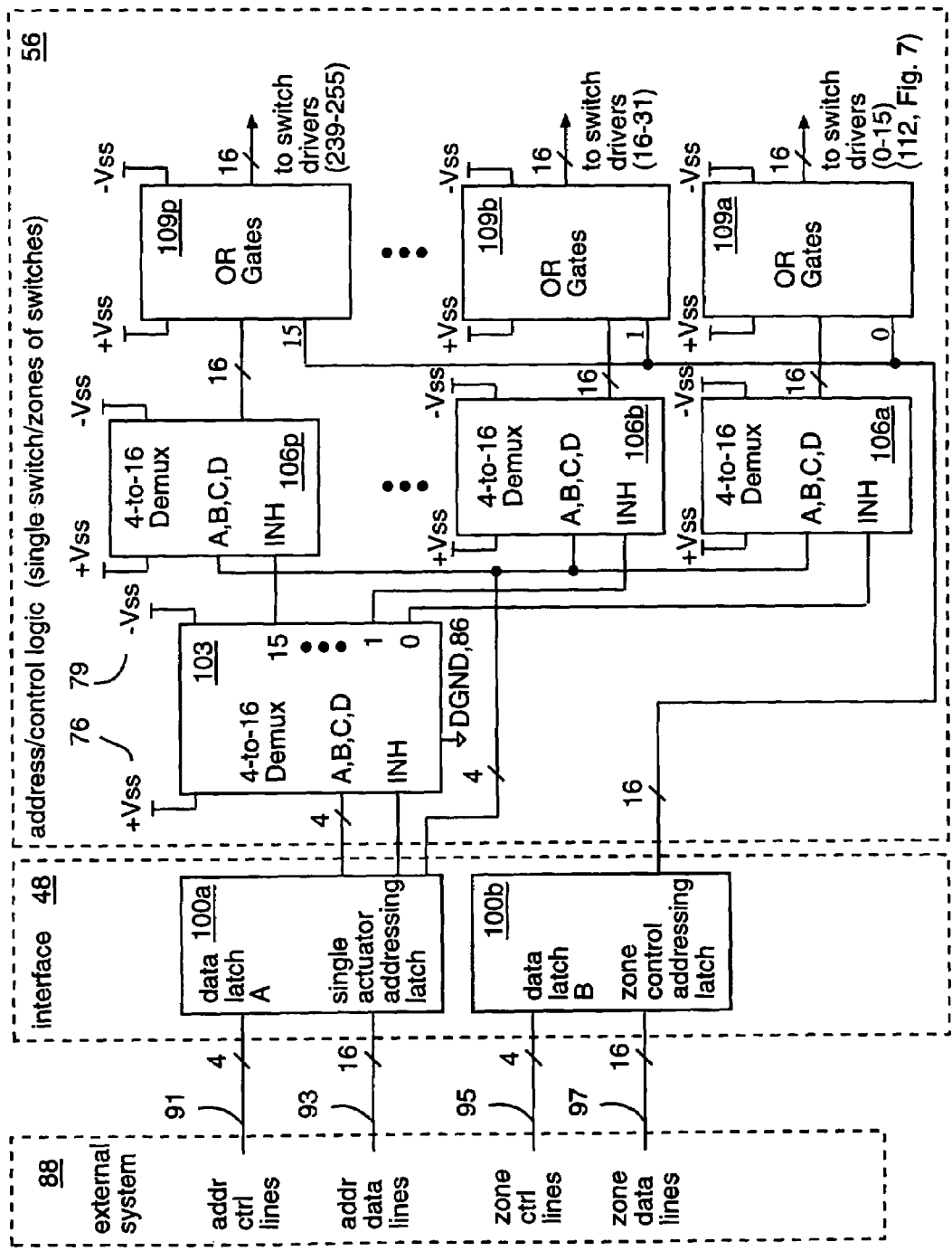
FIG. 6 is a schematic diagram of interface and address/control logic portions of the DM driver electronics of FIG. 2.

FIG. 6 is a schematic diagram of the DM driver electronics interface 48 and address/control logic 56 of the DM driver electronics 40 (FIG. 2). The external system 88 may communicate with the DM driver electronics interface 48 via address control lines 91 and address data lines 93. The address control and data lines 91, 93, respectively, are electrically coupled to data latch_A 100a, which is used for single actuator addressing. Single actuator addressing is defined as controlling a single actuator by a corresponding data value. To control a single actuator, a single actuator switch in the array of switches 50 (FIG. 4) is controlled by logic following data latch_A 100a.

The external system 88 may also communicate with the DM driver electronics interface 48 via zone control lines 95 and zone data lines 97. The zone control and data lines 95, 97, respectively, are electrically coupled to data latch_B 100b. Data latch_B 100b is used for zone control. Zone control is defined as controlling multiple actuators by a corresponding data value. To control a zone of actuators, multiple switches in the array of switches 50 are simultaneously selected (OPENED or CLOSED, depending on the embodiment of the DM driver electronics 40) by logic following data latch_B 100b. For example, if a subset of or all of the switches beyond data latch_B 100b are coupled to the actuators of zone A (FIG. 3), then a corresponding subset of or all of the actuators in zone A of the DM actuator array 70 are simultaneously enabled to be controlled by the high voltage amplifier 58 (amplifier A, FIG. 3) when the external system 88 presents data through the zone data lines 97 to data latch_B 100b. Among many uses of zone control are calibration, reduced resolution, and higher frame rate operations.

The address control logic 56 expands the number of data lines (i.e., address data lines 93) by converting the binary number represented by the signals on the data lines presented to the address control logic 56 by the data latch_A 100a. For example, in the embodiment shown, there are sixteen address data lines 93, but there are two hundred fifty-six lines electrically coupling to the switches in the switch array 50—via the switch drivers 112 (FIG. 7)—from the address control logic 56. The expansion of addressing from sixteen to two hundred fifty-six is accomplished by a first-stage 4-to-16 demultiplexer chip 103 and a plurality of second-stage 4-to-16 demultiplexer chips 106a, 106b, . . . , 106p (collectively 106). Note that the term "multiplexer," though a common industry term for this type of DM control, is a misnomer, because, in actuality, the circuit provides a one-to-many function, which is demultiplexing, rather than a many-to-one function, which is multiplexing.

In the embodiment of FIG. 6, the 4-to-16 demultiplexer chips 106 provide a 4-to-16 addressing function. The input gates of the 4-to-16 demultiplexer chips 106 are electrically coupled to low address bits from the output gates of the data latch_A 110a. Each 4-to-16 demultiplexer chip 106 converts four input data lines to one one-of-sixteen output data lines according to a standard base-two conversion method, where one of the sixteen output data lines is set to a logic value TRUE state based on the four input data lines. For example, if the four input lines are "0000", then the zero'th output bit (i.e., 2^0) of a 4-to-16 demultiplexer chip 106 is set to Boolean-TRUE. If the four input lines are set to "0001", then the first output bit (i.e., 2^1) of a 4-to-16 demultiplexer chip 106 is set to Boolean-TRUE, and so on. If, however, the inhibit (INH) input of a given 4-to-16 demultiplexer chip 103, 106 receives an active input, all outputs of the given 4-to-16 demultiplexer chip are disabled. The states of the output data lines from the 4-to-16 demultiplexer chips 106 are propagated to a set of OR gate chips 109a–109p (collectively 109).

The input gates of the first-stage 4-to-16 demultiplexer chip 103 are electrically coupled to data latch_A 100a, where the 4-to-16 demultiplexer chip 103 receives four, high, address bits. Another address bit latched by data latch_A 100a controls the inhibit (INF) function for the 4-to-16 demultiplexer chip 103. Like the second-stage 4-to-16 demultiplexer chips 106, if the inhibit line in the first-stage 4-to-16 demultiplexer chip 103 is active, all outputs from the first-stage 4-to-16 demultiplexer chip 103 are set to Boolean-FALSE, thereby inhibiting each of the second-stage 4-to-16 demultiplexer chips 106, since each output of the first-stage 4-to-16 demultiplexer chip 103 controls the inhibit line of a respective second-stage 4-to-16 demultiplexer chip 106. If the inhibit line of the first-stage 4-to-16 demultiplexer chip 103 is not active, then one of the sixteen output lines from the first-stage 4-to-16 demultiplexer chip 103 is in a Boolean-TRUE state, which uninhibits one of the second-stage 4-to-16 demultiplexer chips 106. Whichever one of the second-stage 4-to-16 demultiplexer chips 106 is uninhibited, one of the sixteen outputs from the respective second-stage 4-to-16 demultiplexer chip 106 takes on a Boolean-TRUE value, which propagates to the OR gate chips 109. Therefore, the result of the external system 88 providing address data between zero (2^0−1) and two hundred fifty-five (2^16−1) activates (i.e., CLOSES) one of the corresponding two hundred fifty-six switches in the switch array 50 (FIG. 2).

The OR gate chips 109 provide a means for controlling the DM mirror zones (FIG. 3). Each OR gate chip 109a, 109b, . . . , 109p includes sixteen individual OR gates. The zone data lines 97, electrically coupled from the external system 88 to the OR gate chips 109 via data latch_B 100b, fan out to each of the sixteen OR gates in the OR gate chips 109 to CLOSE the respective switches 50. Thus, if data latch_B 100b has one or more active lines electrically coupled to the OR gate chips 109, then the respective one or more of the OR gate chips 109 provides a Boolean-TRUE to a corresponding array of switch drivers, e.g., the switch driver 112 (FIG. 7).

Figure 7:
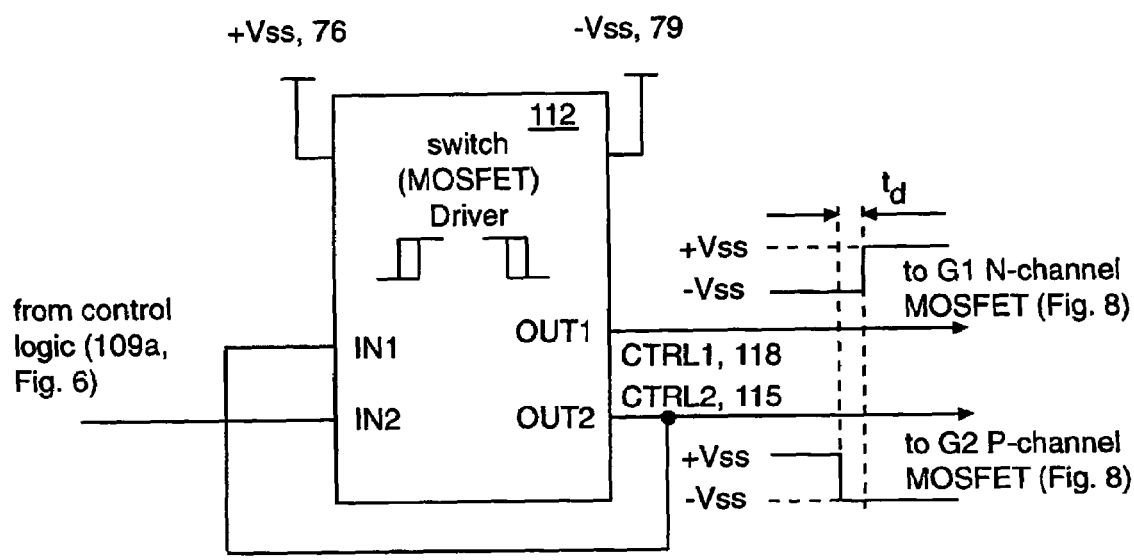
FIG. 7 is a schematic diagram of a switch driver employed by the DM driver electronics system of FIG. 2.

FIG. 7 is a schematic diagram of a dual switch driver 112 designed to drive two MOSFET switches to an ON state. An input terminal, IN2, of the switch driver 112 receives input from an output line from the OR gate 109a (FIG. 6). In turn, the switch driver 112 provides control signals, CTRL2 115 and CTRL1 118, to two MOSFET switches (e.g., Q2 124 and Q1 121, respectively, depicted in FIG. 8).

The output gate OUT2 transitions low (to −Vss) in response to an active (Boolean-TRUE) input signal to input terminal IN2. The output line CTRL2 115 from OUT2 feeds back to the input terminal IN1 of the switch driver 112. The output terminal OUT1, supplying the output signal CTRL1 118, transitions high (to +Vss) in response to an active (Boolean-FALSE, in one embodiment) input signal being applied to the input terminal IN1 of the switch driver 112.

The reason for feeding back CTRL2 115 to transition the state of CTRL1 118 is to create a small timing delay, td, for proper sequencing of the MOSFETs (FIG. 8), which are controlled by these signals. The MOSFET driver preferably has Schmitt trigger characteristics to prevent switch "chatter" during rise and fall CTRL1 and CTRL2 signal transitions. It should be understood that the switch driver 112 may take on various, suitable forms depending on the form of the switches in the switch array 50 being employed.

Figure 8:
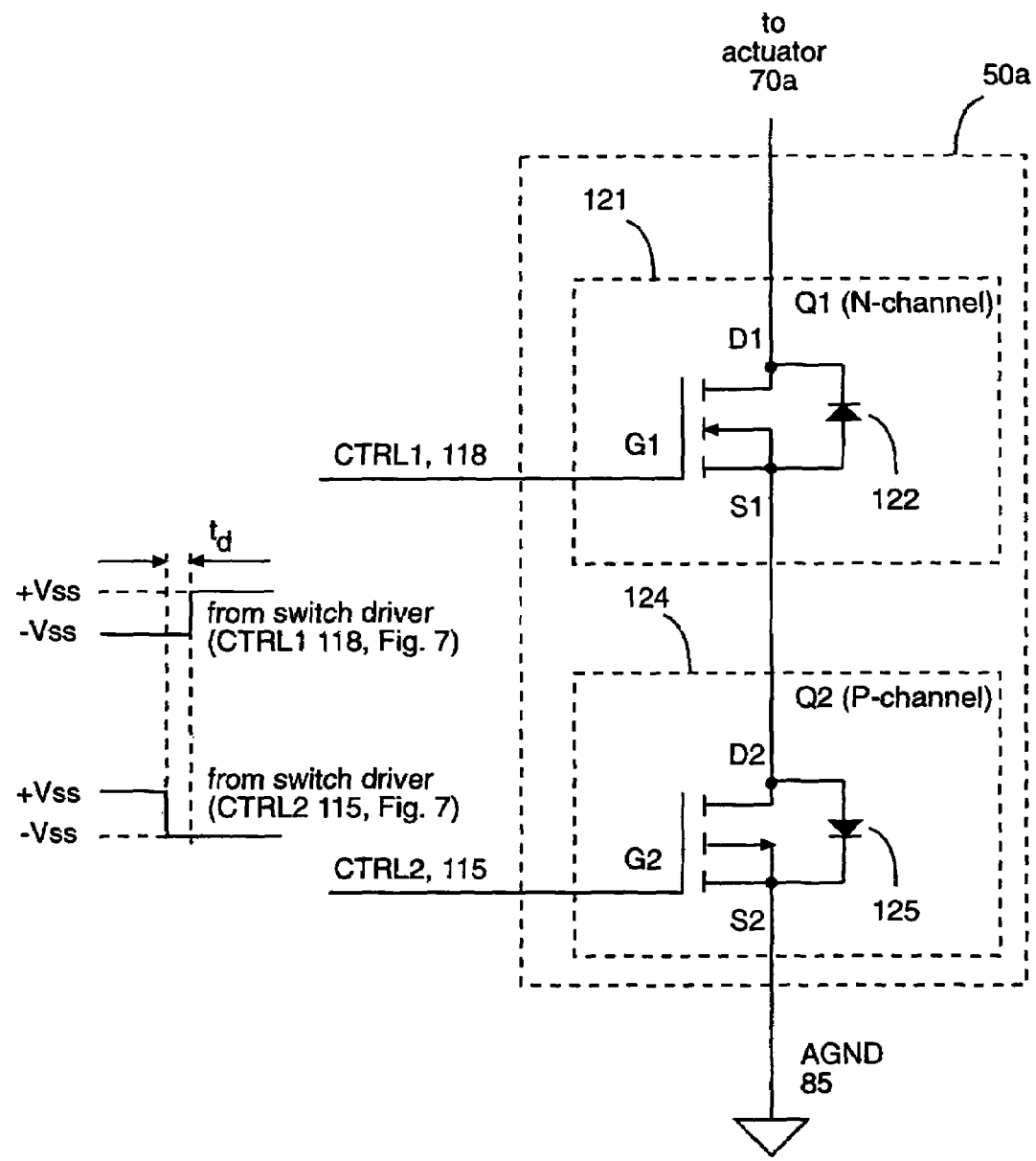
FIG. 8 is a schematic diagram of a MOSFET switch driven by the switch driver of FIG. 7.

FIG. 8 is a schematic diagram of an embodiment of the switch 50a (FIG. 4) that comprises an N-channel MOSFET, Q1 121, and a P-channel MOSFET, Q2 124. The MOSFETs Q1, Q2 are electrically coupled in an arrangement designed to withstand high voltage and prevent leakage current while in an electrically OPEN state, also referred to as a high-impedance state.

Q1 comprises three terminals: a gate, G1, a drain, D1, and a source, S1. Q2 comprises three terminals: a gate, G2, a drain, D2, and a source, S2. Because Q1 is an N-Channel MOSFET, it is sometimes convenient to refer to Q1, G1, D1, S1 as On, Gn, Dn, and Sn. Likewise, because Q2 is a P-Channel MOSFET, it is also sometimes convenient to refer to Q2, G2, D2, and S2 as Qp, Gp, Dp, and Sp.

Q1 changes state in response to CTRL1 118. Q2 changes state in response to CTRL2 115. Changing state means switching from an extremely high impedance to a very low impedance or from a very low impedance to an extremely high impedance. The impedances of MOSFETS Q1 and Q2 are measured between respective drain and source terminals (i.e., D1-S1 and D2-S2). When both Q1 and Q2 are in OPEN states, the actuator 70a, to which Q1-D1 is electrically coupled, is defined to be "floating". When Q1 121 and Q2 124 are in the CLOSED state, the actuator 70a becomes part of a closed circuit between the high voltage amplifier 58 (FIG. 4) and AGND 85.

In the embodiment of FIG. 8, it is preferable to switch Q2 124 into a CLOSED state prior to switching Q1 into a CLOSED state because MOSFET switches operate according to a voltage differential between the gate and source. In other words, for proper operation of a MOSFET, the MOSFET source (e.g., Q2-S2) is expected to be at a reference voltage potential (e.g., zero volts). The MOSFET changes operational state, from high impedance to low impedance (OPEN to CLOSED), when the MOSFET gate (e.g., Q2-G2) exceeds a voltage potential greater than a specified value, for example 2.5V, above (N-Channel) or below (P-Channel) the voltage potential of the MOSFET source. In this instance, closing Q2 124 by applying −Vss to Q2-G2 applies AGND 85 from Q2-S2 to Q2-D2; therefore, AGND 85 is effectively applied to Q1-S1. Therefore, a zero voltage potential at Q1-S1 allows the application of +Vss to Q1-G1 to effectuate a state change in Q1 from OPEN to CLOSED. Therefore, applying −Vss to Q2-G2 then applying +Vss to Q1-G1 properly and safely couples AGND 85 to the reference electrode of actuator 70a through the low impedances of Q1 and Q2. The impedance can range to values much less than 1-ohm in advanced MOSFET technologies.

Finally, the arrangement of the P-channel and N-channel MOSFETs Q2, Q1, respectively, provides a restriction on leakage current when each is in the high-impedance (OPEN) state. Q2 has an internal MOSFET diode 125, which is common in the P-channel MOSFET technology. Q1 has an internal MOSFET diode 122, which is common in the N-channel MOSFET technology. Note that zener diodes are another form of a diode in MOSFET devices.

Because the emitters of the internal MOSFET diodes 125, 122 face away from each other, leakage current is prevented from flowing in either direction when both MOSFETs Q2, Q1 are in an OPEN state. The internal MOSFET diodes 125, 122 are effectively shunted by the respective drain-source paths when the MOSFETs Q2, Q1 are in a CLOSED state.

Figure 11A:
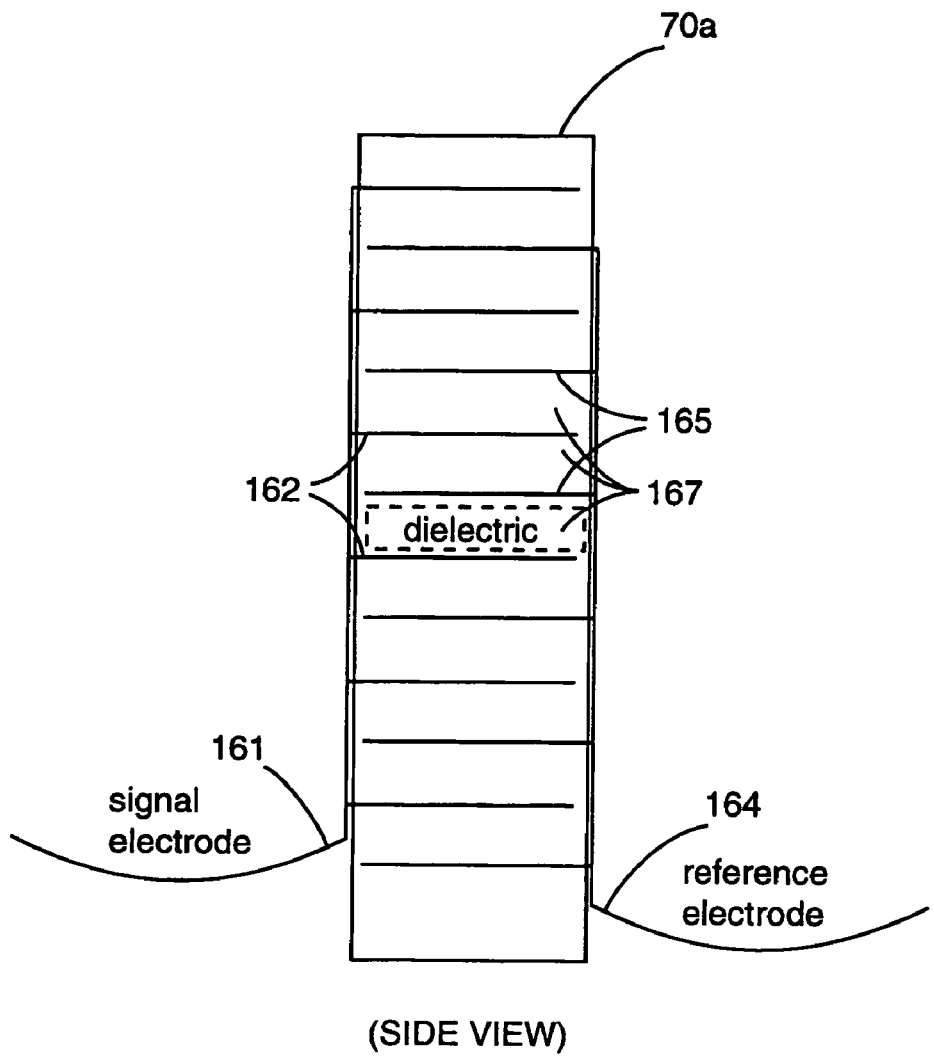
FIG. 11A is a mechanical schematic diagram of an actuator used in the DM assembly of FIG. 1.
Figure 11B:
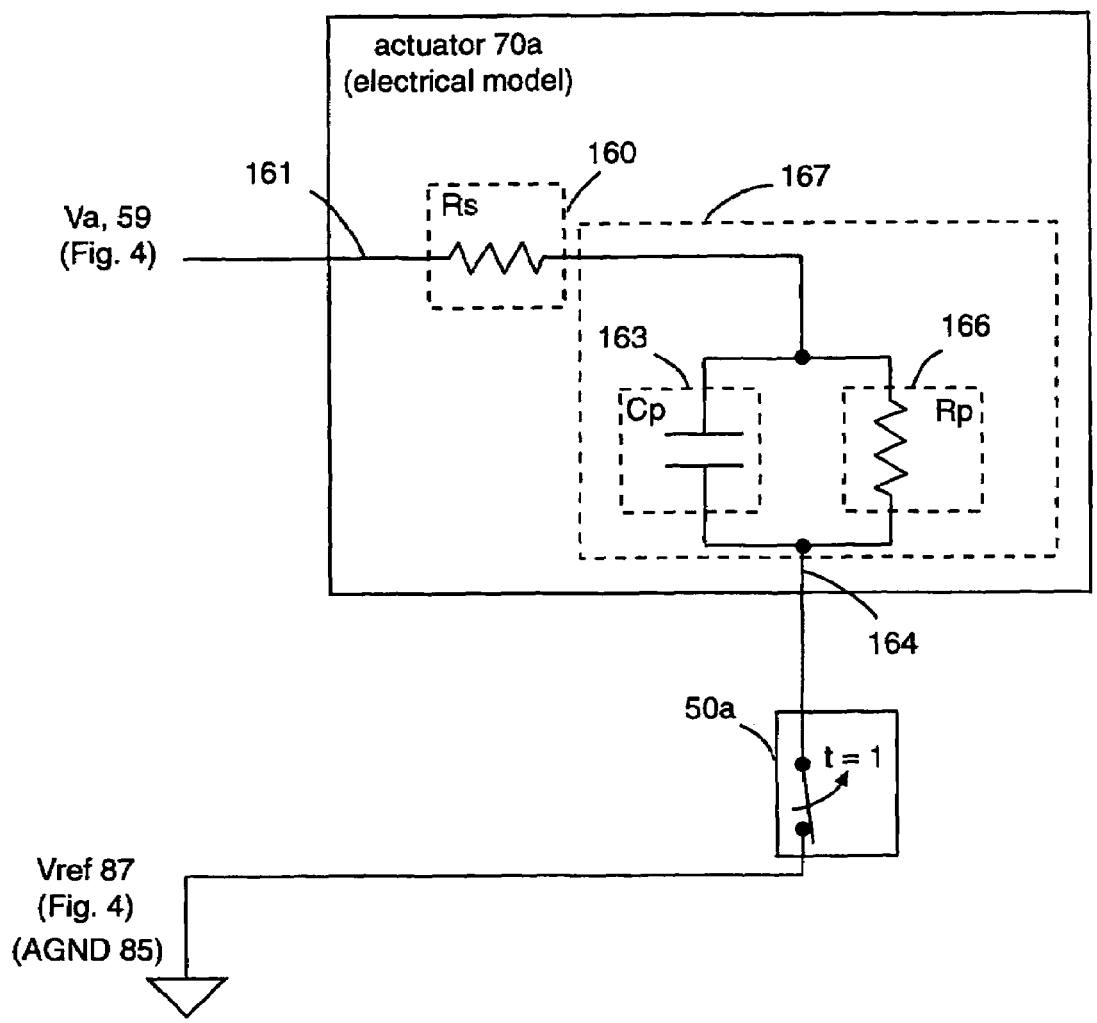
FIG. 11B is an electrical schematic diagram corresponding to the mechanical schematic diagram of FIG. 11A.

It should be understood that the actuator 70a acts as a capacitor due its electrical properties (see an electrical model in FIG. 11B). If the amplifier 58 (FIG. 4) output is lower than the voltage potential across the actuator 70a, then current tries to flow from AGND 85 through the actuator to the amplifier 58. If the amplifier 58 output is higher than the voltage potential across the actuator 70a, then current tries to flow from the amplifier 58 through the actuator 70a to AGND 85. In the first case, the internal MOSFET diode 125 prevents leakage current flow to the actuator 70a when Q2 is in the OPEN state; in the second case, the internal MOSFET diode 122 prevents leakage current flow from the actuator 70a to AGND 85 when Q1 is in the OPEN state.

One problem created by leakage current is that leakage current allows a voltage change across the actuator 70a, as understood from the voltage equation corresponding to the current equation, i=C*dv/dt, for a capacitor. The voltage change causes a length change in the actuator 70a. A length change in the actuator 70a causes a figure change on the DM mirror 16 (FIG. 1). A figure change on the DM mirror 16 causes an error in the optical wavefront that is uncorrectable by other, non-deformable, optical elements in the system. Thus, the switch 50a prevents the DM mirror 16 from undesirably changing shape at the location of actuator 70a when the power amplifier 58 is providing a control signal to at least one other actuator. By implication, by employing the switch 50 to be the "building block" for the array of switches 50 (FIG. 4), the DM driver electronics 40 holds the surface figure of the DM mirror 16 constant across the entire DM mirror 16 (i.e., at all actuator locations) unless the DM driver electronics 40 actively choose to change the surface figure.

Figure 9:
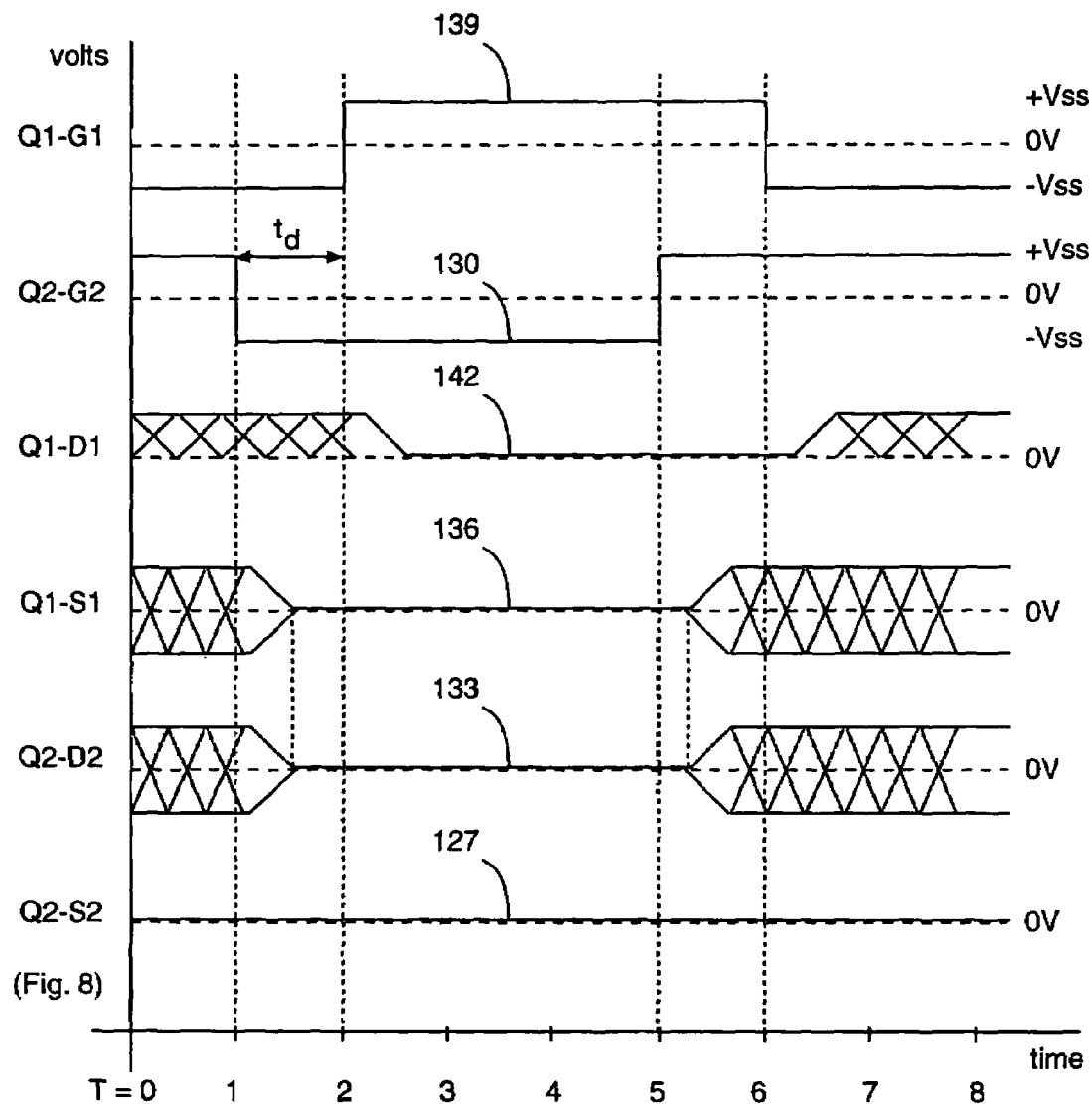
FIG. 9 is a timing diagram including switch control and logic level timing associated with the switch of FIG. 8.

FIG. 9 is a timing diagram illustrating the voltage level relationships at nodes of the switch 50a, as discussed in reference to FIG. 8. During the entire sequence, a Q2-S2 waveform 127 remains at AGND 85, or zero volts. Upon Q2-G2 receiving an active signal, −Vss, a Q2-G2 waveform 130 transitions from +Vss (inactive) to −Vss (active), which puts the P-channel MOSFET into an active state (i.e., CLOSED). A Q2-D2 waveform 133 and a Q1-S1 waveform 136 become electrically coupled through the Q2 D2-S2 path because the Q2 switch is CLOSED, thus having a zero volt (0V) potential slightly after T=1. At T=2, a Q1-G1 waveform 139 goes into an active state (i.e., positive voltage). The time differential, Td, between Q2-G2 going active at T=1 and Q1-G1 going active at T=2 is controlled by the delay in the switch driver 112 (FIG. 7). At T=2, a Q1-D1 waveform 142 shows that Q1-D1 achieves a zero voltage potential. At this point, the actuator 70a is electrically coupled to AGND 85.

To isolate the actuator 70a from AGND 85 again, the above procedure is reversed by driving Q2-G2 to an inactive state (+Vss), followed by driving Q1-G1 to an inactive state (−Vss). Thus, Q2-D2, Q1-S1, and Q2-D2 return to an electrically "floating" condition from AGND 85, which disables the actuator 70a from being controlled by the high voltage amplifier 58.

Figure 10:
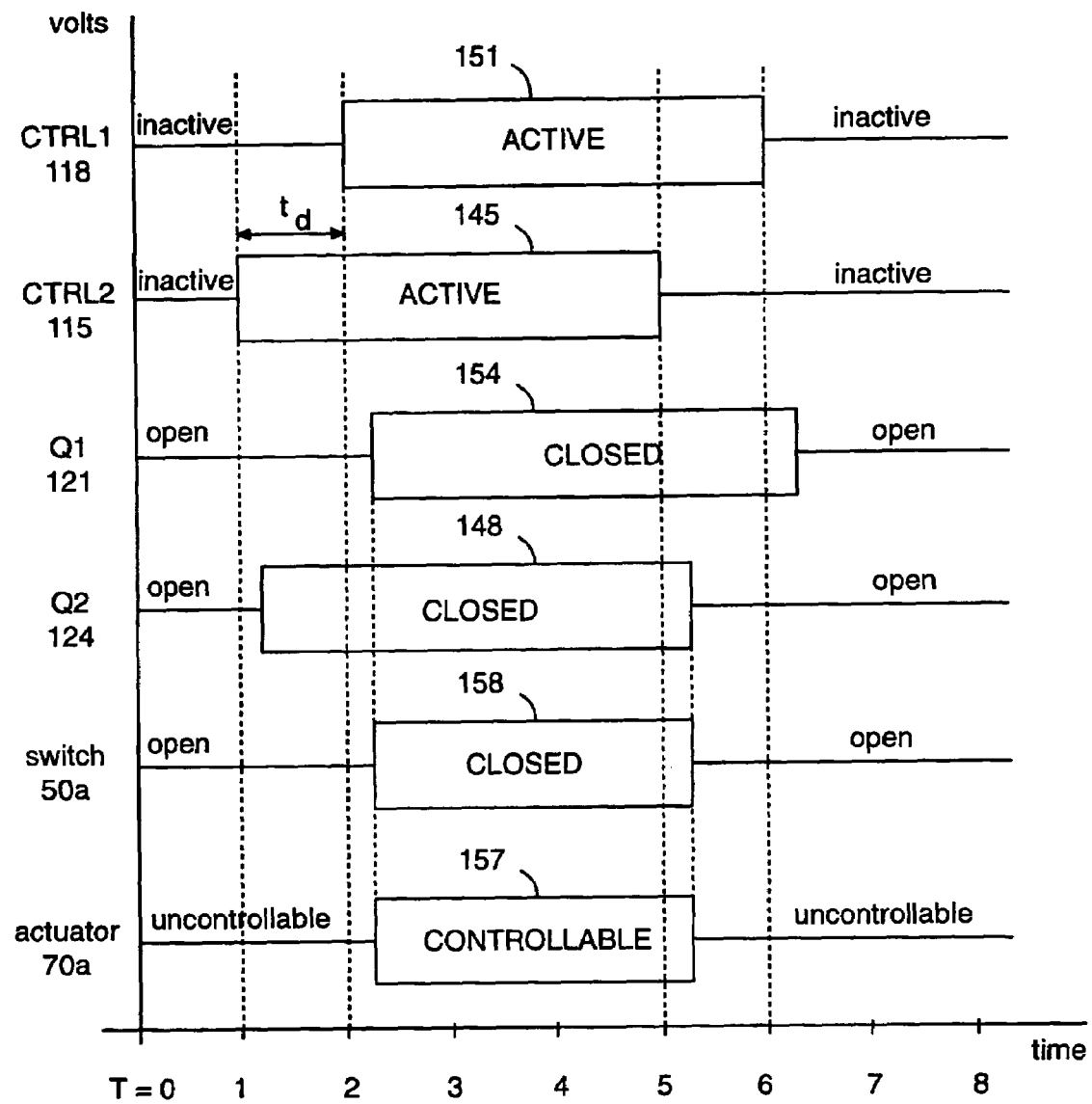
FIG. 10 is a timing diagram including switch control, switch functional timing waveforms, and actuator functional timing waveforms associated with the switch of FIG. 8.

FIG. 10 is a functional diagram describing the operational sequence of FIG. 8. At T=0, both CTRL1 118 and CTRL2 115 are inactive, as depicted by a respective CTRL1 functional waveform 151 and a CTRL2 functional waveform 145. At T=1, the CTRL2 functional waveform 145 enters an active state. Immediately after CTRL2 115 goes into the active state, Q2 124 changes from an OPEN state to a CLOSED state, as depicted by a Q2 functional waveform 148.

At T=2, CTRL1 118 transitions from inactive to active, as indicated by the CTRL1 functional waveform 151. Immediately following the transition of CTRL1 118 to an active state, Q1 121 changes from an OPEN state to a CLOSED state, as depicted by a Q1 functional waveform 154. At that point, both Q1 121 and Q2 124 are CLOSED, and the switch 50*a* (FIG. 8) is said to be in a CLOSED state, as indicated by a switch functional waveform 158.

As a result of the switch 50*a* being in a CLOSED state, the actuator 70*a*, which was in an uncontrollable state as indicated by an actuator functional waveform 157 between T=0 and T=2 plus a small delay, enters into a controllable state, as indicated by the actuator functional waveform 157 between T=2 and T=5. When the actuator 70*a* is in a controllable state, the high voltage amplifier 58 can apply a voltage increase or decrease to the actuator 70*a*, so as to change the length of the actuator 70*a*.

The actuator 70*a* remains controllable until CTRL2 115 re-enters an inactive state at T=5. Without CTRL2 providing an active signal, Q2 enters into an OPEN state, thus OPENING the switch 50*a*, as indicated by the switch functional waveform 158. At T=6, CTRL1 changes state from active to inactive, as indicated by the CTRL1 functional waveform 151, and Q1 121 responsively enters into an OPEN state, as indicated by the Q1 functional waveform 154. It should be understood that when either Q1 121 or Q2 124 is in an OPEN state, the actuator 70*a* is uncontrollable because it is effectively disconnected from AGND 85 (FIG. 8).

FIG. 11A is a mechanical schematic diagram that indicates the relationship between actuator electrodes and the dielectric material of the actuator 70*a* (FIG. 4). A signal electrode 161, comprising a plurality of signal electrode plates 162, is isolated from a reference electrode 164, comprising a plurality of reference electrode plates 165, by dielectric layers 167. It should be understood that the actuator 70*a* may be composed of as few as a single signal electrode plate 162 and a single reference electrode plate 165, isolated from each other by a single dielectric layer 167.

A voltage differential between the signal electrode 161 and the reference electrode 164 imparts an electric field across the dielectric layers 167. The electric field across the dielectric layers 167 causes a length change of the actuator 70*a*, in both axial and radial directions for most ceramic formulations (e.g., PMN). For the actuator 50*a* of FIG. 11A, the length change is designed to occur more in the axial direction than in the radial direction since the actuator 50*a* is mechanically coupled to the DM mirror 16 at one end and the DM baseplate 232 (FIG. 18) at the other end. Because the dielectric layers 167 are in parallel with each other, the length change is roughly determined in the axial direction as a function of the number of signal electrode/dielectric layer/reference electrode "sandwiches" composing the actuator 70*a*.

Since PMN ceramic material is non-polarized (as opposed to PZT ceramic material), the signal electrodes 161 and reference electrodes 164 may be coupled to the high voltage amplifier 58 (FIG. 4) and array of switches 50 (FIG. 4) interchangeably. Furthermore, it should be understood that if the high voltage amplifier 58 were to provide an output of −40V to −100V to the signal electrodes 161 of the actuators, the array of switches 50 could still be coupled to the reference electrode 164 to enable the application of the voltage differential across the dielectric layers 167 of the actuator 70*a*. Because of the bidirectional current leakage prevention characteristic of the switch 50*a* (FIG. 8), the switch 50*a* works interchangeably with positive or negative drive signals to the actuator 70*a* by the high voltage amplifier 58.

FIG. 11B is a schematic diagram of an electrical model corresponding to the actuator 70*a* (FIG. 11A) or other capacitive storage device. The actuator 70*a* includes model components: Rs (series resistance) 160, Cp (parallel capacitance) 163, and Rp (parallel resistance) 166. Typically, Rs 160 is a very small resistance compared to the resistance of Rp 166. Cp 163 tends to be a relatively high capacitance value in a PMN formulation ceramic actuator and a smaller capacitance value in a PZT formulation ceramic actuator. The series resistance, Rs 160, composes a model of the electrodes 161, 164. The parallel capacitance, Cp 163, and parallel resistance, Rp 166, compose a model of the electrical characteristics of the ceramic, dielectric layers 167. An inductive characteristic, typically part of a theoretical capacitor model, is not shown since an inductive effect is observed at frequencies (e.g., 500 kHz) outside the frequency range of operation for a deformable mirror, which is below 10 kHz, and usually below 2 kHz.

In operation, an amplifier voltage, Va 59 (FIG. 4), is electrically coupled to the signal electrode 161, sometimes referred to as the high-side electrode when coupled to a high voltage amplifier 58 having a positive-voltage output. The switch 50*a* is electrically coupled to the reference electrode 164, sometimes referred to as the low-side electrode. As described in reference to FIG. 8, the switch 50*a* electrically isolates the reference electrode 164 of the actuator 70*a* from AGND 85 (FIG. 4). The switch 50*a*, initially CLOSED, OPENS at t=1. The effect on the actuator 70*a* from OPENING the switch 50*a* is illustrated in FIG. 12.

Figure 12:
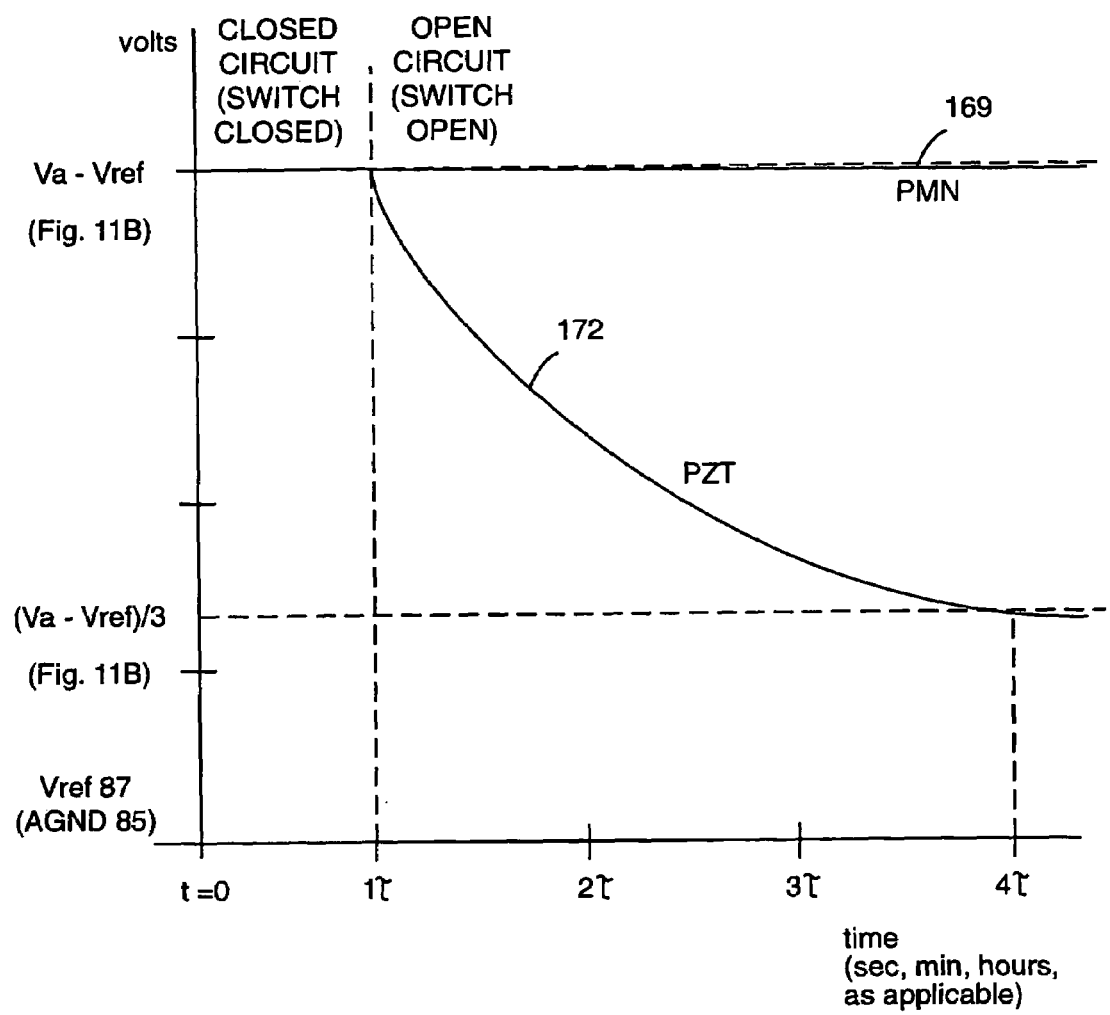
FIG. 12 is a voltage plot illustrating an electrical characteristic corresponding to the electrical schematic diagram of FIG. 11B.

FIG. 12 is a plot illustrating open-circuit electrical characteristics of the electrical model of the actuator of FIG. 11B. At T=0, the switch 50*a* is CLOSED, and the voltage differential across the actuator model of FIG. 11B is (Va−Vref). In the embodiment of FIGS. 4 and 11B, the voltage differential is voltage Va 59 since Vref 87 is electrically coupled to AGND 85 (i.e., zero volts). The voltage differential is said to be "stiff" because both electrodes are electrically coupled to respective voltage nodes, Va 59 and AGND 85.

At T=1, the switch 50*a* OPENS, thereby creating an open-circuit; the voltage differential is said to be "soft" because one electrode (i.e., the reference electrode 164, FIG. 11B) of the actuator is effectively disconnected, or "floating", from a stiff voltage potential (i.e., voltage node AGND 85). When the actuator is "floating", the electrical characteristics (shown in FIG. 11B) of the formulation used to make the ceramic layers of the actuator determine the rate of energy dissipation (and corresponding length change).

In a PMN formulation actuator, the rate of voltage drop-off is very slow, as depicted by a PMN actuator voltage waveform 169. However, in a PZT formulation, the rate of voltage drop-off is relatively fast, as depicted by a PZT actuator voltage waveform 172. The difference between the PMN actuator voltage waveform 169 and the PZT actuator voltage waveform 172 is due to an internal time constant of the respective actuators.

The internal time constant is a function of Cp 163 and Rp 166. The internal time constant equals one divided by the parallel resistance multiplied by the parallel capacitance, $1/(Rp \times Cp)$. After three respective time constants, the internal time constant of both the PZT actuator and PMN actuator is 33% of the starting open-circuit voltage, shown only for the PZT actuator since its internal time constant is orders of magnitude less than the internal time constant of the PMN actuator, as indicated by their respective waveforms 172, 169. Based on the internal time constants, it is clear that the PMN actuator is much more suitable for use with the multiplexer DM driver electronics 40 than is a PZT actuator. In other words, because PMN actuators drain charge, and therefore change length, orders of magnitude slower than PZT actuators when in an open circuit, the refresh rate for PMN actuators can be much slower than for PZT actuators, without a significant change of the surface figure of the DM mirror 16. It should be understood that electromechanical actuators may be made of many formulations of ceramics, including formulations designed specifically to work at extremely cold temperatures (e.g., tens of Kelvins). The principles of the present invention are not limited to PMN or PZT formulation actuators. Actuator formulations having similar internal time constants as PMN actuators, however, work very well with the multiplexer DM driver electronics 40 (FIG. 2) discussed herein.

Figure 13:
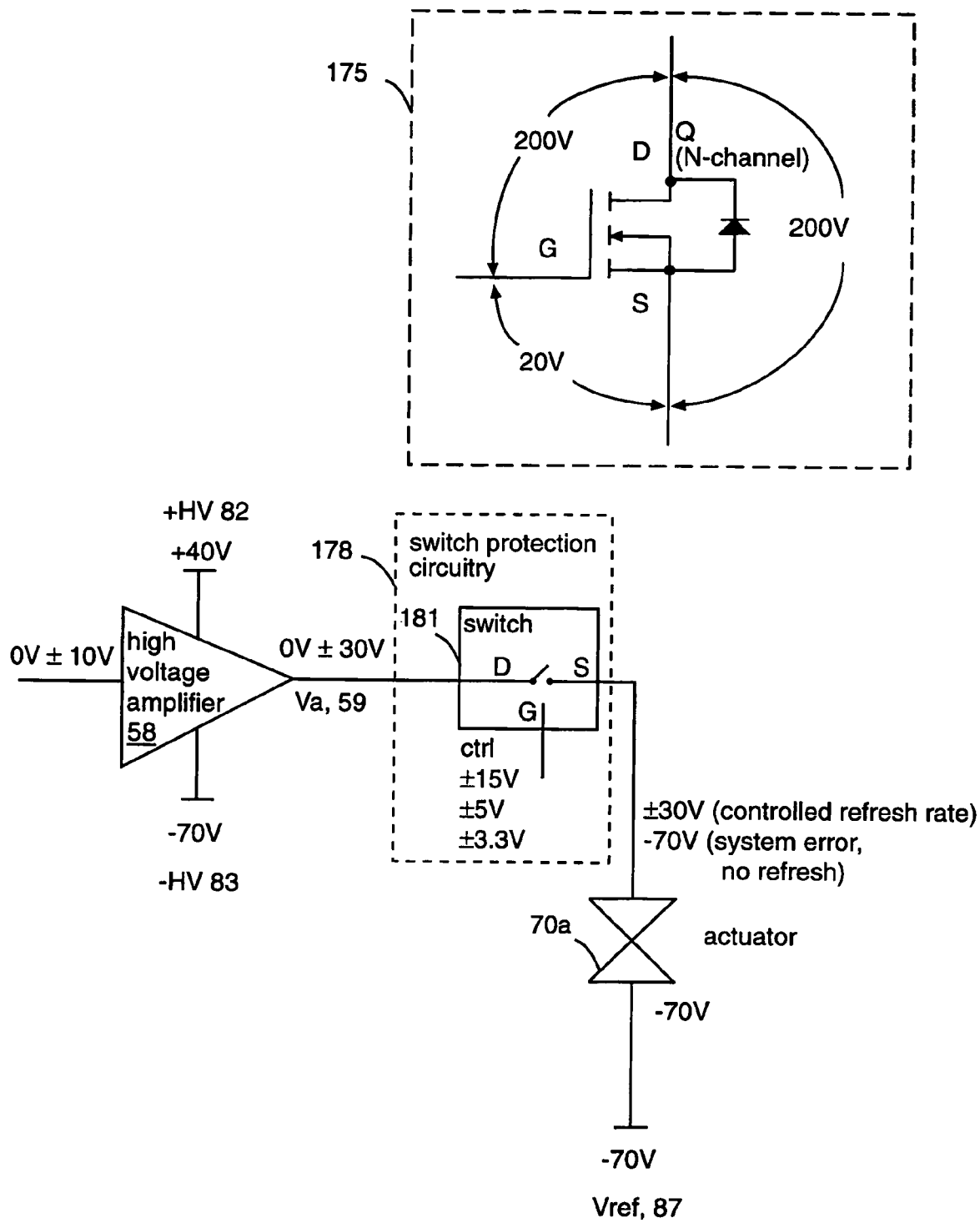
FIG. 13 is a schematic diagram of a switch positioned between the power amplifier and the actuator to contrast the switch of the DM driver electronics of FIG. 4.
Figure 14:
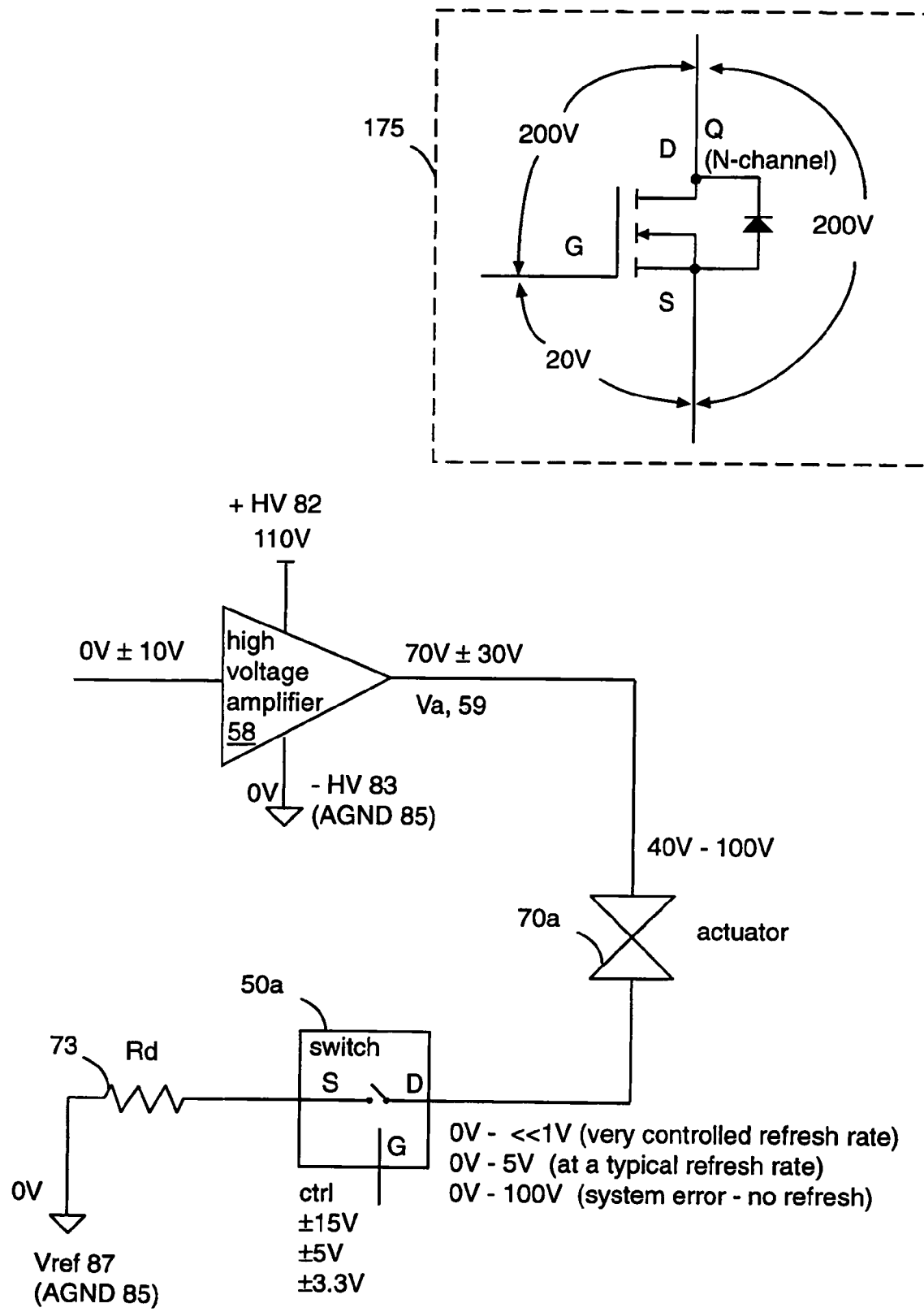
FIG. 14 is a schematic diagram of the switch used to control charge delivered to and from a single actuator in the DM actuator array of FIG. 4.

To contrast a high-side switch configuration (FIG. 13) from the low-side switch configuration (FIG. 14) discussed above in reference to the multiplexer DM driver electronics 40 (FIG. 4), FIGS. 13 and 14 are provided. The high-side switch configuration (FIG. 13) includes high-side switches electrically coupled between the output of the power amplifier and the signal electrodes of the actuators; thus, the high-side switches are required to switch high voltages. In contrast, the low-side switch configuration (FIG. 14) includes low-side switches electrically coupled between the reference electrodes of the actuators and a reference node; thus, the low-side switches typically switch zero or very low voltages. Therefore, the mean-time between failure for the low-side switch configuration (FIG. 14) is theoretically infinite, as compared to the high-side switch configuration (FIG. 13), which is expected to have a relatively short mean-time between failure. Details of the high-side switch configuration (FIG. 13) and the low-side switch configuration (FIG. 14) are discussed immediately below.

FIG. 13 is a schematic diagram of a single actuator driver system employing a high-side solid-state switch 181 coupled between the high voltage amplifier 58 and the actuator 70a. The high-side solid-state switch 181 implementation is being shown to contrast the low-side switch implementation (see FIGS. 4 and 14).

The high-side solid-state switch 181 controls charge to and from the actuator 70a. The high voltage amplifier 58 power terminal voltages, sometimes referred to as rail voltages, are different from those described above (see FIG. 2), where here, the +HV 82 and −HV 83 voltage levels are +40V and −70V, respectively, as opposed to +110V, 0V, as discussed in reference to FIG. 4.

A small signal input, 0V±10V, to the high voltage amplifier 58 is amplified to a 0V±30V output, Va 59. The highside solid-state switch 181 electrically isolates the high voltage amplifier 58 from the actuator 70a unless the high-side solid-state switch 181 is CLOSED. On the low side of the actuator 70a is a voltage reference, Vref 87. Because the PMN actuator 70a operates in a linear region when voltages between 40V and 100V are applied across their electrodes, Vref 87 is set to −70V, thereby driving the actuator 70a within the 40V to 100V range when Va 59 swings between ±30V.

As indicated in a schematic of a MOSFET electrical model 175, a MOSFET has a gate, a drain, and a source. An example set of voltage differentials is indicated between the MOSFET terminals. In the example MOSFET electrical model 175, the MOSFET drain-gate junction can withstand a differential voltage of 200V; the drain-source junction can withstand a voltage differential of 200V; and the gate-source junction can withstand a voltage differential of only 20V. These values are maximum differential withstanding voltage values for typical commercial MOSFET devices; beyond these respective values, the MOSFET device sustains second-order electrical breakdown. In addition, changing a state of a MOSFET device while a voltage differential is across the drain-source junction tends to result in minor (leakage) or major (second-order breakdown) damage to the MOSFET device. It should be understood that MOSFET devices are commercially available with voltage ratings much less than 200V (e.g., 12V) and much more than 200V (e.g., 1000V). Also, most MOSFET devices are capable of being operated by control voltages from 3.3V up to 15V applied to the gate.

When operated as a switch in the circuit of FIG. 13, the MOSFET gate-source junction is exposed to at least ±30V, causing the device to experience secondary silicon breakdown and fail. Therefore, a MOSFET voltage protection circuit 178 is required to guard against exceeding the gate-source junction voltage differential limitation of 20V. The MOSFET voltage protection circuit 178 may be as little as some resistors or as complex as a feedback loop, but in either case, the MOSFET voltage protection circuit 178 causes continuous current drain from the high voltage amplifier 58 or the actuator 70a. When the MOSFET voltage protection circuit 178 is employed by large matrices of switches, current leakage from the high voltage amplifier 58 on a continuous basis is appreciable.

Recalling the parallel resistance, Rp 166 (FIG. 11B), internal to the actuator 70a, it is important to note that the Vref 87 voltage, −70V, slowly conducts to the signal electrodes 161 (FIG. 11A) (i.e., high side electrodes) coupled to the high-side solid-state switch 181. This may occur during a system error, where no refresh is provided to the high voltage side of the actuator 70a for a long duration. Therefore, the MOSFET voltage protection circuit 178 must guard against a 70V differential, or any voltage differential above 20V, between the gate and source in the MOSFET device.

Although beneficial for protecting the high-side solid-state switch 181, the voltage protection circuitry 178 leads to voltage leakage paths from the actuator 70a during periods of set-and-forget actuator control. A leakage path electrically coupled to the actuator 70a causes the actuator 70a to drain its stored charge. Draining stored charge from the actuator 70a causes a length change of the actuator 70a. A length change of the actuator 70a causes a displacement error in a micropositioner application, and, in a deformable mirror application, a change in the wavefront error that the adaptive optics system (FIG. 1) seeks to control through the use of the DM mirror 16 (FIG. 1). Thus, voltage protection circuitry 178, while protecting the high-side solid-state switch 181, may affect the DM mirror 16 in a way that is unacceptable on a system level.

It should be understood that other scenarios leading to second order breakdown voltage differentials across the gate-source junction must also be considered. Further, for the drain-source path to be suitably protected, the high-side solid state switch 181 must have a drain-source path voltage rating in excess of the maximum voltage differential that may be experienced, which is 110V (i.e., +40V minus −70V) in the case of a high voltage amplifier 58 output stage failure or actuator 70a failure. The higher the differential voltage withstanding capability, the larger physically the MOSFET devices become, in general.

Referring to FIG. 14, a solid-state switch 50a is positioned on the low side of the actuator 70a to avoid the problems just described, such as the gate-source voltage differential limitation. FIG. 14 is a schematic diagram of an embodiment of the present invention that accomplishes control of charge to and from the actuator 70a in a very different manner from the high-side switch configuration of FIG. 13. In FIG. 14, the high voltage amplifier 58 has a +HV

82 voltage level of +110V and −HV 83 voltage level of 0V, as discussed in reference to FIG. 4.

A +/−10V input to the high voltage amplifier 58 maps to a +70V, ±30V output from the high voltage amplifier 58, indicated as Va 59. The result is a 40V to 100V swing on the high-side (signal) electrode of the actuator 70a. Coupled to the low-side (reference) electrode of the actuator 70a is the switch 50a. The circuit further includes the drain resistor 73, which provides current limit protection, coupled between the switch 50a and AGND 85 to complete the circuit.

To summarize, there are four major distinctions between the high-side configuration (FIG. 13) and the low-side configuration (FIG. 14). In the aggregate, the distinctions that make the low-side configuration (FIG. 14) are more favorable to achieving the goals (discussed above) of an adaptive optics system (FIG. 1) employing a multiplexed DM.

The first distinction is that, in the high-side configuration, the high voltage amplifier 58 has an output voltage swing of 0V±30V. In the low-side configuration, the high voltage amplifier 58 has a nominal bias output value of 70V with a ±30V swing.

The second distinction is the placement of the switch 50a with respect to the actuator. In the high-side configuration, the high-side solid-state switch 181 is electrically coupled between the high voltage amplifier 58 and the actuator 70a. In the low-side configuration, the switch 50a is electrically coupled between the actuator 70a and AGND 85.

The third distinction is that in the high-side configuration, Vref 87 is −70V and coupled directly to the actuator 70a. In the low-side configuration, Vref 87 is a low voltage, preferably 0V (AGND 85), and electrically coupled to the switch 50a, optionally through the drain resistor 73. The reason for the difference in voltages between the high-side configuration Vref 87 being −70V and the low-side configuration Vref 87 (AGND 85) being 0V is the location of the switches 181, 50a, respectively. (See the discussion associated with FIG. 8 for the reason for Vref 87 being coupled to AGND 85.)

The third distinction between the high-side configuration and the low-side configuration translates into a significant difference in mean time between failure (MTBF) between the two configurations, where the low-side configuration has a significantly higher (i.e., longer) MTBF. As discussed above, the low-side configuration (FIG. 14), operating according to the principles of the present invention, switches little or no voltage across the switches.

The fourth distinction is that the low-side configuration does not require the MOSFET voltage protection circuit 178 (FIG. 13) because the voltage at each MOSFET source is maintained at a voltage level essentially at or very near analog return (i.e., zero volts). Thus, the gate-source maximum voltage differential of 20V is neither approached nor exceeded. This voltage control is optionally enhanced through the use of software, as discussed later beginning with FIG. 20B. In other words, virtually no voltage differential is observed across the switch, thereby, for all practical purposes, eliminating failure of the switch 50a caused by exceeding the maximum gate-source voltage differential rating.

Figure 15:
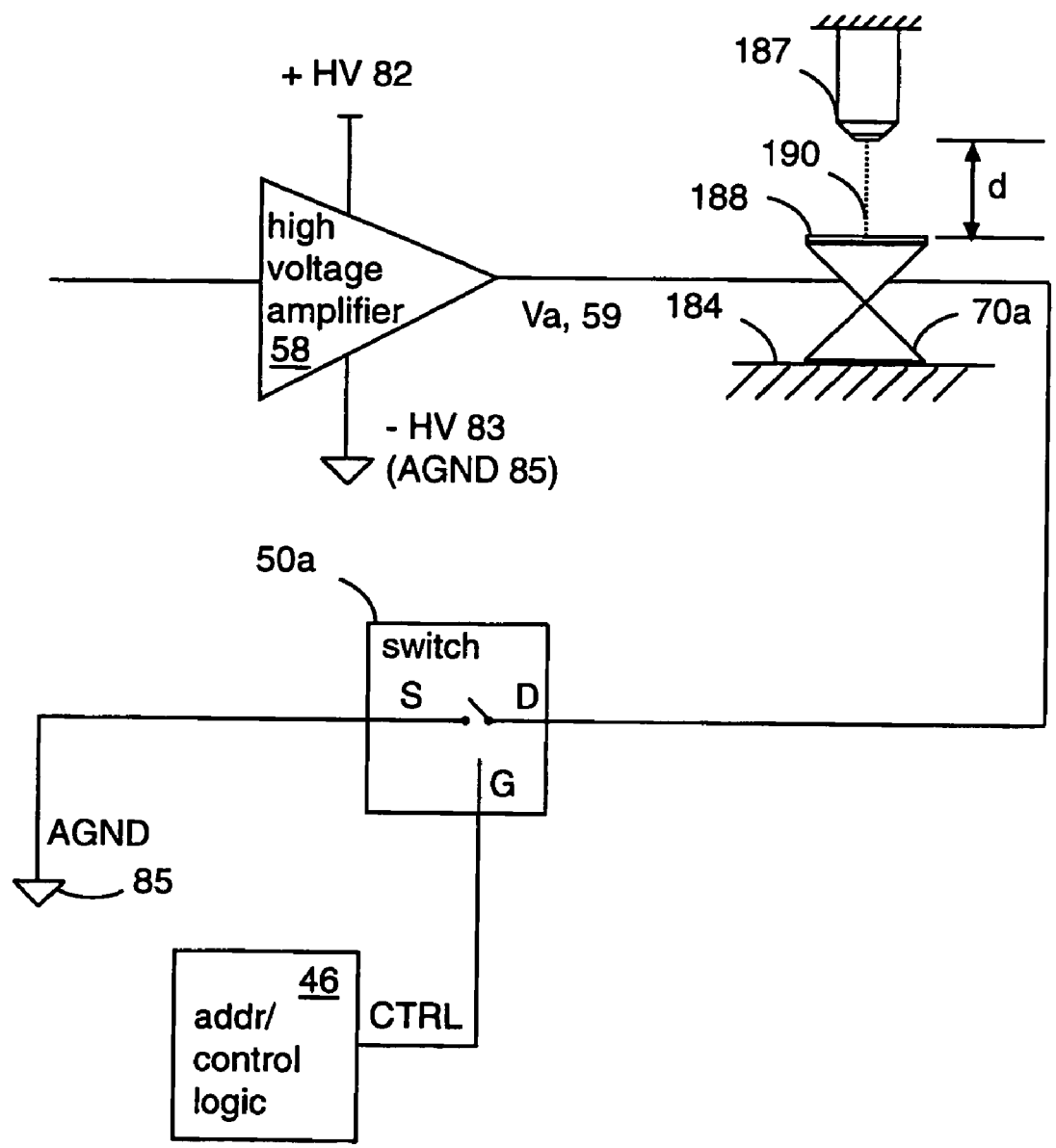
FIG. 15 is a schematic diagram of a micropositioner application employing a subset of the DM electronics of FIG. 2.

Effectively a single channel of the DM driver electronics 40 (FIG. 2), FIG. 15 is a schematic diagram of a micropositioner system employing the principles of the present invention. In the example micropositioner application, one end of the actuator is fixedly attached to a mechanical ground 184, and the opposite end has a wafer mirror 188 coupled to it. A very thin, non-hydroabsorptive film of epoxy is typically the means by which the ends of the actuator are secured to other objects. Typically the micropositioner drive mechanism, which is the actuator 70a, is used to position an object, such as the wafer mirror 188, to within nanometers of a desired position. An optical position sensor 187 outputs a distance measurement light beam 190 to measure a distance, d, between the optical position sensor 187 and the wafer mirror 188.

The high voltage amplifier 58 presents Va 59 to a first electrode of the actuator 70a. The switch 50a, controlled by the address/control logic 46, is coupled to a second electrode of the actuator 70a and isolates the actuator from AGND 85. Therefore, when in a CLOSED state, the switch 50a enables the actuator 70a to be controlled by the high voltage amplifier 58. When in an OPEN state, the switch 50a disables the actuator 70a from being controlled by the high voltage amplifier 58.

In essence, the micropositioner system of FIG. 15 is a single amplifier-actuator-switch channel of the DM multiplexer design. Other aspects of the DM driver electronics design may be employed, such as the DM processor 49 and D/A converter 55 (FIG. 2), to make the micropositioner system a self-contained or "smart" subsystem in a larger application. It should be understood that the wafer mirror 188 may be positioned non-colocated on a structure mechanically coupled to the actuator 70a to measure the motion imparted onto the structure by the actuator 70a.

Figure 16:
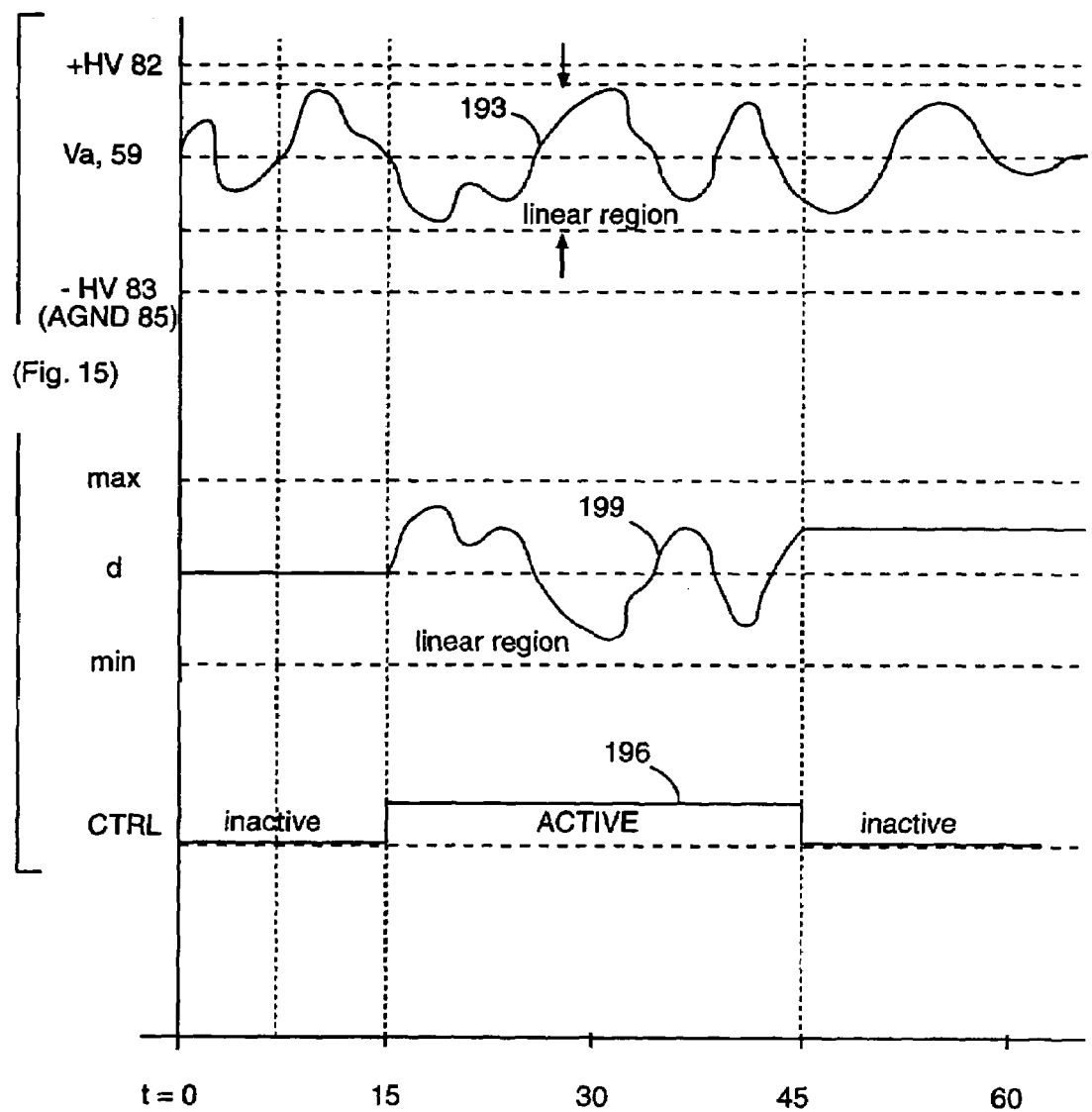
FIG. 16 is a waveform diagram having analog and digital waveforms associated with the operation of the micropositioner application of FIG. 15.

FIG. 16 is a waveform diagram corresponding to the micropositioner system of FIG. 15 indicating the function of the switch 50a and its ability to enable and disable the actuator 70a from responding to the high voltage amplifier 58. The high voltage amplifier 58 outputs a voltage, Va 59, having a corresponding Va waveform 193. The Va waveform 193 spans between the +HV 82 and −HV 83 voltage levels (FIG. 2) to control the actuator 70a, typically in the linear region of the actuator 70a.

Between T=0 and T=15, the control line from the address/control logic 46 is in an inactive mode, as indicated by a switch control functional waveform 196. The distance between the optical position sensor 187 and the actuator 70a is indicated by a distance measurement waveform 199. Note that while the control line is inactive, the distance measurement waveform 199 does not track Va 193.

At T=15, the distance measurement waveform 199 begins to track the Va waveform 193 in an equal and opposite manner because the distance between the actuator 70a and the optical position sensor 187 is inversely proportional to the voltage level on the actuator 70a (i.e., the length of the actuator is proportional to the voltage differential between the actuator signal (positive) and reference (negative) electrodes, which relates to the energy being stored in the actuator).

At T=45, the switch control functional waveform 196 returns to an inactive state, thereby disabling the actuator 70a from tracking the Va waveform 193. Note, however, the distance measurement waveform 199 maintains the T=45 voltage value according to the charge stored in the actuator 70a, which maintains its length so long as the charge (i) does not drain from the actuator 70a and (ii) is not charged by the amplifier 58.

Figure 17:
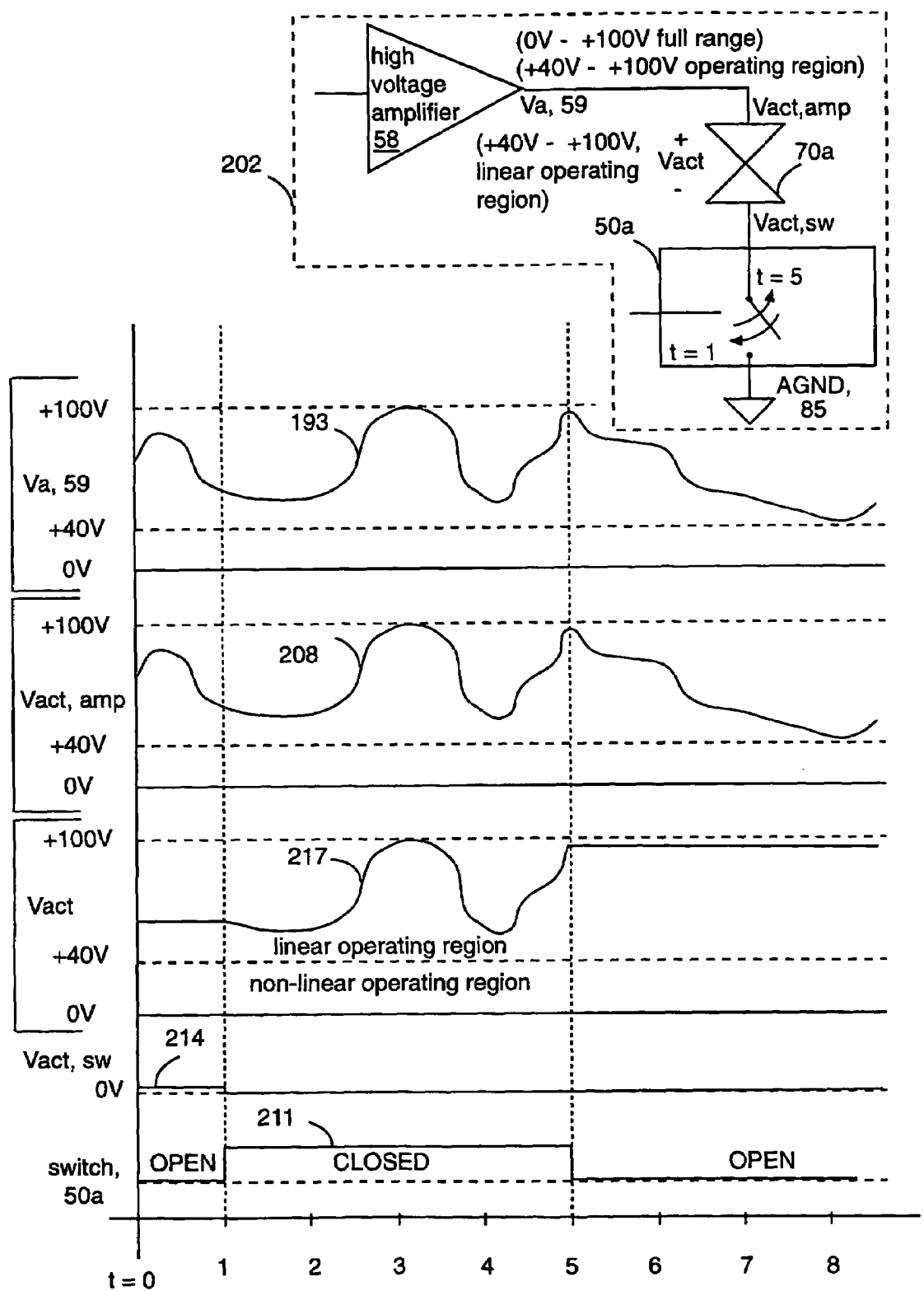
FIG. 17 is a waveform diagram of electrical signals associated with the micropositioner circuit of FIG. 15.

FIG. 17 includes plots of various waveforms associated with a single-channel circuit 202. The single-channel circuit 202 employs the switch 50a on the low side of the actuator 70a, as previously shown and discussed in reference to FIG. 15. The waveforms represent voltages at respective nodes indicated in the single-channel circuit 202.

The top two waveforms, Va waveform 193 and Vact,amp waveform 208, represent the voltage provided by the high voltage amplifier 58. The full range of the high voltage amplifier 58 is 0V to 100V, but the high voltage amplifier 58 is controlled, by a processor (not shown), to provide output voltages of +40V to +100V (or −40V to −100V) to drive the actuator (PMN) in its linear operating region. A third waveform, a Vact waveform 217, represents the voltage across the actuator 70*a*. A fourth waveform, a Vact,sw waveform 214, represents the voltage at the reference electrode of the actuator. A switch functional waveform 211 represents the OPEN and CLOSED states of the switch 50*a*.

Between T=0 and T=1, the actuator voltage remains unchanged, as indicated by a Vact waveform 217. Also, the Vact,sw waveform 214 has a voltage level slightly above 0V due to the internal time constant of the actuator, discussed in reference to FIG. 11B. At T=1, the switch changes state from OPEN to CLOSED, at which time the Vact,sw waveform 214 indicates that the voltage on the low side of the actuator 50*a* goes from a voltage slightly above 0V to almost exactly or exactly 0V, which is the voltage potential of AGND 85.

Between T=1 and T=5, the switch remains in a CLOSED state, as indicated by the switch functional waveform 211, and the Vact waveform 217 indicates that the actuator voltage is the same as Va 59, as indicated by the Va waveform 193 and Vact,amp waveform 208. After T=5, the switch returns to an OPEN state, as indicated by the switch functional waveform 211. The Vact waveform 217 remains at the voltage level on the actuator 70*a* when the switch 50*a* was OPENED. Also, when T>5, the Vact,sw waveform 214 begins to slowly drift from 0V. This means that the charge begins to migrate from the positive electrode plates 162 (FIG. 11A) to the negative electrode plates 165 (FIG. 11A) as previously discussed in reference to FIG. 11B.

Electrical Equivalents

This completes the electrical and electronics discussion. It should be understood that there are various equivalents of the circuitry described above. Such equivalents include at least other forms of physical configurations, logic families, addressing methods, and other electronics functions.

For example, the circuitry may be packaged in various forms. Examples of packaging forms include packaging the circuitry on circuit boards, ASICs (application-specific integrated circuits), hybrids (hybrid microelectronics), coupling the circuitry directly into the actuators, or even designing a switching element directly into the actuators or other charge storage elements.

The technologies composing the described circuitry may be TTL, CMOS, NMOS, QMOS, or other logic circuit families capable of providing the basic functionality described above and depicted in FIGS. 1–17. In alternative embodiments of the present invention, various logic and device families may be mixed to take advantage of properties of plural logic and device families.

The switch driver 112 (FIG. 7) is depicted as a MOSFET driver specially designed to drive both N- and P-channel MOSFET gates, Q1 and Q2 (FIG. 8), respectively. Alternative embodiments of the switch driver 112 include such devices as buffers, inverters, or OR gates. However, because some MOSFET gate capacitances can be relatively large, high current output devices, such as the switch driver 112, are preferable to use to reduce MOSFET, FET, or other device, switching time. Further, for typical reasons, devices providing Schmitt trigger characteristics are useful for driving whatever devices are employed as switches.

Other methods for addressing the switches in the switch array 50 are also equivalent to the random access addressing method (i.e., selectably addressing of the switches) provided by the circuitry described above. For example, a ripple counter may be employed to serially raster through the array of switches 50. Multiple ripple counters may be employed to raster through zones of switches corresponding to zones of mirror actuators. Alternatively, a BCD (binary coded decimal) or other binary coded number system counter may be employed to select the actuator switches. In each case, the selection of switches is preferably coordinated with a processor determining the voltage to be applied to the corresponding actuators.

Other forms of high voltage amplifiers and amplifier configurations may be employed. For example, actuators (such as PZT actuators) that operate in linear (or non-linear) regions at voltages lower, higher, or both lower and higher than the voltages depicted in FIG. 17 can be driven by the DM driver electronics 4 (FIG. 2). Therefore, high voltage amplifiers having voltage rails of corresponding voltages are also within the principles of the present invention. Switching amplifiers rather than linear amplifiers may be employed to take advantage of the efficiency of switching amplifier technology. Further, both voltage and current mode amplifier arrangements may be employed by the DM driver electronics system. An active circuit may be used to actively maintain the actuator voltage reference (AGND 85) level, which may also be used to aid in "sinking" current for faster actuator response.

The high voltage amplifier may employ a voltage rate limit circuit. A voltage rate limit circuit limits the rate of voltage change. Limiting the rate of voltage change controls/limits current levels/spikes in the actuators to protect the actuators from current breakdown, punch-through, carbon build-up, and other structural and electrical weakening effects.

The drain resistor 73 (FIG. 4) can be located on the amplifier-side of the actuators 70 (i.e., coupled to the signal electrodes instead of being coupled to the reference electrodes) and provide the same current limiting characteristic. Alternatively, the switches in the switch array 50 may provide a means for providing resistance, such as in the case of MOSFETs, which have variable resistance properties dependent on a gate voltage or simply have a high drain-to-source ON-resistance.

Another equivalent structure is the use of a single switch element rather than two switch elements in a paired arrangement. The single switch element must possess about at least the same characteristics as the two-element switch configuration, namely (i) preventing undesired leakage current and (ii) withstanding high voltages to withstand the maximum amplifier rail voltage in the event of a system fault. A one-element switch generally has advantages over a two-element switch in terms of size, number of electrical connections, cost, and mean time between failure.

In the two-element switch configuration, the two elements may be packaged in a single chip or separate chips. Arrays of one- or two-element switches may be packaged together in high-density packages, with device leads allowing for electrical connections to external devices. The switch element(s) may also be composed of elements, such as current-operated transistors, that comprise some or no characteristics of field effect devices.

The logic may be implemented in discrete form, as depicted in FIG. 6, or in ASIC or hybrid form. The functions of the digital logic may be embedded in an embedded processor or PAL (programmed array logic) device. Various aspects may be incorporated into software, hardware, such as FPGAs (field programmable gate arrays), or a combination of software and hardware. Further, PROMs (programmable read-only-memory) comprising a look-up table may be employed to support certain logic features, such as addressing switches. Other forms of logic devices not described that provide the same functionality may replace various aspects of the circuit design.

The DM driver electronics 40 may comprise high impedance, high voltage, measurement circuitry (not explicitly shown) to measure the voltage on the actuators in the DM actuator array 70. The measurement circuitry may be coupled to measurement nodes (e.g., signal and reference electrodes of one or more actuators) continuously or non-continuously via switches, as determined/controlled by the DM processor 49 or other decision-making device. The output from the measurement circuitry may be used by the DM processor 49 for presetting the high voltage amplifier 58 and providing feedback to the DM processor 49 for other purposes. The measurement circuitry may be included in the analog/digital feedback and error detection logic 61 (FIG. 2).

The teachings of the present invention also consider switch protection circuitry to protect various components. For example, zener diode protection may be employed to protect the switches, such as for the gate-source or drain-source limitations of the MOSFET devices, Q1 121 and Q2 124 (FIG. 8). Redundant circuitry and circuitry to facilitate fail-safe modes may also be employed.

Another embodiment (not shown) of a DM assembly 10 comprises a non-continuous DM mirror 16, where rather than a single facesheet DM mirror 16 (FIG. 3) being mechanically operated by actuators 70 controlled by the DM driver electronics 40, individual DM mirror sections are coupled to the DM actuator array 70 to form a DM mirror 16 composed of individual mirror sections. The mirror sections and DM actuator array 70 may be spaced closer together than depicted in FIG. 3.

In one embodiment of a "discretized" DM mirror 16, the actuators 70 are capable of positioning the mirror sections in tip and tilt angles in addition to pistoning the mirror sections. Alternatively, the mirror sections may be operated by at least two different actuators to achieve the various positioning effects. DMs having discrete mirror sections may be employed in binary optics and other non-traditional adaptive optics applications. The DM driver electronics 40 are capable of operating actuators in the DM actuator array 70 having multiple electrode pairs for coupling to at least one high voltage amplifier.

As in continuous-facesheet DMs, a discretized DM may include a "guard ring" of actuators at the outer edge of the DM mirror 16. Other areas of the DM mirror 16 may also be unused except for pistoning. In either case, the DM driver electronics 40 can support unused actuators or zones of actuators. Further, special considerations may be made for DM assemblies 10 having the DM mirror 16 mechanically coupled to the DM bezel 13. It is conceivable that a DM mirror 16 is designed with full or partial coupling to the DM bezel 13 and as few as one actuator 70a to provide simple focus or parabolic shapes. Further, the DM mirror 16 may be designed with as few as one actuator 70a and not be coupled to the DM bezel 13, thereby providing piston only, for such applications a fast-focus and imparting low-bandwidth data information on a higher-frequency carrier beam. The principles of the present invention are compatible with such other DM assembly 10 designs.

To form a discretized DM mirror 16, for example, the actuator array 70 of FIG. 3 may be composed of actuator "blocks", in which a thick ceramic block has individual actuators machined apart at an end of the block at locations where electrodes internal to the ceramic block create a field to operate the actuators. Actuator blocks can provide very high-density actuator arrays 70, where virtual continuity between mirror sections is possible. Electrodes typically extend to the surface of actuator blocks in various configurations allow electrical coupling to the DM driver electronics 40. The actuators of the actuator array 70 may operate in a transverse or radial direction rather than in an axial direction. In either case, the principles of the present invention also support the operation of the actuators in the DM actuator array 70 formed from ceramic blocks.

A combination of traditional and multiplexed DM driver systems may be utilized in a single adaptive optics system. Further, the multiplexed DM driver electronics 40 may be retrofitted to operate deformable mirrors that have previously been operated by traditional DM driver electronics systems.

Mechanical and Electronic Assemblies:

Because the multiplexer DM driver electronics are reduced in size, weight, and thermal output from traditional non-multiplexer DM driver electronics that have one amplifier per DM actuator, the multiplexer DM driver electronics offer an improvement in packaging for the DM system. In a preferred embodiment, the multiplexer DM electronics are packaged in an electronics housing that is coupled to the DM mirror assembly housing.

The DM driver electronics may be mounted on multi-layer, multi-side circuit boards, which may include flex circuit section to fold the DM driver electronics. Folding the DM driver electronics allows them to fit within the electronics housing cavity. In an alternative embodiment, multiple DM driver electronics circuit boards are stacked and coupled together through the use of board-to-board connectors.

Wireless communication technology may be employed to allow communications between the external system and the DM driver electronics to eliminate interface cables. Alternatively, optical fiber technology may be employed to support data communications. In furtherance of the minimization philosophy, high density flex circuitry may be employed to couple the DM driver electronics to the DM actuator array and allow thermal insulation between the DM driver electronics assembly to ensure the DM mirror figure is not affected by the small thermal output of the multiplexer DM electronics circuit components.

The reduced-size multiplexer DM electronics may also take advantage of high-density AC-to-DC or DC-to-DC power converters. In one embodiment, a single AC power cord extends from the DM assembly. Alternatively, a battery may be employed to provide noise-free DM electronics power and reduce the number of wires extending from the DM assembly to none.

The following detailed description provides a preferred embodiment of the mechanical and electrical assemblies.

Figure 18:
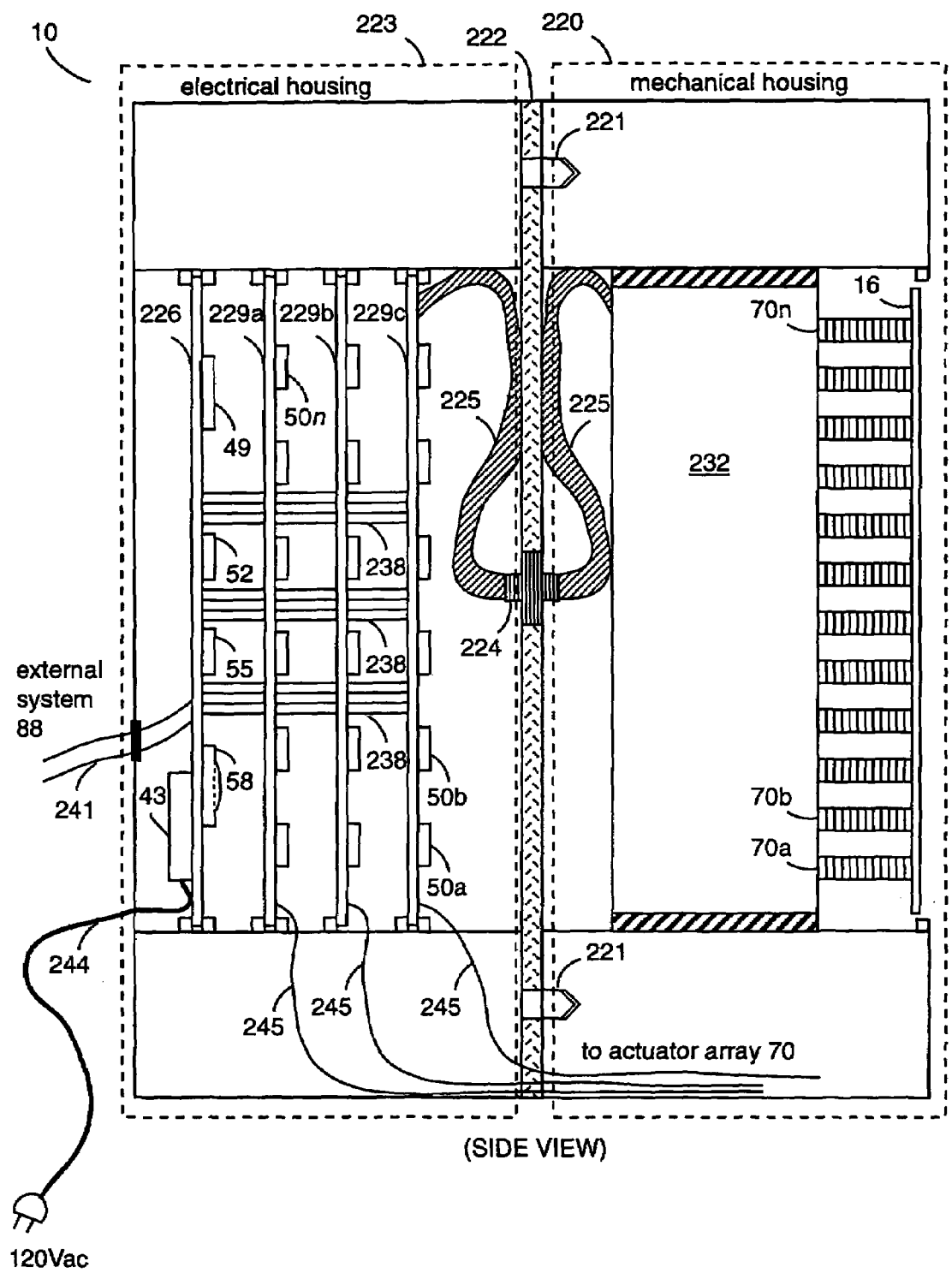
FIG. 18 is a schematic diagram of an embodiment of a DM mechanical assembly of the DM of FIG. 1.

FIG. 18 is a mechanical schematic of an embodiment of the DM assembly 10 having integrated DM mechanical and electrical housings 220, 223, respectively. Integrating the DM mechanical housing 220 with the DM electronics housing 223 reduces packaging size of the DM assembly 10, which is preferable in many adaptive optics applications.

The DM mechanical housing 220 includes a DM backplate 232 to which the actuators in the DM actuator array 70 are adhesively attached. The actuators in the DM actuator array 70 are also adhesively attached to the DM mirror 16.

Alternatively, the DM actuator array 70 may be coupled to the DM mirror 16 in a manner to dispense with the DM backplate 232.

The elements, 220, 223, 232, 70, 16, including the adhesives, are thermally sensitive relative to the optical performance region in which the DM system operates. Therefore, the DM mechanical and electrical housings 220, 223, respectively, may be separated by a thermal insulator 222 so that any trace heat generated by the DM driver electronics 40 (FIG. 2) does not influence the figure of the DM mirror 16.

In the embodiment of FIG. 18, the DM electronics housing 223 houses four circuit boards: a controller circuit board 226 and three switch array circuit boards 229a, 229b, and 229c. The switch array circuit boards 229a, 229b, and 229c (collectively, 229) comprise switches 50a, 50b, . . . , 50n (FIG. 4) composing the switch array 50.

The controller circuit board 226 comprises intelligence and power circuitry, such as the DM driver electronics interface 48, DM processor 49, address/control logic 46, D/A converter 55, and high voltage amplifier 58, or subsets or multiples thereof. Alternatively, another circuit board may be employed to separate the high voltage of the power amplifier 58 from the noise-sensitive intelligence circuitry, such as the DM processor 49.

Because of the thermal sensitivity of the mechanical components—the DM backplate 232, actuators 70, DM mirror 16, and coupling joints between those and other mechanical components—it is desirable to position the controller circuit board 226, which produces the most thermal output, away from the interface between mechanical and electrical assemblies. A heat sink (not shown) may also be employed to various electrical components, or the DM electrical housing 223, to dampen thermal effects to the DM mechanical housing 220. Convection cooling is not desirable due to mechanical vibration effects on the DM mirror 16.

In the embodiment shown, the controller circuit board 226 includes a power converter 43, which is an AC-to-DC converter. A power cord 244 carries 120 Vac input power to the power converter 43. The power converter 43 converts the AC power into DC power used by the high voltage amplifier 58, DM processor 49, memory 52, D/A converter 55, address/control logic 46, switch driver 112, and other electronics. In the case of DC input (e.g., +28V of a satellite bus), the power converter(s) 43 are DC-to-DC, high efficiency converters (e.g., 90% efficiency or better).

The controller circuit board 226 and switch array circuit boards 229 are electrically coupled via board-to-board connectors 238. Alternatively, folding, semi-rigid construction may be employed to achieve a low profile. Of course, in the case of non-coupled electrical and mechanical assemblies, a conventional, large, multi-layer board may be employed.

The controller circuit board 226 receives external signals from the external system 88 via a communication cable 241 from the external system 88. The communication cable 241 may be electrical or fiber optic.

Electrical coupling between the electronics and actuators may be provided by many standard or non-standard techniques. A feedthrough, hermetically-sealed connector may be used, such as the feedthrough connector 224. Flex cables, such as driver cables 245, capable of passing through thin slots may be employed. Alternatively, an electronic signal bus may be incorporated directly into the DM electrical and mechanical housings 220, 223, (see also the DM bezel 13, FIG. 2) in such a way as to not make electrical contact between the signals and the bezel 13.

By way of example, the DM electronics housing 223 has an electronics-to-actuators cable 225, comprising the high-voltage signal and return lines 64, 67 (see FIG. 2). The electronics-to-actuators cable 225 extends from the controller and switch array circuit boards 226, 229, respectively, to the DM actuator array 70. At the interface between the electrical housing 223 and the DM mechanical housing 220 is an electrical feedthrough connector 224. Typically, the connector portion connected to the DM driver electronics 40 has the sockets, and the connector portion connected to the DM actuators has the pins, thus protecting against accidentally shorting out voltages should the DM driver electronics 40 be on and a conductive material be applied across some pins.

To ensure that the DM electrical housing 223 mechanically interfaces properly to the DM mechanical housing 220, and that the electrical feedthrough connector 224 is properly aligned, the DM electrical and mechanical housings 220, 223, respectively, comprise an alignment pin assembly 221 composed of pin and socket components. Additionally, after the mating of the DM mechanical and electrical housings 220, 223, respectively, a setscrew or other mechanical fastener (not shown) is engaged to maintain proper coupling.

Figure 19:
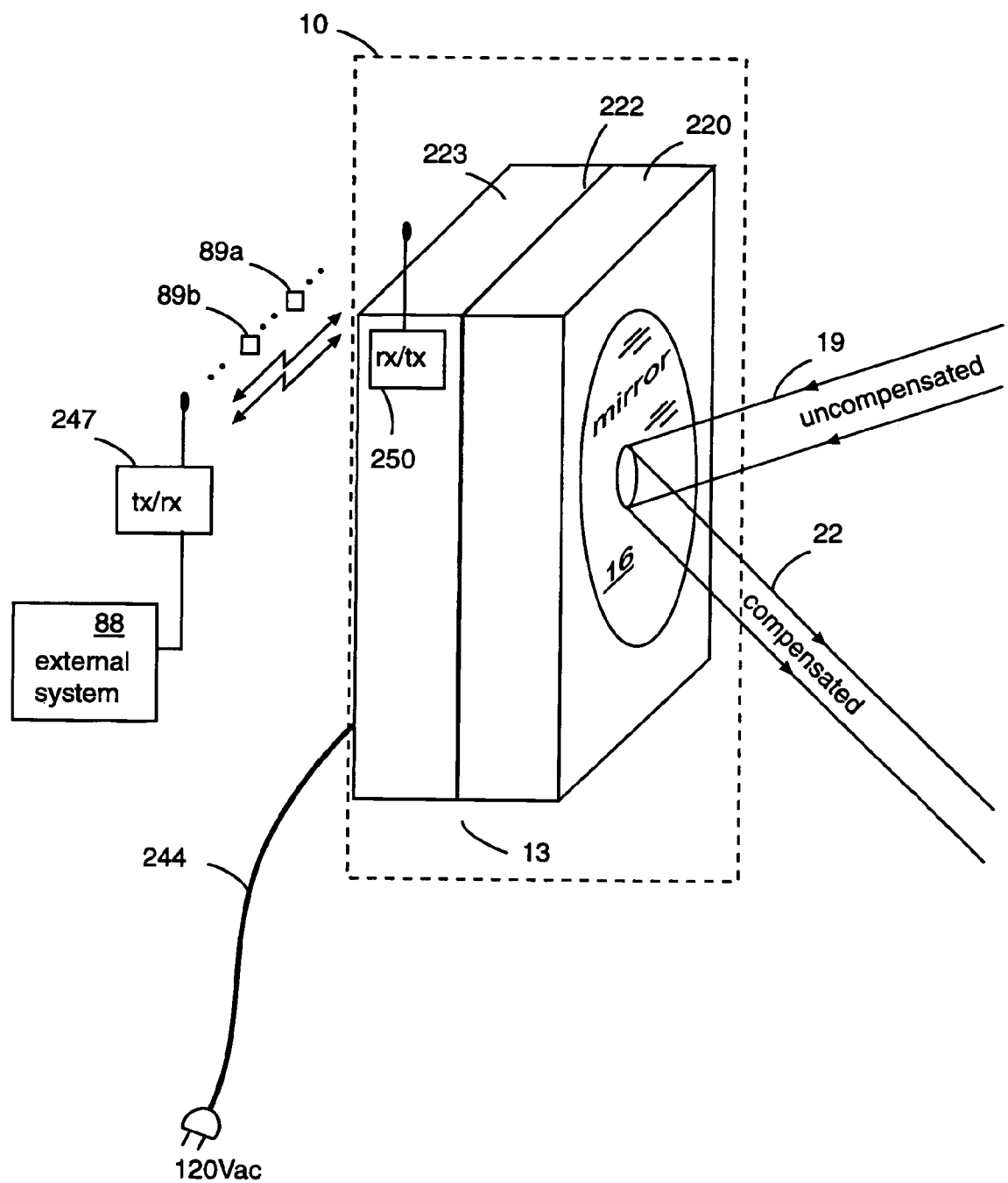
FIG. 19 is the DM mechanical assembly of FIG. 18 having a wireless interface with an external system.

FIG. 19 is a schematic diagram of an alternative embodiment of the DM and its electronics interface. The DM assembly 10 includes the DM mechanical housing 220 and the DM electronics housing 223. The DM driver electronics 40 (not shown) comprises a DM wireless (e.g., RF or infrared) transceiver 250, which receives DM command frame data from an external system wireless (e.g., RF) transceiver 247. The DM wireless transceiver 250 receives data from the external system 88. For example, the external system 88 could be a notebook computer. The power to the DM may be derived from a 120 Vac power source via power cord 244, or other power source herein discussed or known in the industry. The wireless interface configuration is useful for laboratories, demonstrations, diagnostic tool, temporary test tool, or other non-permanent or permanent applications.

Mechanical and Electrical Assembly Equivalents

The principles of the present invention provide equivalent mechanical and electrical assemblies for those depicted in FIGS. 18 and 19. For example, surface mount chips, leadless chips, bump-bond chips or other forms of packaging for the chips that compose the circuitry and/or functionality as herein described may be used. Various forms of circuit boards may be integrated into the DM bezel or supported in an assembly external from the DM bezel.

Single-layer, single-sided through multi-layer, double-sided circuit boards may be used. Further, a motherboard/multi-daughter board arrangement may be employed. Edge connectors, pin and socket connectors, or other forms of circuit board inter-connections, including wire, wireless, and optical interconnects may be used to interconnect multiple circuit boards comprising the circuitry.

The mechanical and electrical assemblies may be separated via mechanical and electrical-interconnect means. In one embodiment, replacing either assembly replaces the mirror or circuitry contained therein, respectively. For example, in a space-based astronomical observatory application, such as the Hubble space telescope, it is desirable that a space-walking astronaut is able to disconnect a malfunctioning electrical circuit from the mirror and replace it with a functioning electrical circuit by merely replacing the entire electrical assembly. In at least one embodiment, the mechanical and electrical assemblies are replaceable at the assembly level through at least one simple, mechanical, separation and reconnection mechanism.

Software:

Software may be employed to control the operation of the DM driver electronics 40 (FIG. 2), which electrically controls the actuators in the array of actuators 70 that deform the DM mirror 16. The software can add intelligence to traditional and/or non-traditional aspects of DM electronics and actuator control, including: initialization, external system interfacing, mirror biasing, individual and zone actuator control, high and low power imaging modes, low power non-imaging mode, and status and error feedback to external systems. Further, the software provides safety features for the DM electronics, actuators, and mirror by supporting various functions, including coordination among the electronics and actuators, ramp rate control, and inter-actuator stroke control. Further, the software provides power usage control by allowing an external source or internal timing mechanism to switch the electronics into a low power mode.

The software accounts for the electrical characteristics of the electronics and actuators and also accounts for electromechanical characteristics of the actuators within the context of the DM assembly 10. As discussed above in reference to the hardware, the actuators are charge storage devices that discharge power in the same manner as capacitors. Closing switches electrically coupled to actuators can have negative effects on the switches. A minor negative effect on the switches is leakage, which affects imaging and reduces time before recharging the actuators is necessary to maintain the mirror figure. More serious negative effects on the switches are secondary breakdown and punchthrough, which affects functional control of the DM mirror 16 and results in partial or total loss of control of the figure of the DM mirror 16. In both cases, the DM electronics affect—and may ultimately prevent—the proper operation of the real-time adaptive optics.

Two leading causes of switch degradation (i.e., leakage) and switch failure (i.e., secondary breakdown) result from applying excessive voltages, voltage differentials, and current to the switches. The switches described hereinabove minimizes the likelihood of leakage, secondary breakdown, and punchthrough by decoupling reference electrodes of actuators from a reference node. However, without proper coordination among the switches and other elements within the electronics, such as the power amplifier(s), the advantage of a good switch design is defeated. Thus, the software executed by a processor controlling the DM electronics coordinates the various electronic elements to ensure that excessive voltage, voltage differentials, and/or current are not applied to the switches.

To prevent voltages from affecting the switches, the software refreshes the actuator voltages as necessary, particularly when the mirror is in a set-and-forget mode. Refreshing the actuator voltages recharges both sets of actuator plates (i.e., the positive and negative terminals) to a signal level and a reference level, respectively. Resetting the reference electrodes keeps the voltages on both sides of the switches approximately the same; thus, the switching voltage differential is approximately zero, which is the safest switching voltage differential for the switches. Note that in mechanical switching technologies, opening or closing a switch having two different voltages on the switching terminals is readily observable in the form of an arc flash. Additionally, switching a zero voltage differential causes no instantaneous current across the switch terminal, which reduces the likelihood of punchthrough.

In one embodiment, to refresh the actuators, the software keeps track of the previous voltage (i.e., previous state) on each of the actuators in the DM actuator array. The previous command voltages may be stored in high-speed operational memory, such as cache, or slower memory elements, such as a magnetic medium or an optical medium. In one embodiment, the DM processor 49 executes a set of instructions that (i) loads and outputs the previous command digital value, corresponding to a high voltage analog value to be applied to an actuator (taking into account the D/A converter and gain of the high voltage amplifier), (ii) waits for the amplifier to settle, then (iii) closes the switch corresponding to the actuator being refreshed. In this way, the actuator and amplifier output have the same voltage potentials before the switch is closed, reducing instantaneous current through the actuators and switches to approximately zero.

The software may also ramp the actuators up or down in a manner that keeps current spikes to a minimum. For example, the software could be limited from changing the amplifier more than a maximum voltage per second. Thus, the software limits the actuator voltage rate of change, which implicitly limits the instantaneous and average current.

Inter-actuator stroke differentials between actuators, that may potentially cause stresses in the mirror and joints between the mirror and actuators, can also be controlled by the software. The software comprises program instructions that allow the processor to compare present DM actuator command values to other present DM actuator command values and to previous DM actuator command values. The software may modify the DM actuator command values such that the amount of stroke between adjacent pairs of actuators does not exceed a predefined level.

The following discussion provides details of a preferred embodiment of the software.

Figure 20A:
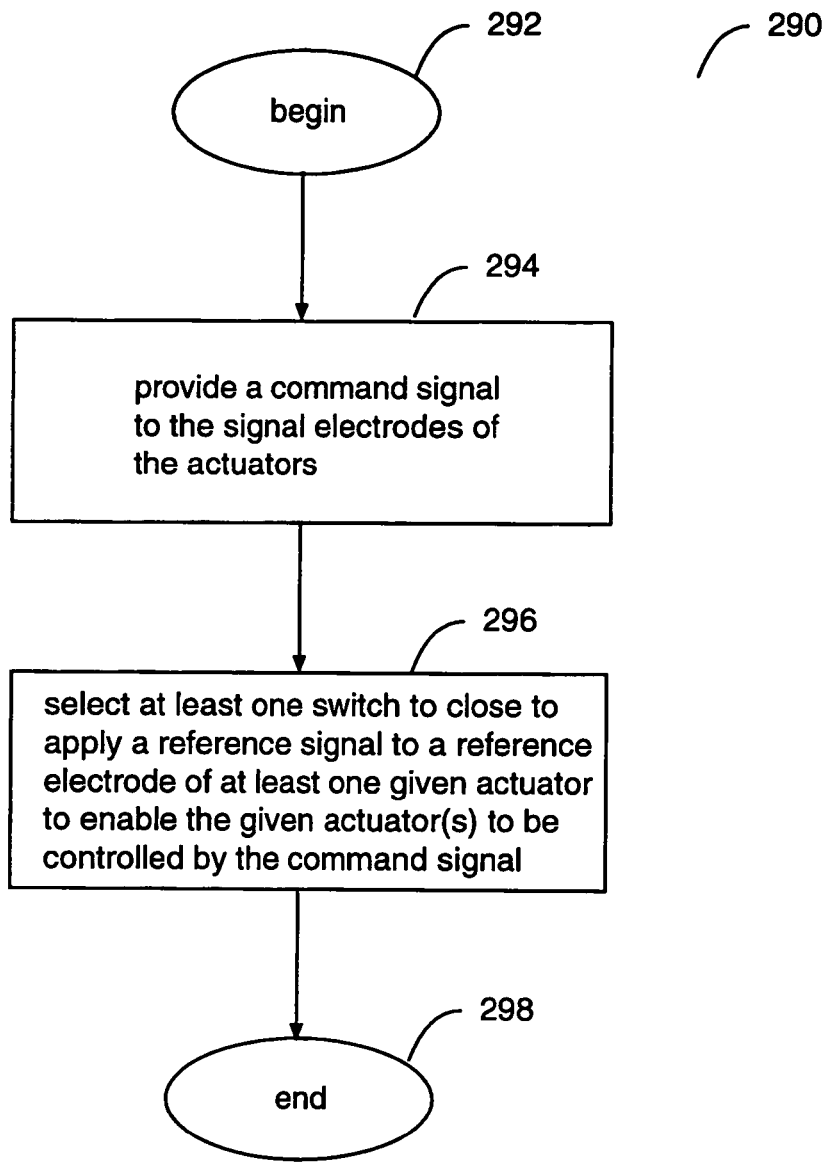
FIG. 20A is a flow diagram of a basic process executed by the DM driver electronics processor of FIG. 2.

FIG. 20A is a flow diagram of a generalized process 290 executed by the DM processor 49 (FIG. 2). The basic function being provided by the generalized process 290 is to enable at least one actuator in the DM actuator array 70 (FIG. 4) to be controlled by the output signal Va 59 of the high voltage amplifier 58 (FIG. 4). The generalized process 290 begins in step 292. In step 294, the output signal Va 59 of the high voltage amplifier 58 is provided to the signal electrodes 161 (FIG. 4) of the actuators in the DM actuator array 70. In step 296, the generalized process 290 selects at least one switch 50 to CLOSE to electrically couple the reference electrode(s) 164 (FIG. 4) of at least one actuator in the DM actuator array 70 to a reference node, e.g., AGND 85. By electrically coupling the reference electrode(s) 164 via the switch(es) to the reference node, the DM driver electronics 40 (FIG. 4) enables at least one actuator in the DM actuator array 70. The generalized process 290 is completed in step 298.

It should be understood that selecting (step 296) alternative actuators in the DM actuator array 70 to be controlled by the output of the high voltage amplifier 58 may be repeated any number of times. It should also be understood that in the embodiment of the DM driver electronics 40 of FIG. 5A, the generalized process 290 can be reduced to only selecting at least one switch in the switch array 50, step 296.

Figure 20B:
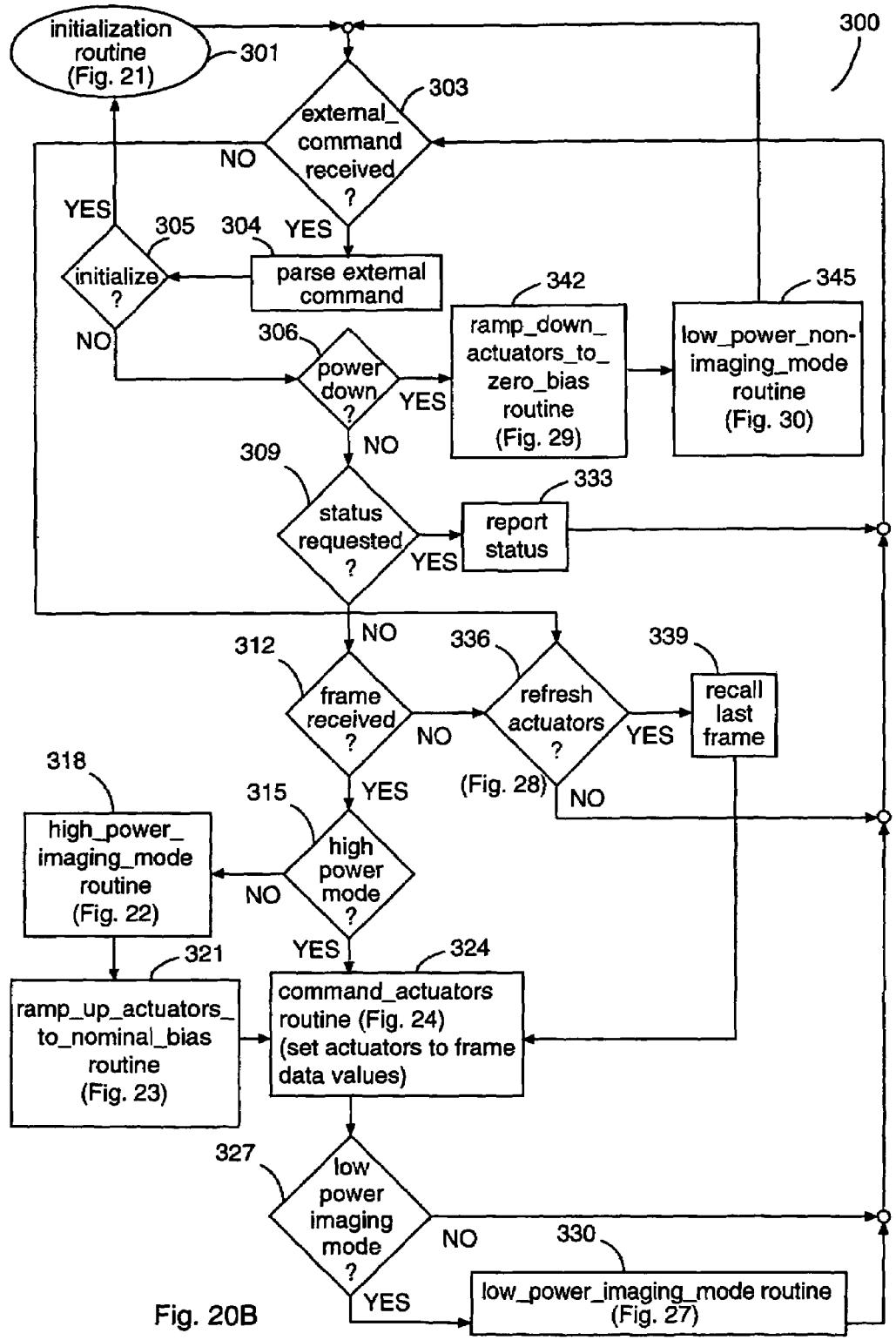
FIG. 20B is a flow diagram of an embodiment of a main processor routine 300 executed by the DM driver electronics processor of FIG. 2.

FIG. 20B is a flow diagram of an embodiment of a process composing a main processor routine 300 executed by the DM processor 49 (FIG. 2). Unless otherwise specified, in the description relating to the main processor routine 300, all hardware references refer to the DM driver electronics 40 of FIG. 2. It should be understood that alternative embodiments of the software may be employed to operate with alternative embodiments of the hardware without departing from the principles of the present invention.

The main processor routine 300 principally coordinates the application of the DM command frames 89 (FIG. 2) received from the external system 88 to the DM actuator array 70 (FIGS. 3 and 4). The main processor routine 300 further provides several modes of operation: high-power imaging mode, low-power imaging mode, and low-power non-imaging mode. The modes optimize power usage, conserving power when operationally possible. The main processor routine 300 also includes switch protection by intelligently coordinating amplifier commands and switch controls. The main processor routine 300 optionally includes an inter-actuator stroke protection routine to limit the stroke differential between adjacent actuators (e.g., actuators 70a and 70b, actuators 70b and 70c, etc.).

Figure 21:
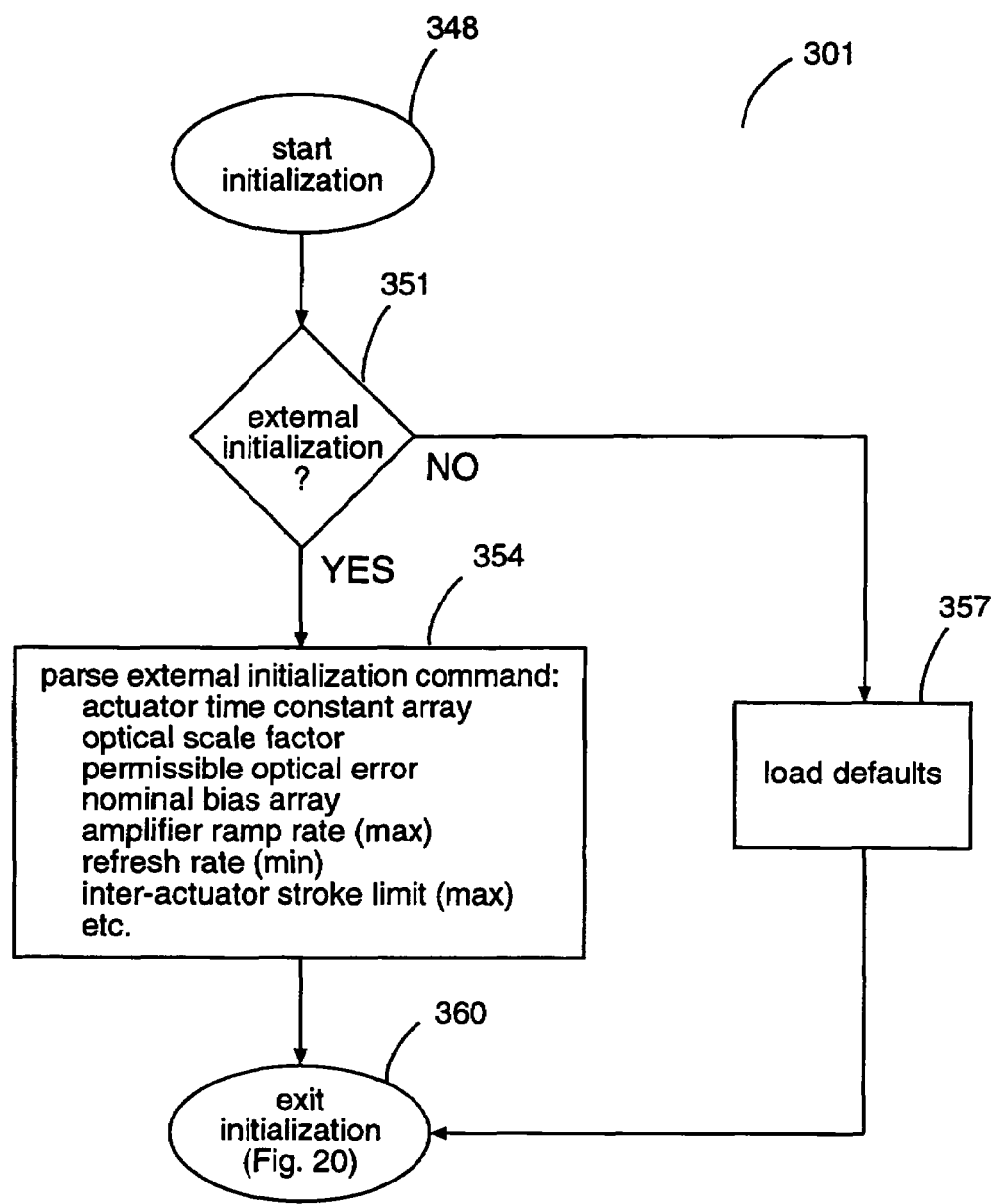
FIG. 21 is a flow diagram of an embodiment of an initialization routine 301 used by the main processor routine of FIG. 20B.

When the DM processor 49 is powered-up, the main processor routine 300 begins an initialization routine 301, detailed in FIG. 21. Referring to FIG. 21, the initialization routine 301 begins in a start_initialization step 348, in which registers and other circuitry are initialized. An external_initialization query 351 determines if the external system 88 is providing initialization parameters. If the external_initialization query 351 is answered YES, then the main processor routine 300 uses the external initialization parameters; otherwise, internal default parameters are used.

The initialization parameters include constants, variable values, and initialization matrices. In particular, the main processor routine 300 expects a subset of at least the following parameters: an actuator time constant array, optical scale factor, permissible optical error, bias_offset array, amplifier ramp rate (max), refresh rate (min), inter-actuator stroke limit (max), or other typical variables used during deformable mirror system operations.

Continuing to refer to FIG. 21, if the initialization parameters are provided in commands from an external system 88, then, in step 354, the initialization parameters are parsed from the external initialization commands. If, however, the external system 88 does not provide initialization parameters, then, in step 357, the initialization routine 301 loads and parses initialization information from internal registers, boot ROM, or other computer readable media and/or memory devices.

After initialization, in step 360, the initialization routine 301 returns control to the main processor routine 300. The initialization parameters are stored to the memory 52 for later use. Some parameters may be loaded into processor registers associated with the error detection logic 61.

Referring again to FIG. 20B, following the initialization routine 301, an external_command_received query 303 determines if an external command has been received from the external system 88. If the external_command_received query 303 is answered YES, then, in step 304, the external command is parsed to determine the type of external command received. A series of queries, queries 305-312 determine process flow based on the type of external command received.

In an initialization query 305, the main processor routine 300 determines if the external system 88 is providing external initialization parameters. If the initialization query 305 is answered YES, then the process returns to the initialization routine 301 (FIG. 21) to employ the external initialization parameters. If the initialization query 305 is answered NO, the processing continues with a power_down query 306.

If the power_down query 306 is answered NO, then a status_requested query 309 is executed. If the status_requested query 309 is answered NO, then a frame_received query 312 is executed.

If the frame_received query 312 is answered YES, then a high_power_mode_on query 315 is executed. If the high_power_mode_on query 315 is answered NO, which is always the case the first pass through the main processor routine 300, then a high_power_imaging_mode routine 318 (FIG. 22) is performed.

Figure 22:
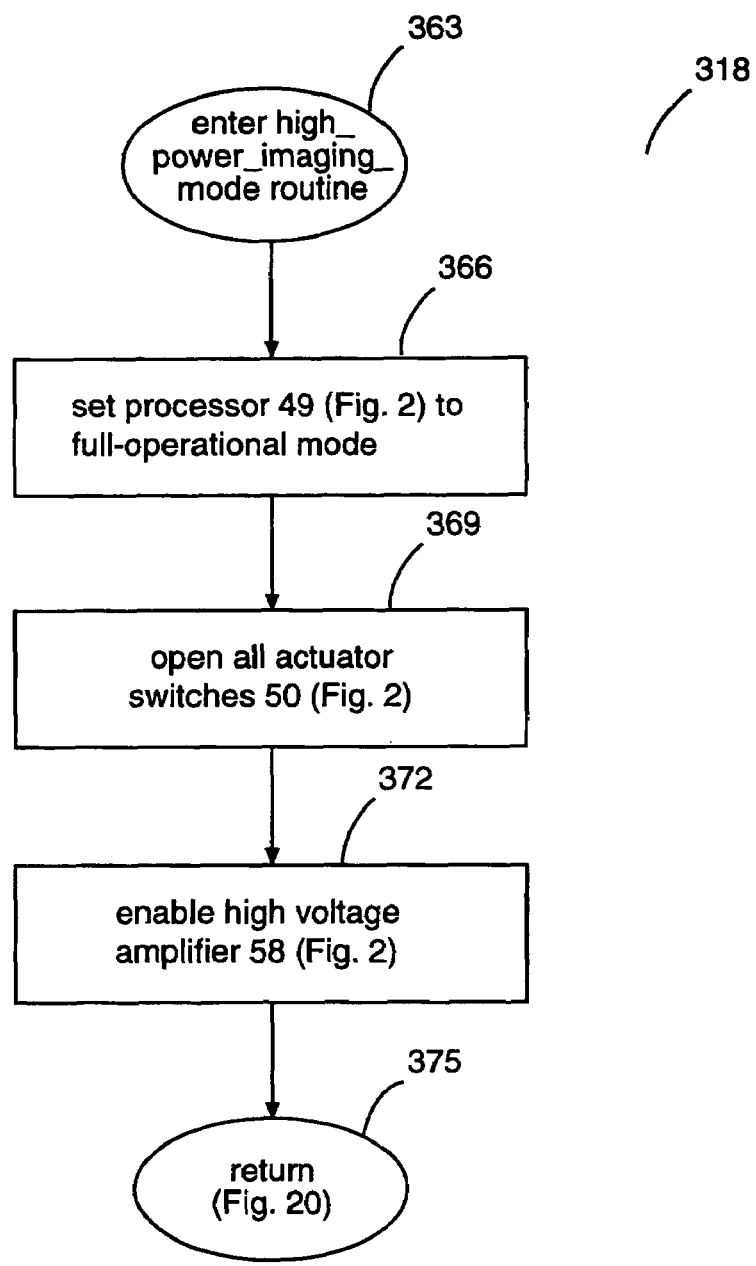
FIG. 22 is a flow diagram of an embodiment of a high_power_imaging_mode routine 318 used by the main processor routine of FIG. 20B.

Referring to FIG. 22, the high_power_imaging_mode routine 318 begins in step 363. In step 366, the DM processor 49 is set to full-operational mode. Note that it is common for processors to have a high power (full-operation) mode, low-power (no operation, hardware-interrupt recovery) mode, and less commonly, a semi-operational mode, where certain processor processes are disabled to offer partial power savings.

Once the DM processor 49 has been set into full-operational mode in step 366, then, in step 369, the high_power_imaging_mode routine 318 commands the DM processor 49 to OPEN all actuator switches in the switch array 50. The DM processor 49 provides commands to the address/control logic 46 to OPEN the switches in the switch array 50, as described in reference to FIG. 6. Note that, in order to prevent the actuators in the DM actuator array 70 from charging and thus preventing the actuators from changing length, the switches in the switch array 50 are OPEN during the power-up sequence associated with the high_power_imaging_mode routine 318.

After all the switches in the switch array 50 are OPENED in step 369, the high_power_imaging_mode routine 318 enables the high voltage amplifier 58 in step 372. In one embodiment of the high_power_imaging_mode routine 318, enabling the high voltage amplifier 58 simply requires changing the state of a high voltage amplifier enable line (not shown) that is used to disable the high voltage amplifier 58. In an alternative embodiment, a power converter 43 must also be enabled, where the power converter 43 provides the +HV 82 to the high voltage amplifier 58. The high_power_imaging_mode routine 318 ends in step 375, returning control back to the main processor routine 300 (FIG. 20B).

Figure 23:
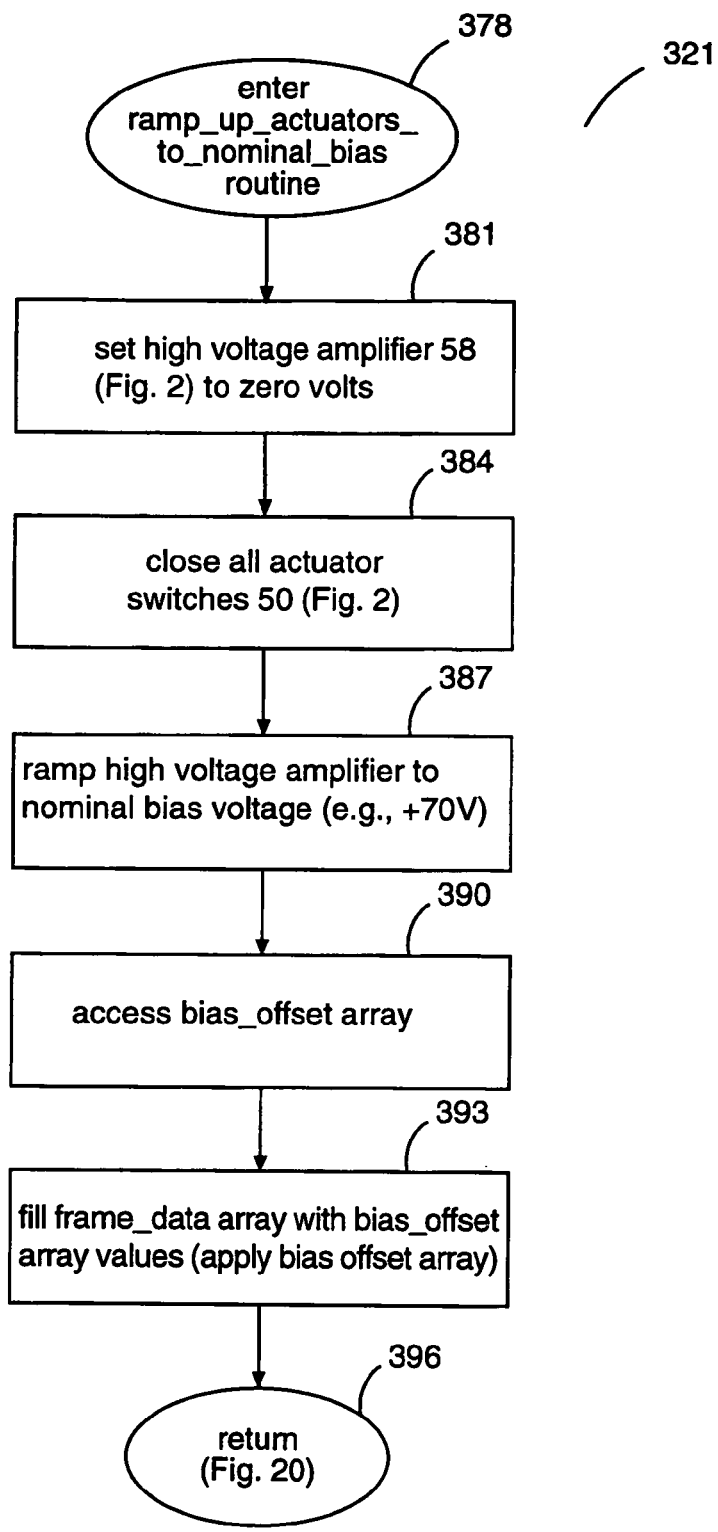
FIG. 23 is a flow diagram of an embodiment of a nom_bias routine 321 used by the main processor routine of FIG. 20B.

Referring again to FIG. 20B, after completing the high_power-imaging_mode routine 318, the main processor routine 300 continues by performing a "ramp up actuator to nominal bias" routine 321, also referred to as the nom_bias routine 321 (FIG. 23). As described in reference to FIG. 23, the nom_bias routine 321 sets the actuators in the DM actuator array 70 to approximately the middle of their linear operating length region (e.g., PMN actuators are ramped-up from 0V to +70V). The nom_bias routine 321 (i) corrects for small variations in sensitivities (i.e., microns per volt) among the actuators populating the DM assembly 10 and (ii) applies a small bias-offset to account for the various, respective, actuator sensitivities to flatten the DM mirror 16.

Referring to FIG. 23, the nom_bias routine 321 begins in step 378. In step 381, the high voltage amplifier 58 is set to 0V. Setting the high voltage amplifier 58 to 0V (or any voltage) requires the DM processor 49 to issue a digital command word (typically, 12- or 16-bit) to the D/A converter 55, which converts the digital command word to a low-level analog voltage and outputs the low level analog voltage to the input of the high voltage amplifier 58. The high voltage amplifier 58 is designed to amplify the low level analog voltage appropriately to drive the actuators in the DM actuator array 70.

After the nom_bias routine 321 sets the high voltage amplifier 58 to 0V in step 381, to ensure the actuators receive no instantaneous voltage change, the nom_bias routine 321 instructs the DM processor 49 to close all the switches in the switch array 50 in step 384. Note that both the actuators in the DM actuator array 70 and the high voltage amplifier 58 start with zero volts, so closing the switches in the switch array 50 causes no instantaneous voltage change to the actuators, and, therefore, no instantaneous current spike. CLOSING all the switches in the switch array 50 is most effectively accomplished by the external system 88 issuing zone data via the zone data lines 97 to the address/control logic 46, as described in reference to FIG. 6. Alternatively, the processor routine may have a set of instructions to CLOSE all the switches in the switch array 50.

With all the switches in the switch array 50 CLOSED by step 384, all the actuators in the DM actuator array 70 track the high voltage amplifier 58, similar to waveforms Va 193 and Vact,amp 208 (FIG. 17) between T=1 and T=5. In step 387, the high voltage amplifier 58 simply drives the actuators in the DM actuator array 70 from 0V to +70V (for PMN actuators). Because a large DM actuator array 70 forms a large capacitive load (i.e., capacitors add in parallel), it is desirable to slew the high voltage amplifier 58 at a reasonable rate to limit both the high voltage amplifier 58 drive current and the current density through the high voltage signal and return lines 64, 67, respectively.

After the actuators in the DM actuator array 70 are commanded to the nominal bias voltage (e.g.,b 70V) in step 387, the nom_bias routine 321 flattens the DM mirror 16 figure by applying a bias offset voltage to each actuator. Each actuator in the DM actuator array 70 has a unique sensitivity (i.e., microns/volt) even though the actuators are typically screened for sensitivity similarity. Therefore, in high-performance adaptive optics applications, a bias_offset array of values corresponding to the actuators is predetermined to "flatten" the DM mirror 16 at bias (e.g., for diagnostic reasons).

Typically, the bias_offset array is calculated by measuring the DM mirror 16 in front of a full-aperture interferometer and determining the bias_offset array in an iterative manner. Of course, if the DM mirror 16 is operated in a closed-loop optical system, the loop can be closed to achieve the same flattening. Usually, however, integration of an adaptive optics system (FIG. 1) progresses such that flattening the DM mirror 16 is desired before all system components (e.g., the wavefront sensor 34, FIG. 1) are integrated into the adaptive optics system. Without all of the system components, the DM mirror 16 cannot be flattened to perform closed-loop, real-time, adaptive optics operations.

In step 390, the DM processor 49 accesses the bias_offset array from memory 52. Recall that the bias_offset array is loaded during the initialization routine 301 (FIG. 21), in either step 354 or 357, and stored to the memory 52 for accessing in step 390.

The bias_offset array is stored in a frame_data array in step 393 so that, after returning control to the main processor routine 300 (FIG. 20B) in step 396, the command_actuators routine 324 (FIG. 24), which applies the frame_data array to the DM actuator array 70, applies the bias_offset voltages to the DM actuator array 70 to flatten the DM mirror 16 at nominal bias.

Figure 24:
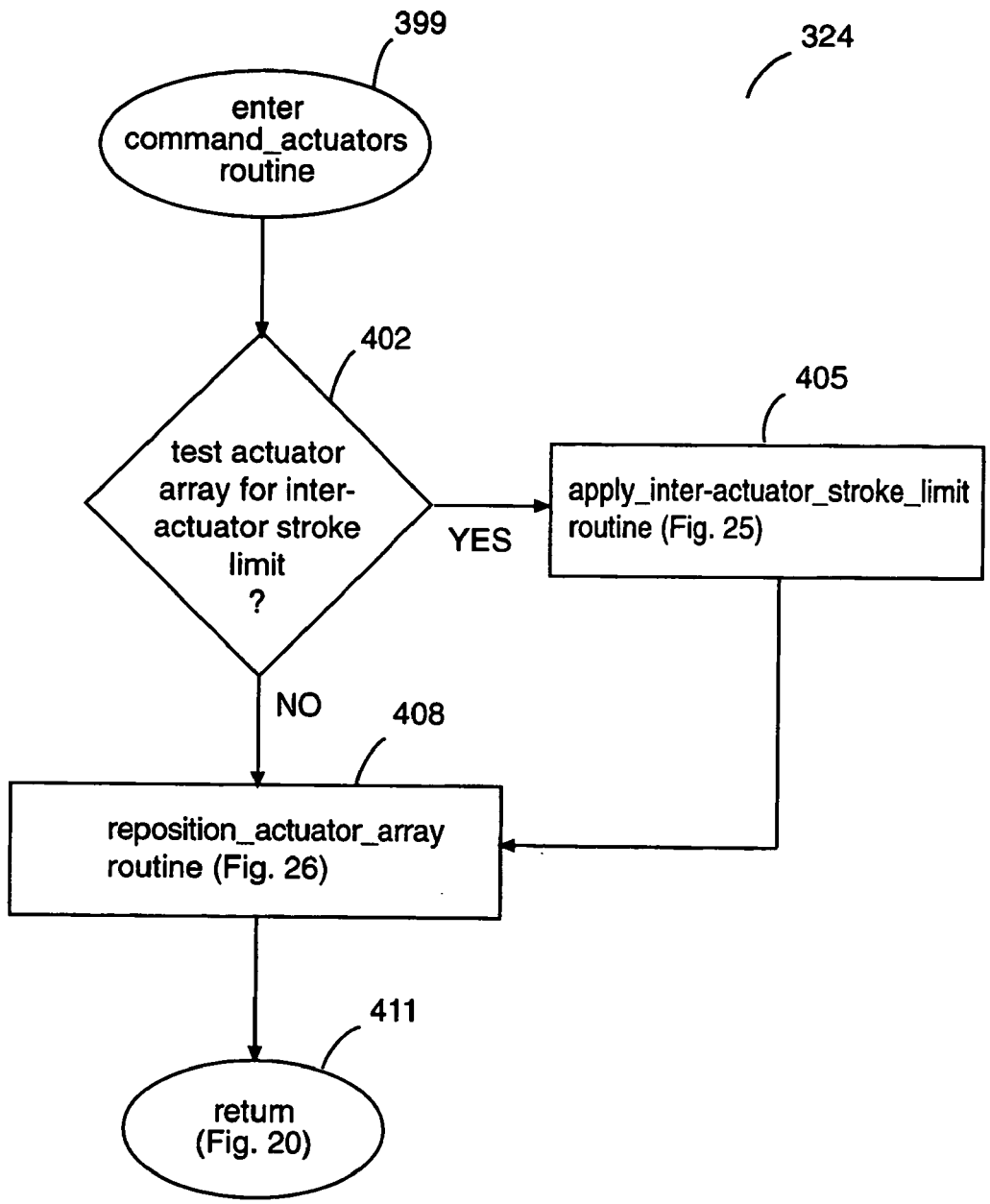
FIG. 24 is a flow diagram of an embodiment of a command_actuators routine 324 used by the main processor routine of FIG. 20B.

FIG. 24 is a flow diagram of an embodiment of a process of the command_actuators routine 324. The command_actuators routine 324 is used by the main processor routine 300, and subroutines (e.g., the nom_bias routine 321), to command individual actuators or zones of actuators. The command_actuators routine 324 uses an "apply_inter-actuator_stroke_limit" routine 405 (FIG. 25) and a reposition_actuator_array routine 408 (FIG. 26) during operation, as discussed below.

After entering the command_actuators routine 324 in step 399, the command_actuators routine 324 performs a "test actuator for inter-actuator stroke limits" query 402 to determine whether to scan and process the actuator commands in the DM command frames 89 for inter-actuator stroke limits. The "test actuator for inter-actuator stroke limits" query 402 typically tests a flag, corresponding to an initialization parameter from the external system 88 and parsed in step 354 (FIG. 21), or an internal default initialization parameter loaded in step 357 (FIG. 21). If the "test for inter-actuator stroke limits" query 402 is answered YES, the command_actuators routine 324 calls the "apply_inter-actuator_stroke_limit" routine 405 (discussed in reference to FIG. 25). If the "test actuator for inter-actuator stroke limits" query 402 is answered NO (and after the "apply_inter-actuator_stroke_limit" routine 405), then the command_actuators routine 324 calls a reposition_actuator_array routine 408. After the actuators in the DM actuator array 70 are repositioned by the reposition_actuator_array routine 408, the command_actuators routine 324 returns control back to the calling routine (e.g., the nom_bias routine 321, FIG. 23) in step 411.

Figure 25:
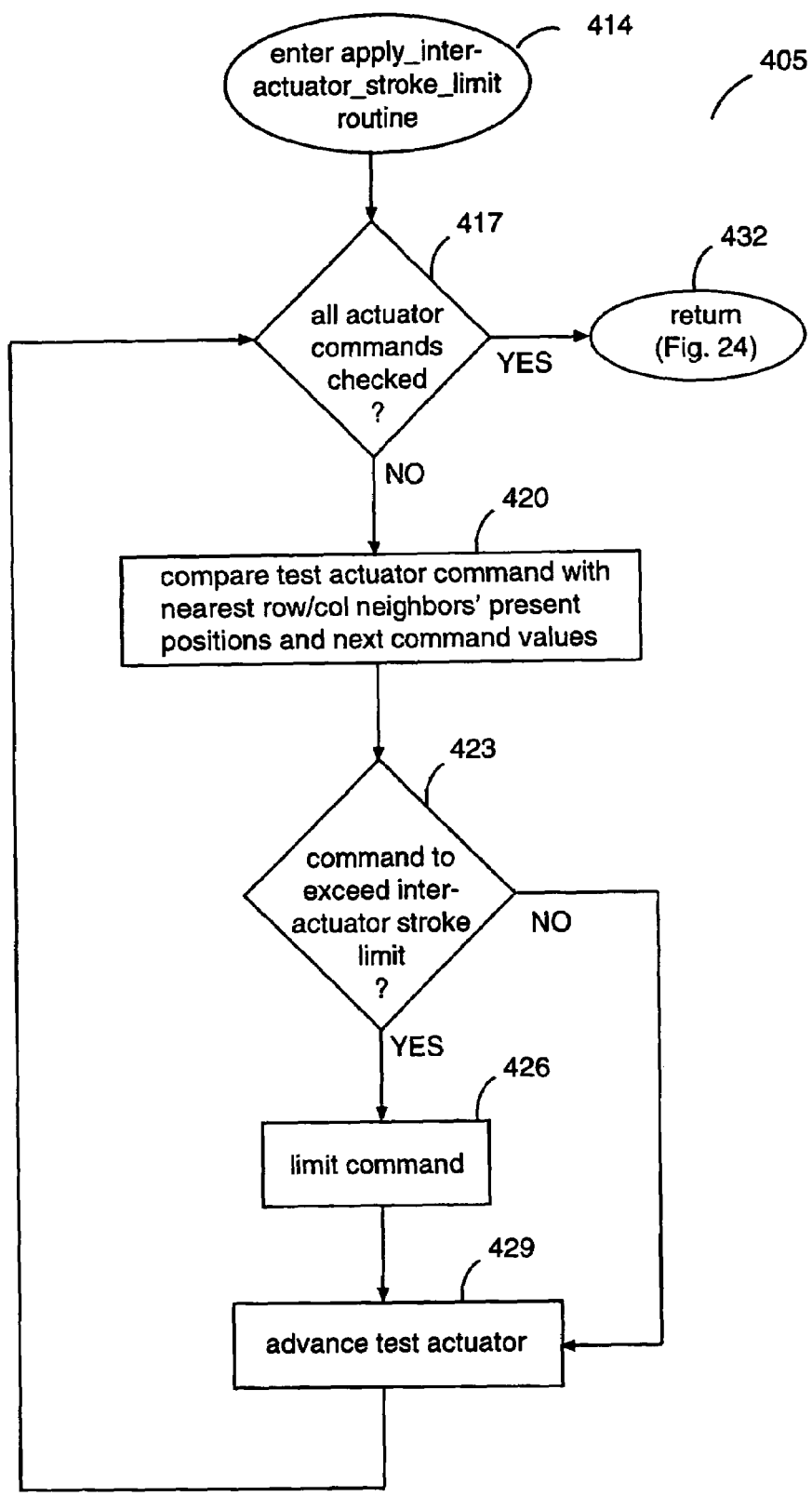
FIG. 25 is a flow diagram of an embodiment of an "apply inter-actuator stroke limit" routine 405 called by the command_actuators routine 324 of FIG. 24.

FIG. 25 is a flow diagram of the "apply_inter-actuator_stroke_limit" routine 405, optionally called by the command_actuators routine 324 (FIG. 24). In general, the "apply_ inter_actuator_stroke_limit" routine 405 tests each actuator command value to each vertical and horizontal nearest-neighbor command value.

In one embodiment, the values in the present DM command frame 89b are also compared to values in the previous DM command frame 89a. Differentials between values in the DM command frames 89b, 89a are mathematically reduced to limit inter-actuator stroke differentials, thereby limiting stress at the interface between the DM mirror 16 and the actuators in the DM actuator array 70. Note that it is preferable, though not always possible, to design the actuator array 70 and DM mirror 16 to be within force limitations, such that electrical protection via software (i.e., the "apply inter-actuator stroke limit" routine 405) or electrical protection via electronics is not required. Mechanical protection alone is limited by the required stroke range of each actuator and the required spacing between each actuator, the combination of which determines stress levels at the interface between the DM mirror 16 and actuators in the DM actuator array 70.

Specifically, after entering the "apply_inter-actuator_stroke_limit" routine 405 in step 414, an all_actuators_checked query 417 is performed. If the all_actuators_checked query 417 is answered NO, then in step 420, an actuator command (i.e., a "test" actuator command) is compared to nearest row/column neighbor present position and next position command values. Worrying about the previous command values applies to multiplexer DM driver systems because, unlike traditional DM driver systems which update each actuator in the DM assembly 10 at the same time (minus small processing and addressing delays—microseconds, typically—by a controller communicating with one amplifier per actuator), multiplexer DM driver electronics 40 command a single actuator at a time for a single amplifier system in the case of not performing a zone command. By way of example, the high voltage amplifier 58 drives one given actuator at a time to a specified length. The given actuator is then at a commanded position with respect to each of its nearest-neighbors, which may still be at a length specified by the previous DM command frame 89a or the present DM command frame 89b (FIG. 2). Thus, both the previous and next positions are preferably considered by the apply_inter-actuator_stroke_limit routine 405.

There are various techniques that may be used to test and limit the inter-actuator stroke precommand/command (i.e., previous position/next position) and command/command (i.e., next position/next position) differences between adjacent actuators in the DM actuator array 70. One such technique for comparing actuator commands within the present DM command frame 89b includes calculating the following formula in a standard software control loop:

If $|\text{Vact\_cmd}(i, j) - \text{Vact\_cmd}(i+1, j)| > \text{Vdelta\_max}$, then $\text{Vact\_cmd}(i, j) =$ $SGN(\text{Vact\_cmd}(i, j) \times \text{Vact\_cmd}(i+1, j)) \times \text{Vdelta\_max} +$ $\text{Vbias} - (\text{Vbias} - \text{Vact\_cmd}(i+1, j))$, where Vbias is the nominal actuator bias voltage, Vdelta_max is the maximum differential bias voltage allowed between adjacent actuators (e.g., actuators 70a and 70b), i is an actuator array row counter, and j is an actuator array column counter. The same equation may be used for comparing the previous DM command frame 89a to the present command frame 89b, where Vact_cmd(i,j) represents the present DM command frame value and Vact_cmd(i+1,j) is the previous DM command frame value since looking ahead results in looking at an actuator command from the previous DM command frame (i.e., not yet updated with a present command value). Note that i and j are used for convenience to indicate a two-dimensional array. Optionally, a linked list or other data structure may be employed to keep track of inter-actuator stroke information, where adjacency may be indicated in a field in each cell corresponding to the actuators in the linked list. In the linked list case, typical techniques to traverse through the linked lists are performed to apply the stroke limiting techniques described above.

It is also possible to extend the formula to compare at the same time both previous-to-present state and present-to-present state inter-actuator stroke voltages, thus reducing data latency due to calculating two equations rather than one. It should be understood that the memory 52 is used to store voltage command arrays to support the formula calculations.

In effect, the embodiments of the formula encompasses steps 423, 426 and 429. The steps 423, 426, and 429 are shown as separate steps to encompass alternative formula embodiments. After all actuator command values have been checked (i.e., processed), then in step 432, the "apply_inter_actuator_stroke_limit" routine 414 returns control back to the command_actuators routine 324 (FIG. 24).

Referring again to FIG. 24, the command_actuators routine 324 is ready to reposition the actuators in the DM array of actuators 70. The commands that are to be applied to the actuators are not expected to degrade the mechanical performance of the DM mirror 16 since (i) inter-actuator stroke differentials are not detrimental to the mirror (step 402 answered NO) or (ii) the commands to adjacent actuators have been adjusted (step 405). The DM command frame is next applied to the DM array of actuators 70.

Figure 26:
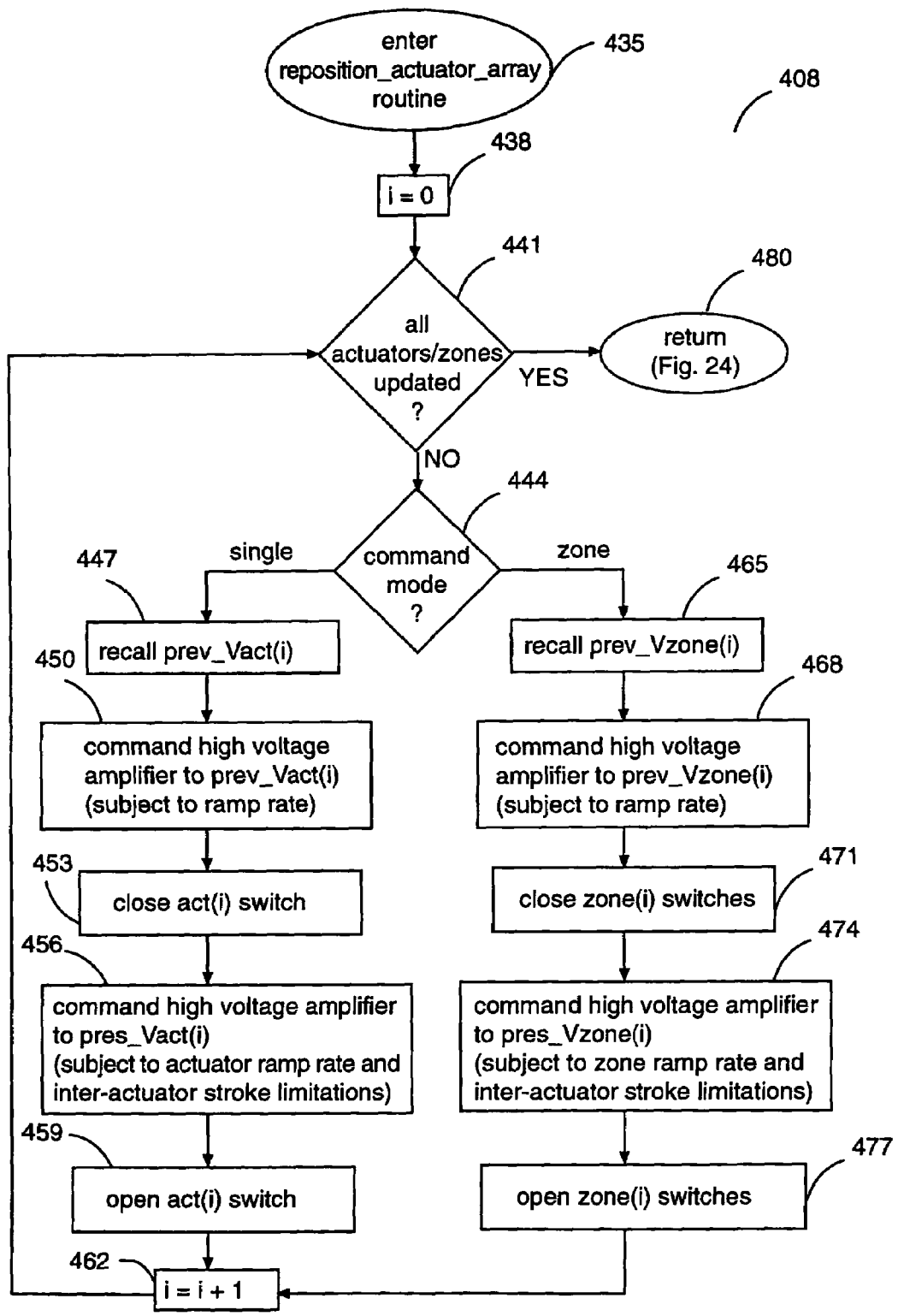
FIG. 26 is a flow diagram of an embodiment of a reposition_actuator_array routine 408 called by the command_actuators routine 324 of FIG. 24.

FIG. 26 is a flow diagram of an embodiment of a process of the reposition_actuator_array routine 408 called by the command_actuators routine 324 (FIG. 24). The reposition_actuator_array routine 408 provides for both an individual actuator mode and an actuator zone mode.

The present DM command frame 89b, optionally processed by the "apply inter-actuator stroke limit" routine 405 (FIG. 25) or a pointer to the present DM command frame 89b, is expected to be passed to the reposition_actuator_array routine 408 as a parameter in the embodiment depicted. After entering the reposition_actuator_array routine 408 in step 435, a loop counter i, is initialized (e.g., i=0) in step 438. A loop, in which each command in the DM command frames 89 are issued to one or more respective actuator(s) in the DM actuator array 70, begins with an all_actuators/zones_updated query 441.

If the all_actuators/zones_updated query 441 is answered NO, then a command_mode query 444 is performed. If the command_mode query 444 determines the external command to be providing single actuator commands (i.e., single command mode), then the previous command voltage corresponding with the loop counter (i.e., prev_Vact(i)) is recalled from the memory 52 in step 447. If operating in zone mode, then the process instead goes to step 465, in which the previous zone voltage corresponding with the loop counter, i, is recalled from the memory 52.

The reason for recalling the previous command voltage is the same as discussed in reference to the nom_bias routine 321 (FIG. 23), which is to have the high voltage amplifier 58 output voltage and voltages on the actuators in the DM actuator array 70 the same before CLOSING the switch(es) corresponding to the actuator(s) to avoid large currents in the circuitry and actuators. It should be understood that the actuators in the DM actuator array 70 are charge storage elements and, therefore, cause instantaneous current surges should a path be created to a voltage potential different from the stored voltage potential. In this case, the path is created when the respective switches are CLOSED and the high voltage amplifier 58 output has a voltage other than what is presently on the actuator. Thus, if operating in zone mode, the zone voltage is stored in each corresponding actuator memory location in case the single actuator command mode is later selected.

For convenience, only the single actuator command mode is described, but for the following loop steps described for the single actuator command mode, steps 447, 450, 453, 456, and 459. Corresponding zone command mode steps 465, 468, 471, 474, and 477, respectively, are performed in the case of the reposition_actuator_array routine 408 operating the DM in zone mode. The correspondence between processing steps for single actuator mode and zone mode is possible because zone mode is essentially treating a plurality of actuators in the DM actuator array 70 as a group, which simply lowers the resolution of the DM mirror 16. But, zone mode has the same properties among the actuator groups as among single actuators when operating in single actuator mode.

In step 450, the reposition_actuator_array routine 408 executed by the DM processor 49 commands the high voltage amplifier 58 to the previous actuator voltage. In one embodiment, the rate at which the high voltage amplifier 58 is slewed to the previous actuator voltage is controlled by an actuator_ramp_rate variable, which is learned during a self-calibration mode or loaded by the main processor routine 300 (FIG. 20B) during the initialization routine 301. It should be noted that self-calibration of the DM electronics, actuators, and mirror response is possible through the use of the initialization routine 301, which requires the external system 88 to provide an optical feedback for the mirror measurement (i.e., optical displacement) portion of the calibration.

After the previous actuator voltage is settled on the output of the high voltage amplifier 58, the DM processor 49 executing the reposition_actuator_array routine 408 commands the switch (e.g., switch 50*a*) corresponding to the loop counter, i, to CLOSE in step 453. The actuator(s) coupled to the CLOSED switch tracks the high voltage amplifier 58 in step 456, in which the high voltage amplifier 58 is slewed from the previous actuator command voltage to the present actuator command voltage. It should be noted that there may be instances in which the previous actuator command voltage is the same as the present actuator command voltage (e.g., during imaging), which allows step 456 to be optionally by-passed to improve the actuator array 70 update rate.

After the actuator in the DM actuator array 70 corresponding to the loop counter, i, has settled to the present actuator voltage specified by the respective command, the respective switch in the switch array 50 is OPENED in step 459 to disable the actuator (i.e., decouple the actuator from the high voltage amplifier 58). To reposition the next actuator in the DM actuator array 70, the loop counter, i, is incremented (or decremented) in step 462. In an alternative embodiment, of course, another form of looping may be used, such as a while-do loop, or other software construct, such as recursion. The loop continues until all actuators (or zones) are updated.

When the loop completes, the reposition_actuator_array routine 408 exits in step 480, returning control to the command_actuators routine 324 (FIG. 24). Referring briefly again to FIG. 24, in step 411, the command_actuators routine 324 is completed and control returns to the main processor routine 300 (FIG. 20B). At this point, the DM mirror 16 is optically flat—within a specified tolerance—and DM command frames 89 can be applied.

Referring again to the main processor routine 300 in FIG. 20B, after the actuators in the DM actuator array 70 have been set to nominal bias and offset voltages in the nom_bias routine 321, the present DM command frame 89*b* is applied to the actuators by the command_actuators routine 324 (FIG. 24). The embodiment of the command_actuators routine 324 discussed above is not repeated here. It is assumed that parameters used to cause the command_actuators routine 324 to enter certain modes (e.g., test for inter-actuator stroke) are passed to the command_actuators routine 324.

After applying the present DM command frame 89*b*, the main processor routine 300 performs a low_power_imaging_mode query 327. If the DM driver electronics 40 is not specified to operate in the low_power_imaging_mode, then loop control returns to the external_command_received query 303. If the DM driver electronics 40 is specified to operate in low power image mode, then a low_power_imaging_mode routine 330 is executed. The low_power_imaging_mode routine 330 has a relatively slow refresh rate, thus taking advantage of actuators in the DM actuator array 70 which have very large time constants, such as PMN actuators (see FIG. 12), and a switch design (e.g., switch 50*a*, FIG. 8) that has very high impedance and low forward and reverse leakage properties. In one embodiment, the main processor routine 300 defaults to the low_power_imaging_mode if a present DM command frame 89*b* is not received after a predefined time period, such as several minutes.

Figure 27:
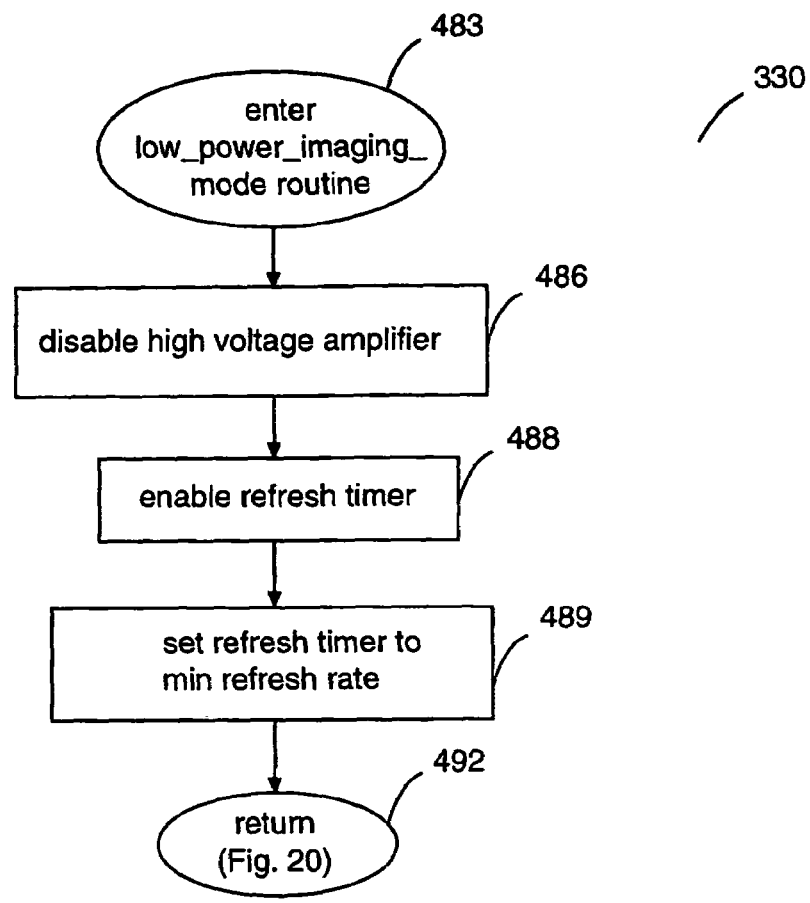
FIG. 27 is a flow diagram of an embodiment of a low_power_imaging_mode routine 330 used by the main processor routine of FIG. 20B.

FIG. 27 is a block diagram of an embodiment of the low_power_imaging_mode routine 330. After entering the low_power_imaging_mode routine 330 in step 483, the high voltage amplifier 58 is disabled in step 486. In an alternative embodiment, the high voltage amplifier 58 is set to 0V prior to being disabled. In yet another alternative embodiment, the power converters 43 are also disabled. In yet another alternative embodiment, all non-critical logic is powered down to reduce system power consumption to a bare minimum.

The low_power_imaging_mode routine 330 continues by enabling a refresh timer in step 488, then setting the refresh timer to the minimum refresh rate in step 489. The refresh timer is decremented and/or monitored by other routines in the main processor routine 300, or by the DM processor 49, itself, in a hardware-interrupt routine or software-interrupt routine. When the refresh timer reaches a predetermined value, such as zero in decrement mode, the main processor routine 300 (FIG. 20B), via the DM processor 49, re-enables all disabled circuitry for continued operation. The low_power_imaging_mode routine 330 returns control to the main processor routine 300 (FIG. 20B) in step 492.

Referring again to FIG. 20B, the main processor routine 300 continues to check whether an external command has been received by the external_command_received query 303. If the external_command_received query 303 is answered NO, then a refresh_actuators_query routine 336 (FIG. 28) is performed.

Figure 28:
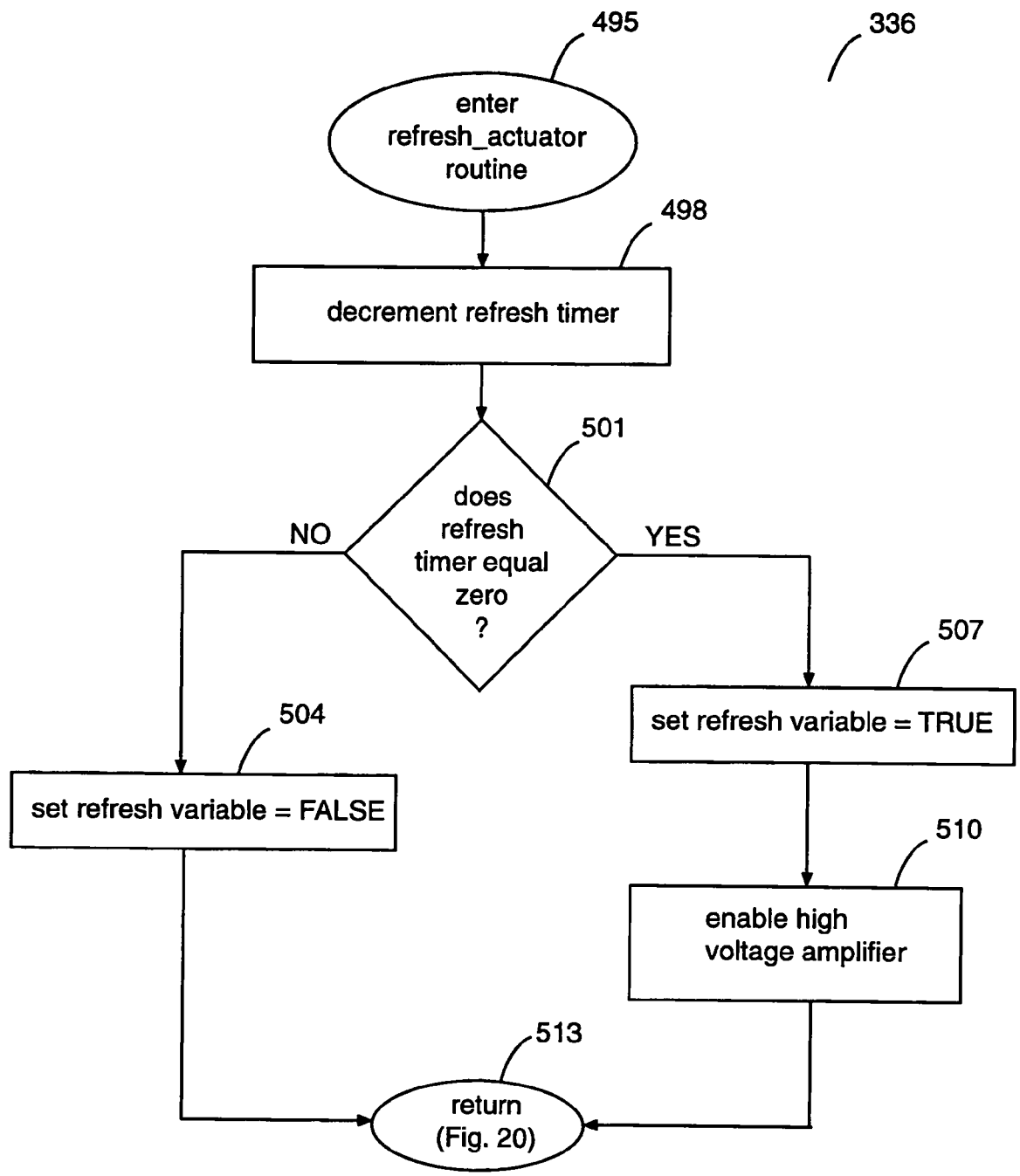
FIG. 28 is a flow diagram of an embodiment of a refresh_actuators_query routine 336 used by the main processor routine of FIG. 20B.

FIG. 28 is a flow diagram of an embodiment of a refresh_actuators_query routine 336. After entering the refresh_actuators_query routine 336 in step 495, the refresh timer is decremented in step 498. A "refresh timer equals zero?" query 501 is executed by the refresh_actuators_query routine 336 to determine whether to set a refresh variable to logical TRUE or FALSE. If the "refresh timer equals zero?" query 501 is answered NO, then, in step 504, the refresh variable is set to logical FALSE. If the "refresh timer equals zero?" query 501 is answered YES, then the refresh variable is set to logical TRUE in step 507. The refresh_actuators_query routine 336 enables the high voltage amplifier 58 in step 510 to prepare for refreshing the DM actuator array 70. Instructions for re-enabling other circuit components may also be executed, if necessary. Program control is returned to the main processor routine 300 (FIG. 20B) in step 513.

Referring again to FIG. 20B, the refresh variable determines program flow from the refresh_actuators_query routine 336. If the refresh variable returned is set to NO, then program control returns to the external_command_received query 303. If the refresh variable returned is set to YES, then, in step 339, the DM processor 49 recalls the previous DM command frame 89a from the memory 52 or internal memory, registers, or cache (not shown) in the DM processor 49. The previous DM command frame 89*a* is then issued by the main processor routine 300 to the command_actuators routine 324 for issuance to the DM actuator array 70.

The low_power_imaging_mode sequence includes steps 303, 336, 339, 324, 327, 330, then returns back to step 303. In the embodiment shown and described, once set in low power image mode, the DM driver electronics 40 continues recharging the actuators in the DM actuator array 70 until a new DM command is determined to have been received by the external_command_received query 303. In practice, an adaptive optics system may use the low_power_imaging_mode as a so-called "active set-and-forget" mode, for such applications as imaging for extended periods of time or recording data for performing diagnostic optical train analysis.

Continuing to refer to FIG. 20B, if an external_command requests status, determined by the status_requested query 309, then, in step 333, the DM processor 49 issues a status report of the DM driver electronics 40 (FIG. 2) to the external system 88 via the DM driver electronics interface 48. The status report may include diagnostic information, error information, previous/present DM command frames, high voltage amplifier 58 output voltage, enable/disable status, actuator command inter-actuator stroke limit detected, or any other typical or non-typical, DM driver electronics 40, application-specific, status information. Such status information may include data determined or measured by the error detection logic 61.

Another mode provided by the embodiment of the main processor routine 300 is a power_down mode. If the power_down query 306 is answered YES, then a "ramp down actuators to zero bias" (ramp down) routine 342 (FIG. 29) is called by the main processor routine 300. Zero bias is applied when the DM mirror 16 is not in use to put the actuators in the DM actuator array 70 in a known state and because discharging charge storage devices when not in use is generally considered prudent.

Figure 29:
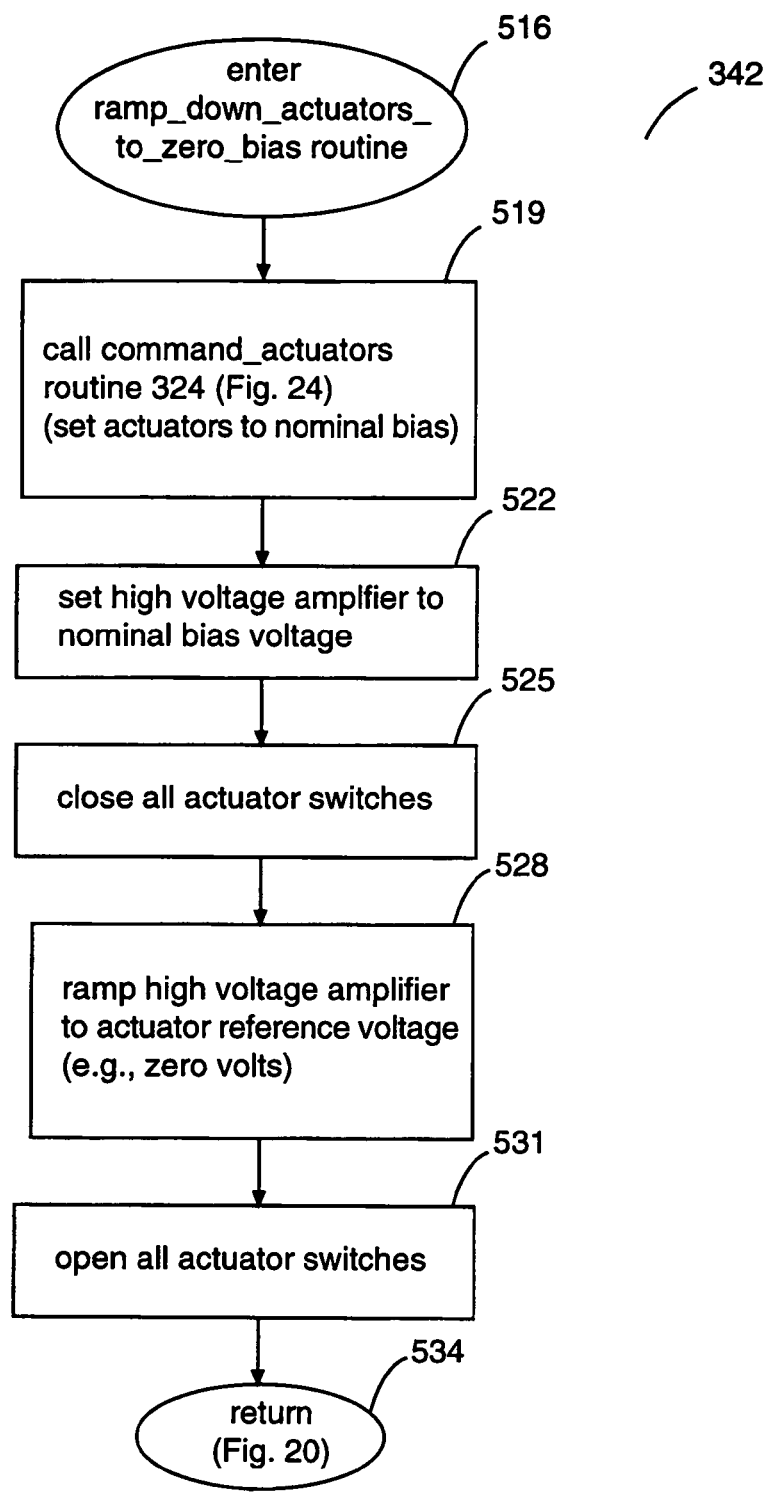
FIG. 29 is a flow diagram of an embodiment of a ramp_down routine 342 used by the main processor routine of FIG. 20B.

FIG. 29 is a flow diagram of an embodiment of the ramp_down routine 342, which is a process used to ramp down the DM mirror 16 (i.e., drive the actuators in the DM actuator array 70 to 0V, safely). After entering the ramp_down routine 342 in step 516, the ramp_down routine 342 calls the command_actuators routine 324 (FIG. 24) with an array of nominal bias commands (e.g., +70V) in step 519. Again, to keep currents to a minimum, the high voltage amplifier 58 output is set to the (same) nominal bias voltage to which the actuators in the DM actuator array 70 are charged in step 522 before CLOSING all the switches in the switch array 50 to ramp down the DM mirror 16.

After CLOSING all the switches in the switch array 50 in step 525, the high voltage amplifier 58 is ramped-down to the actuator reference voltage, Vref 87 (e.g., 0V) in step 528. In an alternative embodiment, the ramp_down routine 342 ramps down the actuators in the DM actuator array 70 individually, staying within inter-actuator stroke limitations during the ramp_down process and employing other safety measures during actuator control. In step 531, the switches in the switch array 50 are OPENED before returning control to the main processor routine 300 (FIG. 20B) in step 534.

Referring again to FIG. 20B, after the ramp_down routine 342 is completed, a low_power_non-imaging_mode routine 345 (FIG. 30) is called. The low_power_non-imaging_mode routine 345 provides the DM driver electronics 40 with a means for minimizing power during periods when the DM mirror 16 is not being used by the adaptive optics system (FIG. 1). The low_power_non-imaging_mode routine 345 is different from the low_power_imaging_mode routine 330 (FIG. 27) in that the low_power_non-imaging_mode routine does not maintain a desired surface figure on the DM mirror 16, refreshing actuators periodically, randomly, pseudo-randomly, or by external command.

Figure 30:
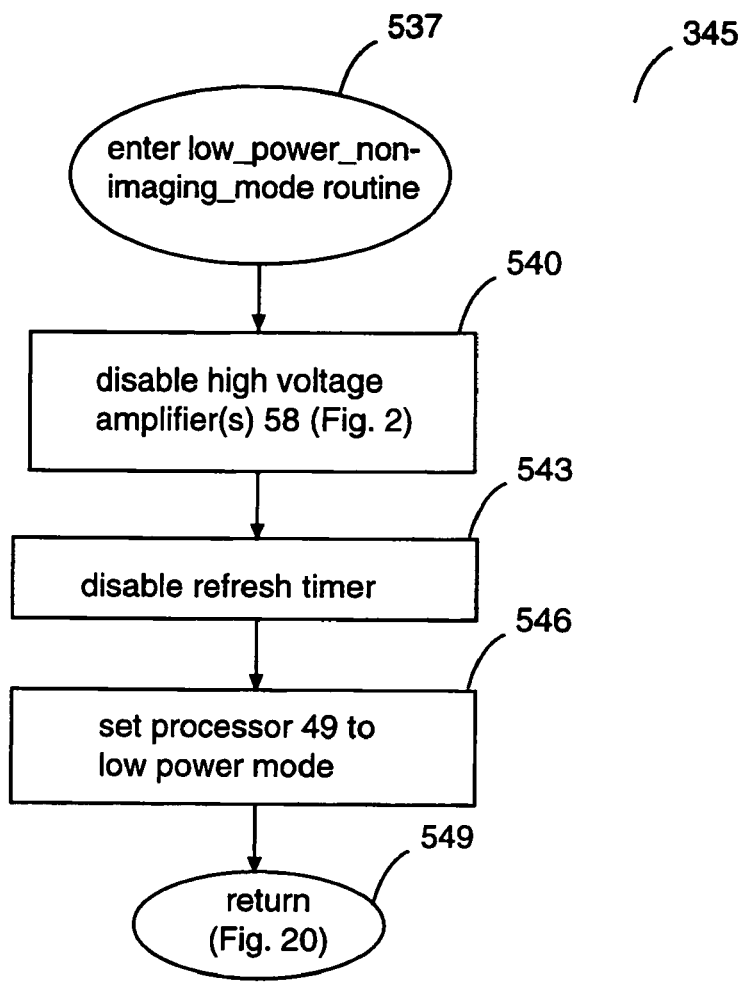
FIG. 30 is a flow diagram of an embodiment of a low_power_non-imaging_mode routine 345 used by the main processor routine of FIG. 20B.

FIG. 30 is a diagram of an embodiment of the low_power_non-imaging_mode routine 345. After entering the low_power_non-imaging_mode routine 345 in step 537, the high voltage amplifier 58 is disabled in step 540. The refresh timer is disabled in step 543, then the DM processor 49 is set to a low power mode in step 546. The low_power_non-imaging_mode routine 345 returns control to the main processor routine 300 (FIG. 20B) in step 549, where the initialization routine 301 is executed to allow for new or default initialization values to be applied during continued operations of the DM assembly 10. In alternative embodiments, additional (or fewer) electronic devices are powered down to maximize energy savings.

The software of FIGS. 20–30 is general enough to support many forms of the DM driver electronics 40, including switch configurations different from those depicted in FIG. 4. For example, the software is capable of controlling electronics that employ switches that disconnect the actuators in the actuator array 70 from the power amplifier(s) 58, or disconnect the actuators from the amplifier(s) and reference node.

It should be understood that the methods of the present invention (FIGS. 20–30) can be implemented in program instructions executable by the DM processor 49. The program instructions may be stored in a processor readable medium, such as the memory 52, ROM, CD-ROM, or magnetic disk. The processor readable medium may be local to the DM driver electronics 40, part of the external system 88, or part of a remote storage system (not shown). If remote from the DM driver electronics 40, the instructions are provided by the storage medium via the DM driver electronics interface 48 over a computer network employed to transport the program instructions from the remote storage medium to the DM driver electronics 40.

System Examples

Figure 31:
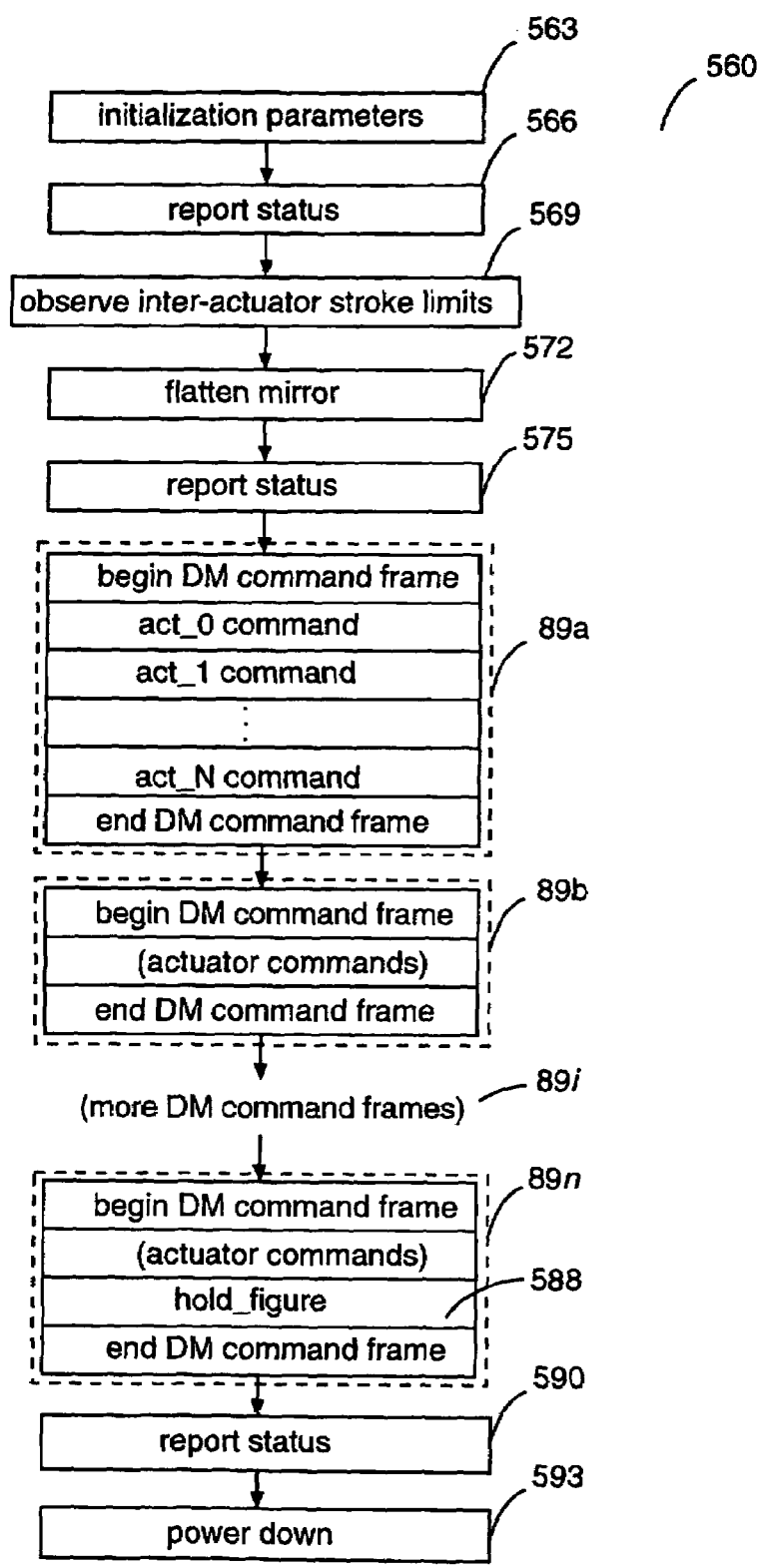
FIG. 31 is an example command set issued by the external system to the DM driver electronics system of FIG. 2 to operate the DM.

FIG. 31 is an illustration of an example stream of commands 560 issued from an external system 88 to the DM driver electronics 40 (FIG. 2). The stream of commands 560 provides a set of instructions to initialize, power up, operate, and power down the DM mirror 16 using the program instructions of FIGS. 20–30 operating in conjunction with the DM driver electronics 40.

The stream of commands 560 begins communication with the DM driver electronics 40 by providing initialization parameters in command 563. Upon receipt of the initialization parameters, the main processor routine 300 (FIG. 20B) enters the initialization routine 301 (FIG. 21). Various initialization parameters (not shown) are initialized with the information provided by the external system 88; initialization parameters not specified in the initialization parameters of command 563 use default parameters stored in the memory 52.

A report_status command in command 566 requests the DM processor 49 to gather status information and report the status information back to the external system 88. According to the flow diagram representing the main processor routine 300, the report_status command in command 566 is identified by the status_requested query 309 and responded to in the form of a status report by step 333.

Following the status check, the external system 88 instructs the main processor routine 300 to observe inter-actuator stroke limits in command 569. An observe_inter-actuator_stoke_limits parameter is typically provided in the initialization parameters of command 563, but indicated as a separate command in FIG. 31 to emphasize this feature of the program instructions of the main processor routine 300. The observance of inter-actuator stroke limits is determined by the "test actuator for inter-actuator stroke limits" query 402 in the command_actuators routine 324 (FIG. 24) and applied by the "apply_inter-actuator_stroke_limit" routine 405 (FIG. 25).

Once all the pre-operational checks and initializations are complete, the external system 88 issues a flatten_mirror command 572 to begin operations. The flatten_mirror command in command 572 exercises the high_power_imaging_mode routine 318 (FIG. 22) and the nom_bias routine 321 (FIG. 23). The flatten_mirror command 572 instructs the DM processor 49 to flatten the DM mirror 16 at nominal bias (i.e., "go to nominal bias and add offsets to flatten the mirror"). To flatten the DM mirror 16, all or substantially all circuitry—low voltage and/or high voltage circuitry—is enabled by the DM processor 49 in the high_power_imaging_mode routine 318 (FIG. 22), and the bias voltage commands and bias offset array voltage commands are accessed by the DM processor 49 from the memory 52 in step 390 of the nom_bias routine 321 (FIG. 23). To ensure operational readiness, the external system 88 checks the status of the DM electronics again with another report_status command in command 575.

Once the DM driver electronics 40 is fully operational, the external system 88 issues DM command frames 89*a*, 89*b*, 89*i*, 89*n* (collectively 89) to the DM driver electronics 40. The DM command frames 89 are issued to correct wavefront errors possibly caused by many factors, including: error terms caused by other mirrors in the AO system, atmospheric turbulence, thermal effects on structural elements such as optical bench equipment, thermal mismatches among various materials in the DM assembly 10 itself, or actuator sensitivity variations due to aging, temperature, or humidity in the field environment. Closed-loop calculations by the external system 88 (see FIG. 1) determine the individual actuator commands in the DM command frames 89*a*, 89*b*, 89*i*, 89*n*, or zone actuator commands (not shown).

In the last DM command frame 89*n* of the sequence, a hold_figure command 588 instructs the DM processor 49 to maintain the mirror surface figure (i.e., peaks and valleys effectuated by the actuators pushing and pulling on the back of the mirror—or pushing and not pushing on the back of the mirror in an alternative mechanical design of the DM) until given further instructions. This is the so-called set-and-forget mode, which the multiplexed DM design is well-suited to handle. Thus, the DM driver electronics 40 operates in the low_power_imaging_mode, as discussed in reference to the low_power_imaging_mode routine 330 (FIG. 27) and flow in FIG. 20B among steps 303, 336 (FIG. 28), 339 (FIG. 24), 324, 327, and 330 (FIG. 27).

In the low_power_imaging_mode, the DM driver electronics 40 operates while expending as little power as necessary to maintain the mirror surface figure within the error tolerance afforded to the DM mirror 16 by the adaptive optics system (FIG. 1). The error budget may be provided in an initialization parameter in various forms, including the refresh_timer variable (see FIGS. 21 and 28) or permissible optical error variable (FIG. 21). The external system 88 may prefer to maintain external control of the error budget by setting the refresh rate to a very large number and issue refresh commands to the DM driver electronics 40 as often as the external system 88 detects the surface figure of the DM mirror 16 to exceed the error tolerance.

While the main processor routine 300 is maintaining the mirror surface figure in low power mode, the external system 88 periodically requests status to be reported, as indicated by the report_status command in command 590. This process may continue for several seconds, minutes, or even hours while adaptive optics system is imaging or performing its objective. The external system 88 indicates to the DM driver electronics 40 that imaging has been terminated by transmission of a power_down command in command 593 to the DM driver electronics 40. The main processor routine 300 (FIG. 20B) processes the power_down command of command 593 in steps 306, 342, and 345. The ramp_down routine 342 brings the actuator voltages to zero, and the low_power_non-imaging_mode routine 345 reduces DM electronics system power to a minimum in response to the power_down command of command 593.

In higher bandwidth applications, such as high energy laser weapons systems, nuclear fusion generation systems, microelectronics fabrication systems, micropositioners, or eye research, the multiplexed DM assembly 10 and DM driver electronics 40 may be required to operate at relatively high frame rates (i.e., receive many successive DM command frames 89*a*–89*i*) for a short burst. For example, a high frame rate, short burst is required when a high-energy laser is first energized and thermal activity is prevalent in the AO system. Then, once thermal effects caused by the high-energy laser have stabilized, lower frame rates, or a set-and-forget 89*n*, may be all that is necessary.

The principles of the present invention allow for the multi-rate DM command frame rate profile just described by allowing the external system 88 to define the levels of error checking and safety provisions, such as inter-actuator stroke checks and voltage ramp rate control that the software performs before issuing actuator commands to the DM actuators. As discussed in reference to the DM hardware, the DM driver electronics 40 can be configured into zones, as shown in FIG. 3, to increase the bandwidth of the DM system 10; thus, the software is configured accordingly.

Software Equivalents

The principles of the present invention are not limiting with respect to the software language chosen for execution by the DM processor 49. The software may be implemented in any software language, such as high level languages including ANSI 'C', FORTRAN, PASCAL, object-oriented languages, or low level languages including BASIC, assembly code, DSP (digital signal processor) code, or machine code.

Furthermore, the software may be implemented in any form of data structure that accomplishes the functions described herein. The modules may be designed in forms other than those described. For example, the nom_bias routine 321 and ramp_down routine 342 may be combined into a single subroutine, where a parameter from the main processor routine 300 specifies the single, combined, nom_bias/ramp_down routine to ramp up or ramp down the actuators. The data structures and software routines support non-feedback system control, sometimes referred to as "go-to" mode, through the use of initialization or run-time parameters.

A single processor or a plurality of processors may be employed to run various aspects of the software, where the software is parsed into forms of multi-processing, multi-tasking, distributed processing, or parallel processing functions, such as in the case of multi-zone DM mirror control. A single processor or multiple processors may be employed by the DM driver electronics 40 (FIG. 2) to execute a subset of or all of the adaptive optics processing routines executed by the external system 88 (FIG. 1), in addition to the processor routines described herein with respect to controlling the actuators in the DM actuator array 70 (FIG. 3). Thus, the DM assembly 10 may comprise everything to perform adaptive optics except for the CCD camera 28 (FIG. 1), though it is possible to extend the DM bezel 13 to integrate the CCD camera 28 into the DM driver electronics 40.

Remote Control and Calibration

Remote communication to a deformable mirror system extends control of the DM to anywhere having a connection to the Internet or other network to which the DM electronics system is coupled, either directly or indirectly. Examples of applications of remote communications include remote calibration, remote control, remote software upgrades, remote diagnosis, and remote analysis. The description of the preferred embodiment of remote control and calibration that follows may be applied to the multiplexer DM driver electronics 40 and to traditional DM driver electronics.

Figure 32:
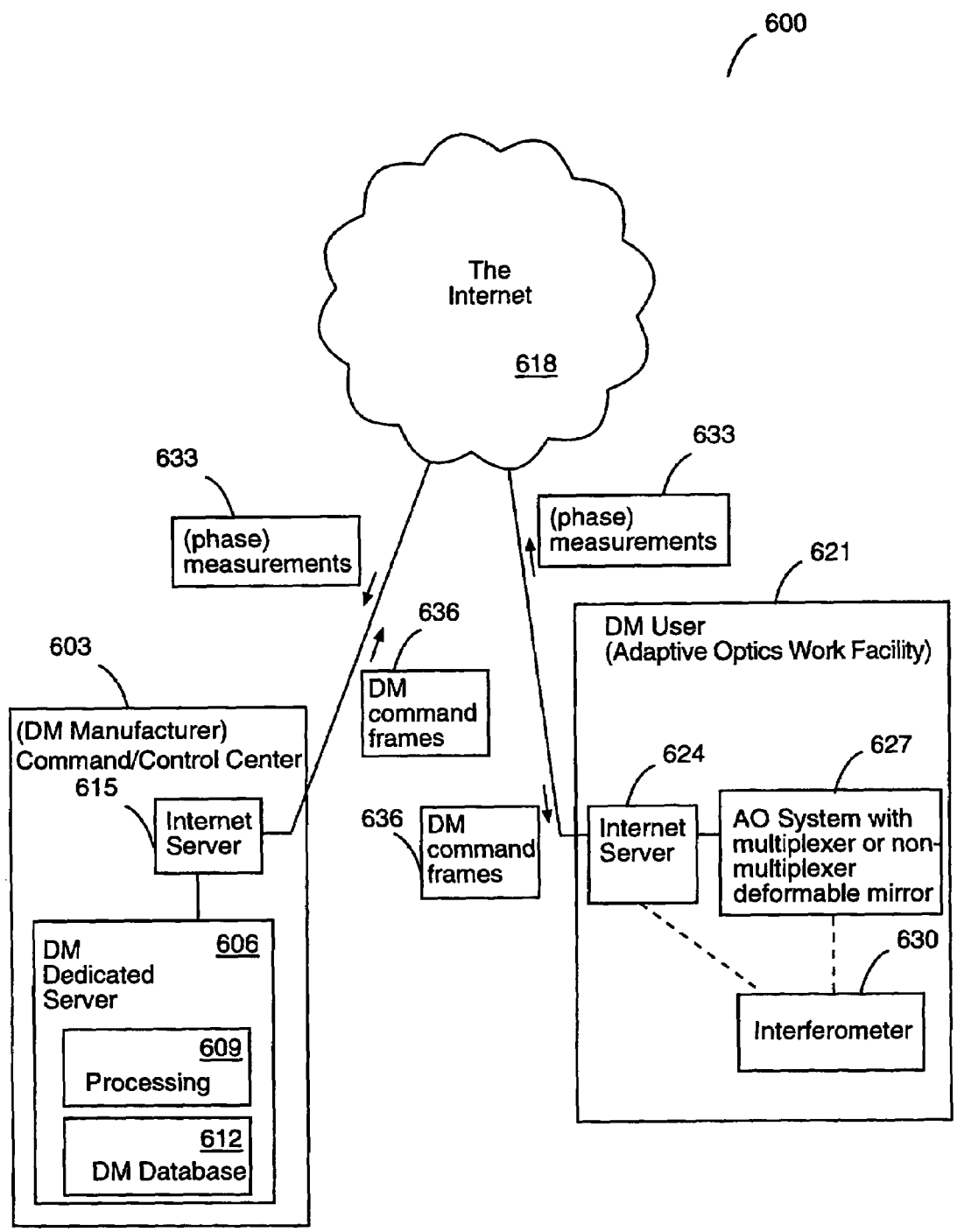
FIG. 32 is a schematic diagram of the adaptive optics system of FIG. 1 communicating over the Internet to a command and control center.

FIG. 32 is an example of a multiplexed DM system operating in a distributed networking environment 600. For simplicity, a single command/control center 603 and a single adaptive optics work facility 621 are indicated and discussed. However, there may be multiple adaptive optics work facilities 621 that may be linked to one or more command/control centers 603 over a network, including a network as large as the Internet 618.

The command/control center 603, which may be the DM manufacturer, has a DM dedicated server 606. The DM dedicated server 606 includes processing 609 and a database 612, which stores information about DM systems located at remote facilities. The DM dedicated server 606 is coupled to an Internet server 615, which facilitates communications with the DM system over the Internet 618. Alternatively, a local area network (LAN) or wide area network (WAN) could provide the connection between the command/control center 603 and the adaptive optics work facility 621.

The adaptive optics work facility 621 has an Internet server 624 to perform Internet-related functions for an AO (Adaptive Optics) system 627. An interferometer 630 capable of measuring wavefront error, or other metrics related to the characterization of a DM mirror 16 (FIG. 1) surface figure, may be employed to provide data for the process of flattening the DM or closing the loop around the DM. Alternatively, the AO system 627 itself may provide all the data necessary for the command/control center 603.

In practice, phase measurements 633 (or other metrics), measured at the adaptive optics work facility 621, are packetized and transmitted over the Internet 618, and DM network command frames 636 are returned over the Internet 618 in packetized form from the command/control center 603 to the adaptive optics work facility 621 for use by the DM in the AO system 627. Various forms of packet communications may be employed to accomplish sending and receiving the phase measurements 633 and DM network command frames 636.

The DM network command frames 636 can provide both the bias_offset command array to flatten the mirror at bias and mirror commands (e.g., the stream of commands 560 illustrated in FIG. 31). Thus, via the Internet 618, remote calibration and remote operation of the DM is possible. Of course, due to the time delay and uncertainty of packet communications, the distributed command and control scenario may be mostly employed for installation calibration, diagnostic measurements, and low-bandwidth applications. However, it is conceivable that future forms of communication links, and presently existing communication links such as end-to-end fiber optic network systems, between the command/control center 603 and adaptive optics work facility 621 may be employed to facilitate near-real-time remote control of the multiplexed DM, as well as the AO system.

Figure 33:
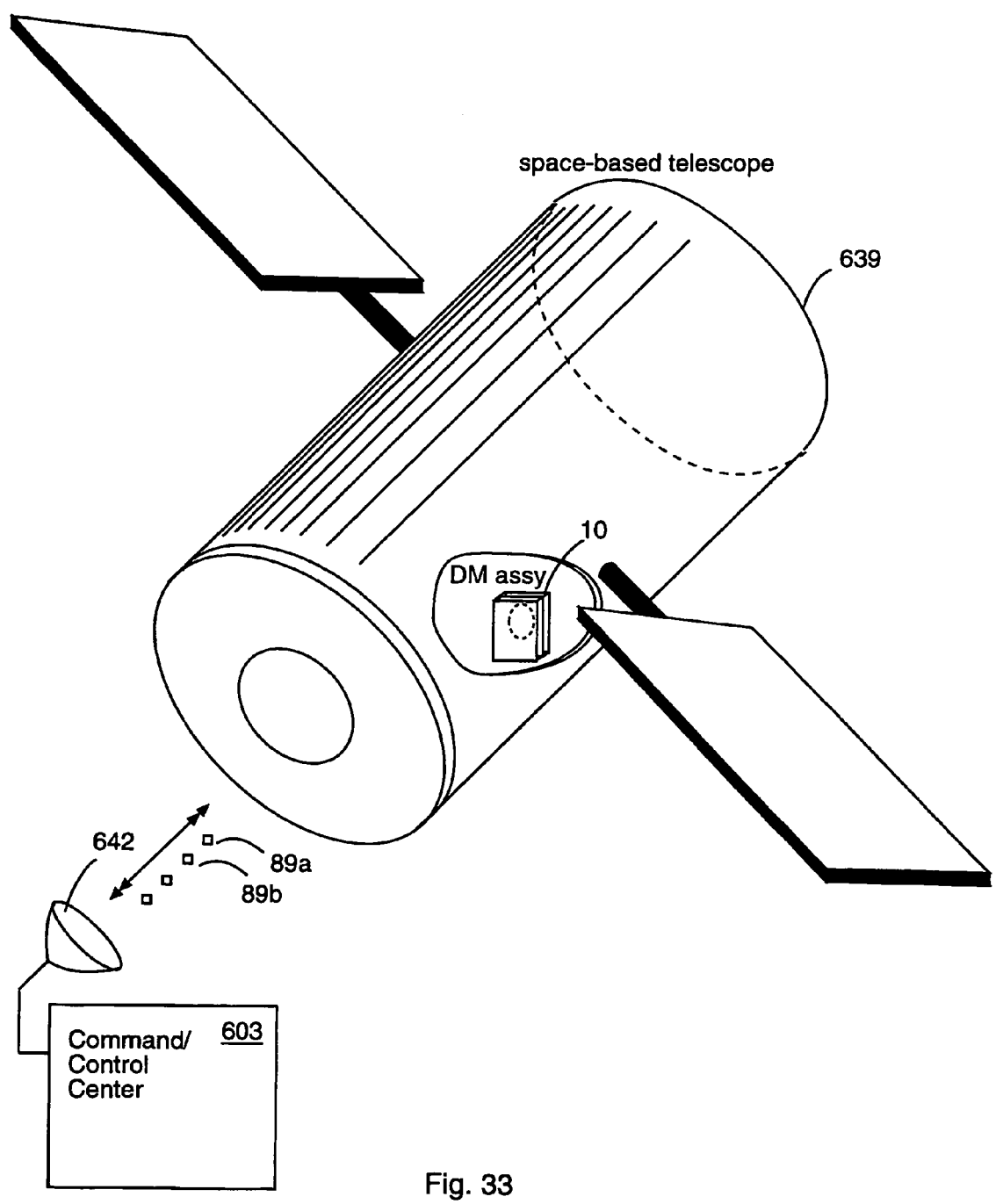
FIG. 33 is a pictorial of a space-based telescope employing the adaptive optics system of FIG. 1.

FIG. 33 is a pictorial of a space-based telescope 639 that employs a multiplexed DM assembly 10 to record astronomical images and measurements. A command/control center 603 via antenna 642 transmits DM command frames 89a, 89b to the multiplexed DM assembly 10 operating in the space-based telescope 639.

In a space-based telescope 639 and other large optical systems, a primary mirror (not shown) typically employs coarse-control actuators, such as linear voice-coil actuators. The primary mirror, other mirrors (not shown), and/or telescope structure (not shown in detail) may employ coarse/fine control (i.e., hybrid) actuators, which may be composed of linear voice-coil or "inch worm" actuators with adhesively coupled ceramic actuators. For space applications, cryogenic actuators having ceramic formulations exhibiting similar electromechanical characteristics as PMN or PZT actuators may be employed to operate in low Kelvin temperatures. The DM driver electronics 40 (FIG. 2) and switch designs (e.g., see switch 70a, FIG. 8) described hereinabove may be employed to operate the various actuator designs and associated structures. The DM driver electronics 40 used to drive the actuators are housed in a thermal shroud. It should be understood that future electronics capable of operating at low Kelvin temperatures are optionally employed external from the thermal shroud to implement the principles of the present invention.

The space-based telescope 639 is exposed to slowly changing environmental conditions, such as solar winds and solar heating. Slowly changing environmental conditions affect the optical system at low bandwidths due to non-homogeneous properties of structural elements composing the space-based telescope 639. Low bandwidth changes, combined with minimal size, energy, and weight requirements, make multiplexed DM driver electronics 40 preferable to traditional DM driver electronics for the space-based application.

Because the principles of the present invention and the electronics discussed above allow the DM driver electronics 40 (FIG. 2) to be implemented in many different logic families, including radiation-hardened families, the system described herein is suitable for the space-based telescope 639 or an array of space based telescopes (not shown) configured for interferometry or phased-array imaging. Furthermore, the low power consumption and low-voltage switching described in reference to both the hardware (FIGS. 1–19) and software (FIGS. 20–30) lend themselves to the requirements of space-based astronomy. Similar to the space-base telescope 639, ground-based telescope systems (not shown) are candidate systems for incorporating a multiplexed DM system.

The previous description is of a preferred embodiment for implementing the invention, and the scope of the invention should not necessarily be limited by this description. The scope of the present invention is instead defined by the following claims.

What is claimed is:

1. A method of controlling deformation of a structure, the method comprising:
applying a command signal at a first signal level to a first electrode of at least one actuator mechanically coupled to a structure, the first signal level known to produce an energy level in the at least one actuator substantially the same as an energy level currently stored by the at least one actuator;
electrically coupling an electrical reference to a second electrode of the at least one actuator to enable the at least one actuator to respond in an electromechanical manner to the command signal at the first signal level, the at least one actuator having a substantially negligible electromechanical response to the command signal at the first signal level;
driving the command signal from the first signal level to a second signal level, the at least one actuator changing in at least one dimension in an electromechanical manner as a function of the command signal, resulting in a corresponding deformation of the structure; and electrically decoupling the electrical reference from the second electrode of the at the least one actuator, resulting in maintaining deformation of the structure defined by energy stored in the at least one actuator.

2. The method according to claim 1 further comprising processing actuator commands to limit differential between the at least one dimension of adjacent actuators.

3. The method according to claim 1 wherein driving the command signal to said at least one actuator includes stepping the command signal between the first signal level and the second signal level in incremental steps calculated to limit an amount of current that flows through said at least one actuator at each incremental step below a threshold level.

4. The method according to claim 1 further comprising simultaneously applying the electrical reference to second electrodes of multiple actuators, the multiple actuators changing shape in at least one dimension in an electromechanical manner as a function of the command signal being driven from the first signal level to the second signal level, resulting in a corresponding deformation of the structure corresponding to the multiple actuators.

5. The method according to claim 1 further including:
storing at least one respective value corresponding to the second signal level for the at least one actuator; and
using the at least one respective value as a respective next at least one first signal level for the at least one actuator.

6. The method according to claim 1 further including receiving the first and second signal levels, or data corresponding thereto, via a wireless interface.

7. The method according to claim 1 further including multiplexing respective command signals to multiple actuators, wherein the applying, electrically coupling, driving, and electrically decoupling occurs at an actuator selected to be driven by the command signal.

8. The method according to claim 1 wherein the structure is a mirror with a first side to which the actuators are coupled and an optically reflective second side, the method further including:
optically measuring an error associated with an optical signal reflecting off the second side; and
adjusting the level of energy stored in the at least one actuator to remove the error.

9. The method according to claim 8 further including capturing images of the optical signal during times the electrical reference is electrically decoupled from the at least one actuator.

10. The method according to claim 9 wherein the times the electrical reference is electrically decoupled from the at least one actuator is greater than 10 seconds.

11. The method according to claim 1 further including adjusting the level of energy stored in the at least one actuator to apply a desired surface figure to a surface of the structure.

12. An apparatus for controlling deformation of a structure, the apparatus comprising:
at least one actuator mechanically coupled to a structure, the at least one actuator including a first electrode and a second electrode;
a processor programmed to operate with electronics coupled to the at least one actuator, the electronics including an amplifier and a switching element coupled to the at least one actuator, the processor executing instructions that cause:
the amplifier to apply a command signal at a first signal level to the first electrode of the at least one actuator, the first signal level known to produce an energy level in the at least one actuator substantially the same as an energy level currently stored by the at least one actuator;
the switching element to couple an electrical reference to the second electrode of the at least one actuator to enable the at least one actuator to respond in an electromechanical manner to the command signal at the first signal level, the at least one actuator having a substantially negligible electromechanical response to the command signal at the first signal level;
the amplifier to drive the command signal from the first signal level to a second signal level, the at least one actuator changing shape in at least one dimension in an electromechanical manner as a function of the command signal, resulting in a corresponding deformation of the structure; and
the switching element to decouple the electrical reference from the second electrode of the at the least one actuator, resulting in maintaining a deformation of the structure defined by energy stored in the at least one actuator.

13. The apparatus according to claim 12 wherein the processor further executes instructions to process actuator commands to cause the electronics to limit differential between the at least one dimension of adjacent actuators.

14. The apparatus according to claim 12 wherein the processor causes the amplifier to drive the command signal to said at least one actuator by stepping the command signal between the first signal level and the second signal level in incremental steps calculated to limit an amount of current that flows through said at least one actuator at each incremental step below a threshold level.

15. The apparatus according to claim 12 wherein the processor further executes instructions that cause the switching element to apply the electrical reference to second electrodes of multiple actuators simultaneously, the multiple actuators changing shape in at least one dimension in an electromechanical manner as a function of the command signal being driven by the amplifier from the first signal level to the second signal level, resulting in a corresponding deformation of the structure corresponding to the multiple actuators.

16. The apparatus according to claim 12 further comprising:
memory storing at least one respective value corresponding to the second signal level for the at least one actuator; and
wherein the processor further executes instructions that use the at least one respective value as a respective next at least one first signal level for the at least one actuator.

17. The apparatus according to claim 12 further including a wireless interface configured to receive the first and second signal levels, or data corresponding thereto, and to provide the first and second signal levels, or data corresponding thereto, to the processor.

18. The apparatus according to claim 12 further including multiplexing circuitry in communication with the processor and configured to multiplex respective command signals to multiple actuators.

19. The apparatus according to claim 12 wherein the structure is a mirror with a first side to which the actuators are coupled and an optically reflective second side, the apparatus further including:
an optical sensor optically measuring an error associated with an optical signal reflecting off the second side; and wherein the processor further executes instructions to cause the electronics to adjust the level of energy stored in the at least one actuator to remove the error.

20. The apparatus according to claim 19 further including a camera system capturing images of the optical signal during times the electrical reference is electrically decoupled from the at least one actuator.

21. The apparatus according to claim 20 wherein the times the electrical reference is electrically decoupled from the at least one actuator is greater than 10 seconds.

22. The apparatus according to claim 12 wherein the processor further executes instructions to cause the electronics to adjust the level of energy stored in the at least one actuator to apply a desired surface figure to a surface of the structure.

23. A system for controlling deformation of a structure, the system comprising:

means for applying a command signal at a first signal level to a first electrode of at least one actuator mechanically coupled to a structure, the first signal level known to produce an energy level in the at least one actuator substantially the same as an energy level currently stored by the at least one actuator;

means for electrically coupling an electrical reference to a second electrode of the at least one actuator to enable the at least one actuator to respond in an electromechanical manner to the command signal at the first signal level, the at least one actuator having a substantially negligible electromechanical response to the command signal at the first signal level;

means for driving the command signal from the first signal level to a second signal level, the at least one actuator being changed in at least one dimension in an electromechanical manner as a function of the command signal, resulting in a corresponding deformation of the structure; and means for electrically decoupling the electrical reference from the second electrode of the at the least one actuator, resulting in maintaining a deformation of the structure defined by energy stored in the at least one actuator.

* * * * *